US009253177B2

(12) United States Patent
Matsushita et al.

(10) Patent No.: US 9,253,177 B2
(45) Date of Patent: Feb. 2, 2016

(54) AUTHENTICATION SYSTEM, INFORMATION REGISTRATION SYSTEM, SERVER, PROGRAM, AND AUTHENTICATION METHOD

(71) Applicant: Panasonic Corporation, Kadoma-shi, Osaka (JP)

(72) Inventors: Yosuke Matsushita, Osaka (JP); Hideo Morita, Osaka (JP); Hirokazu Tamano, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 36 days.

(21) Appl. No.: 13/961,523

(22) Filed: Aug. 7, 2013

(65) Prior Publication Data

US 2013/0326597 A1 Dec. 5, 2013

Related U.S. Application Data

(63) Continuation of application No. PCT/JP2012/002493, filed on Apr. 10, 2012.

(30) Foreign Application Priority Data

Apr. 12, 2011 (JP) ................................. 2011-088534

(51) Int. Cl.
*H04L 29/06* (2006.01)
*H04N 21/258* (2011.01)
(Continued)

(52) U.S. Cl.
CPC .............. *H04L 63/08* (2013.01); *G06Q 20/123* (2013.01); *G06Q 20/3223* (2013.01);
(Continued)

(58) Field of Classification Search
CPC .... H04L 63/08; H04L 9/3226; H04L 63/0876
USPC ......................................................... 726/4, 5
See application file for complete search history.

(56) References Cited

U.S. PATENT DOCUMENTS 5,060,263 A   10/1991   Bosen et al.
5,341,426 A    8/1994   Barney et al.
(Continued)

FOREIGN PATENT DOCUMENTS

EP   0 848 343    6/1998
JP   6-232861     8/1994
(Continued)

OTHER PUBLICATIONS

Pell, "Your secret StingRay's no secret anymore: the vanishing government monopoly over cell phone surveillance and its impact on national security and consumer privacy", 2014, Harvard Journal of Law & Technology, pg. 1-75.*

(Continued)

*Primary Examiner* — Kenneth Chang
*Assistant Examiner* — Gregory Lane
(74) *Attorney, Agent, or Firm* — Hamre, Schumann, Mueller & Larson, P.C.

(57) ABSTRACT

The authentication system includes a plurality of user terminals that are used by the same user, and a server capable of communicating with the plurality of user terminals. A user terminal transmits, to the server, an identification ID of the user terminal, a first code that is used in common in the plurality of user terminals, and a second code that was encrypted using the first code. The server is configured to decrypt the encrypted second code using the first code, and perform authentication of the user terminal using the identification ID and the decrypted second code. The server, upon receiving a second code that is not encrypted from one of the plurality of user terminals, transmits the second code that was encrypted using the first code to the one of the user terminals.

8 Claims, 55 Drawing Sheets

Exemplary system configuration

(51) Int. Cl.
*H04L 9/32* (2006.01)
*G06Q 30/06* (2012.01)
*G06Q 20/12* (2012.01)
*G06Q 20/32* (2012.01)
*G06Q 20/40* (2012.01)
*H04N 21/426* (2011.01)
*H04N 21/475* (2011.01)

(52) U.S. Cl.
CPC ........... *G06Q 20/4097* (2013.01); *G06Q 30/06* (2013.01); *H04L 9/3226* (2013.01); *H04N 21/25875* (2013.01); *H04N 21/42684* (2013.01); *H04N 21/25816* (2013.01); *H04N 21/4753* (2013.01)

(56) References Cited

U.S. PATENT DOCUMENTS

| | | | |
|---|---|---|---|
| 5,592,553 | A | 1/1997 | Guski et al. |
| 5,880,720 | A | 3/1999 | Iwafune et al. |
| 6,065,024 | A | 5/2000 | Renshaw |
| 6,778,828 | B1 * | 8/2004 | Chander et al. ............ 455/435.1 |
| 6,938,163 | B1 * | 8/2005 | Birkler et al. ................ 713/193 |
| 7,475,404 | B2 | 1/2009 | Hamel |
| 7,580,990 | B1 | 8/2009 | Spring |
| 7,865,939 | B2 * | 1/2011 | Schuster ........................... 726/4 |
| 8,533,472 | B2 * | 9/2013 | Takasugi et al. .............. 713/169 |
| 2001/0056541 | A1 | 12/2001 | Matsuzaki et al. |
| 2002/0007323 | A1 | 1/2002 | Tamatsu |
| 2004/0054624 | A1 | 3/2004 | Guan et al. |
| 2004/0154040 | A1 | 8/2004 | Ellis |
| 2005/0177420 | A1 | 8/2005 | Tanahashi |
| 2007/0157032 | A1 | 7/2007 | Paganetti et al. |
| 2008/0148057 | A1 | 6/2008 | Hauw |
| 2008/0165965 | A1 | 7/2008 | Almeida |
| 2008/0304647 | A1 * | 12/2008 | Ikemori et al. ............ 379/207.02 |
| 2009/0287936 | A1 * | 11/2009 | Ohkado ......................... 713/183 |
| 2010/0083314 | A1 | 4/2010 | Takahashi |
| 2010/0085483 | A1 | 4/2010 | Pan |
| 2010/0202606 | A1 * | 8/2010 | Almeida ........................... 380/28 |
| 2010/0239087 | A1 | 9/2010 | Chaisson et al. |
| 2010/0242102 | A1 * | 9/2010 | Cross et al. ........................ 726/7 |
| 2010/0281407 | A1 | 11/2010 | Yokogawa et al. |
| 2010/0299523 | A1 | 11/2010 | Henry et al. |
| 2011/0038598 | A1 | 2/2011 | Okuda et al. |
| 2011/0239281 | A1 * | 9/2011 | Sovio et al. ........................ 726/5 |
| 2012/0023556 | A1 * | 1/2012 | Schultz et al. .................... 726/4 |
| 2012/0144194 | A1 * | 6/2012 | Zhao ............................. 713/168 |

FOREIGN PATENT DOCUMENTS

| | | |
|---|---|---|
| JP | 7-107086 | 4/1995 |
| JP | 8-335207 | 12/1996 |
| JP | 9-163346 | 6/1997 |
| JP | 09-305666 | 11/1997 |
| JP | 10-171887 | 6/1998 |
| JP | 2001-084306 | 3/2001 |
| JP | 2001-346257 | 12/2001 |
| JP | 2002-007348 | 1/2002 |
| JP | 2002-033727 | 1/2002 |
| JP | 2002-063532 | 2/2002 |
| JP | 2003-006163 | 1/2003 |
| JP | 2003-006548 | 1/2003 |
| JP | 2003-528484 | 9/2003 |
| JP | 2004-021591 | 1/2004 |
| JP | 2004-048635 | 2/2004 |
| JP | 2004-151863 | 5/2004 |
| JP | 2004-364011 | 12/2004 |
| JP | 2005-182639 | 7/2005 |
| JP | 2005-309589 | 11/2005 |
| JP | 2006-085392 | 3/2006 |
| JP | 2006-280453 | 10/2006 |
| JP | 2008-042490 | 2/2008 |
| JP | 2009-042929 | 2/2009 |
| JP | 2009-093675 | 4/2009 |
| JP | 2009-157901 | 7/2009 |
| JP | 2010-087976 | 4/2010 |
| JP | 2010-268480 | 11/2010 |
| JP | 2010-288008 | 12/2010 |
| JP | 2011-040134 | 2/2011 |
| WO | 02/01853 | 1/2002 |
| WO | WO 03/032219 | 4/2003 |

OTHER PUBLICATIONS

Office Action issued in corresponding European Patent Application No. 12771371.7, Jul. 22, 2015, 9 pages.

* cited by examiner

Example of connection data

Example of television device data

| System ID 61 | Sale user ID 62 | Login ID 63 | PIN 64 | Payment flag 65 | Device ID (1) 66 | Product ID of device ID (1) 67 | Device ID (2) 68 | Product ID of device ID (2) 69 |
|---|---|---|---|---|---|---|---|---|
| s001 | h001 | g001@aaa.com | 11111 | T | d001 | 001, 002, | d011 | 001 |
| s002 | h002 | g002@bbb.com | 22222 | F | d002 | | | |
| s003 | h003 | g003@ccc.com | 33333 | T | d003 | | d033 | 003 |
| ... | ... | ... | ... | ... | ... | ... | ... | ... |

FIG. 6

Example of product data

| Product ID | Product type | Detailed description | File name | Size | ... |
|---|---|---|---|---|---|
| 001 | Free hosted application software | This product is... | a001.exe | | ... |
| 002 | Pay hosted application software | This product is... | a002.exe | | ... |
| 003 | Free download application software | This product is... | a003.exe | 3.0MB | ... |
| 004 | Pay download application software | This product is... | a004.exe | 4.0MB | ... |
| 005 | Article | This product is... | | | ... |
| ⋮ | ⋮ | ⋮ | ⋮ | ⋮ | ⋮ |

FIG. 7

Example of user data

| Sale user ID (91) | Login ID (92) | Password (93) | Payment information (94) | Delivery address (95) | Purchase history (96) |
|---|---|---|---|---|---|
| h001 | g001@aaa.com | p001 | 1234... | Osaka... | 2011/1/31... |
| h002 | g002@bbb.com | p002 | 2345... | Tokyo... | |
| h003 | g003@ccc.com | p003 | 3456... | Kyoto... | |
| ... | ... | ... | ... | ... | ... |

Example of pay product data

| Product ID | Detailed description | Price | File name | Size |
|---|---|---|---|---|
| 002 | This product is... | 200 yen | a002.exe | |
| 004 | This product is... | 400 yen | a004.exe | 4.0MB |
| 005 | This product is... | 500 yen | | |
| ⋮ | ⋮ | ⋮ | ⋮ | ⋮ |

FIG. 10

Exemplary flowchart of display screen control processing

Example of state transition of user management data

| | Information held in television device | Updating step | Information held in management server device | Updating step | Information held in sale server device |
|---|---|---|---|---|---|
| 621~ Unconnected | Device ID | Device ID (television device → management server device) | | | |
| 622~ Unregistered user | Temporary system ID<br>Device ID | Temporary system ID (management server device → television device) | Temporary system ID<br>Device ID | | |
| | | Login ID, PIN, password, device ID (television device → management server device) | Application information (including free application, positioning information) | | |
| 623~ Non-paying user | System ID (encrypted)<br>Device ID<br>Password (encrypted) | Password (encrypted), system ID (encrypted) (management server device → television device) | System ID<br>Device ID<br>Application information (including free application, positioning information) | Login ID, Sale password (management server device → sale server device) | Sale user ID<br>Login ID<br>Password |
| | | System ID (encrypted) (television device → management server device) | Sale user ID<br>Login ID<br>PIN | Sale user ID (sale server device → management server device) | |
| 624~ Paying user | System ID (encrypted)<br>Device ID<br>Password (encrypted) | Login ID (television device → management server device) | System ID<br>Device ID<br>Application information (including free application, positioning information) | Login ID (management server device → sale server device) | Sale user ID<br>Login ID<br>Password<br>Payment information<br>Delivery address |
| | | Login ID, password, payment information, delivery address (television device → sale server device) | Sale user ID<br>Login ID<br>PIN | | Purchase history (including application information; purchased device ID) |
| | | Payment flag (management server device → television device) | Payment flag | Payment flag (sale server device → management server device) | |

FIG. 42

Television device state transition table

| Transition pass | To be transmitted (management server device) | To be transmitted (sale server device) | To be received (management server device) | Internal processing |
|---|---|---|---|---|
| (1) Connection of television device to management server device | Device ID | | Temporary system ID | Registration of temporary system ID |
| (2) Deletion of information within television device by refreshing television device | (at the time of next connection, device ID) | | | Deletion of temporary system ID |
| (3) Non-paying user registration | Login ID, PIN, name, password, device ID | | System ID (encrypted), password (encrypted) | Registration of system ID (encrypted) and password (encrypted) |
| (4) Paying user registration | | Login ID, password, payment information, delivery address | Login ID, payment flag | |
| (5) New device binding | Login ID, password, device ID | | System ID (encrypted), password (encrypted) | Registration of system ID (encrypted) and password (encrypted) |
| (6) New device binding (same as (5)) | Login ID, password, device ID | | System ID (encrypted), password (encrypted) | Registration of system ID (encrypted) and password (encrypted) |
| (13) PIN entry error three times | | | | Deletion of password (encrypted) |
| (14) Correct password entry | System ID (encrypted), password, PIN | | Password (encrypted) | Registration of password (encrypted) |
| (15) Deletion of information within television device by refreshing television device | | | | Deletion of system ID (encrypted) and password (encrypted) |

FIG. 44

Television device state transition table

| Transition pass | To be transmitted (management server device) | To be transmitted (sale server device) | To be received (management server device) | Internal processing |
|---|---|---|---|---|
| (7-12) Processing when configuring settings at (7)-(12) | System ID (encrypted) | | Login ID, payment flag | |
| (7) Update of login ID or password | System ID (encrypted), password (old), login ID(new), password (new) | | Password (new, encrypted) | Registration of password (new, encrypted) |
| (8) Update of login ID or password (same as (7)) | System ID (encrypted), password (old), login ID(new), password (new) | | Password (new, encrypted) | Registration of password (new, encrypted) |
| (9) Update of other information | System ID (encrypted) | Login ID, password, name | Login ID, payment flag | |
| (10) Update of other information | System ID (encrypted) | Login ID, password, name, payment information, delivery address | Login ID, payment flag | |
| (11) Update of other information | System ID (encrypted) | Login ID, password, name, payment information, delivery address | Login ID, payment flag | |
| (12) Update of other information | System ID (encrypted) | Login ID, password, name, payment information, delivery address | Login ID, payment flag | |

FIG. 45

Management server device state transition table

| Transition pass | To be received (television device) | To be transmitted (sale server device) | To be received (sale server device) | To be transmitted (television device) | Internal processing |
|---|---|---|---|---|---|
| (1) Connection of television device to management server | Device ID | | | Temporary system ID | Addition of device ID to temporary system ID |
| (2) Deletion of information within television device by refreshing television device | (Device ID) | | | | Deletion of device ID from temporary system ID |
| (3) Non-paying user registration | Login ID, PIN, name, password, device ID | Login ID, name, password | Sale user ID | System ID (encrypted) password (encrypted) | Issue of system ID, addition of device ID to system ID, registration of PIN, deletion of device ID from temporary system ID, Encryption of system ID and password |
| (4) Paying user registration | System ID (encrypted) | Login ID | Payment status | Login ID, payment flag | Change of payment flag |
| (5) New device binding | Login ID, password, device ID | Login ID, password | Payment status | System ID (encrypted) password (encrypted) | Addition of device ID to system ID, deletion of device ID from temporary system ID, encryption of system ID and password |
| (6) New device binding | Login ID, password, device ID | Login ID, password | Payment status | System ID (encrypted) password (encrypted) | Addition of device ID to system ID, deletion of device ID from temporary system ID, encryption of system ID and password, change of payment flag |

FIG. 47

Management server device state transition table

| Transition pass | To be received (television device) | To be transmitted (sale server device) | To be received (sale server device) | To be transmitted (television device) | Internal processing |
|---|---|---|---|---|---|
| (7-12) Processing when configuring settings at (7)-(12) | System ID (encrypted) | | | Login ID, payment flag | |
| (7) Update of login ID or password | System ID (encrypted), password (old), login ID (new), password (new) | Login ID (old), password (old), login ID (new), password (new) | OK or NG | Password (new, encrypted) | Registration of login ID (new) |
| (8) Update of login ID or password | System ID (encrypted), password (old), login ID (new), password (new) | Login ID (old), password (old), login ID (new), password (new) | OK or NG | Password (new, encrypted) | Registration of login ID (new) |
| (9) Update of other information | System ID (encrypted) | Login ID | Payment status | Login ID, payment flag | |
| (10) Update of other information | System ID (encrypted) | Login ID | Payment status | Login ID, payment flag | |
| (11) Update of other information | System ID (encrypted) | Login ID | Payment status | Login ID, payment flag | Change of payment flag |
| (12) Update of other information | System ID (encrypted) | Login ID | Payment status | Login ID, payment flag | Change of payment flag |

FIG. 48

Sale server device state transition table

| | | | | | |
|---|---|---|---|---|---|
| (3) Non-paying user registration | Login ID, name, password | Sale user ID | | | Issue of sale user ID, registration of login ID, name, password |
| (4) Paying user ID | Login ID | Payment status | Login ID, password, payment information, delivery address | | Payment information, registration of delivery address |
| (5) New device binding | Login ID, password | Payment status | | | |
| (6) New device binding | Login ID, password | Payment status | | | |

FIG. 50

Sale server device state transition table

| Transition pass | To be received (management server device) | To be transmitted (management server device) | To be received (television device) | To be transmitted (television device) | Internal processing |
|---|---|---|---|---|---|
| (7) Update of login ID or password | Login ID (old), password (old), login ID (new), password (new) | OK or NG | | | Change of login ID and password |
| (8) Update of login ID or password | Login ID (old), password (old), login ID (new), password (new) | OK or NG | | | Change of login ID and password |
| (9) Update of other information | Login ID | Payment status | Login ID, password, name | OK or NG | Change of name |
| (10) Update of other information | Login ID | Payment status | Login ID, password, name, payment information, delivery address | OK or NG | Change of name, payment information, delivery address |
| (11) Update of other information | Login ID | Payment status | Login ID, password, name, payment information, delivery address | OK or NG | Change of name, payment information, delivery address |
| (12) Update of other information | Login ID | Payment status | Login ID, password, name, payment information, delivery address | OK or NG | Change of name, payment information, delivery address |

FIG. 51

State transition in the case of refreshing television device

| | Television device | Management server device |
|---|---|---|
| 701 — Used in unregistered user state | Temporary ID<br>└ Television device 1 | Temporary ID<br>└ Television device 1<br>　├ Application 1<br>　└ Application 2 |
| 702 — Used in non-paying user state | System ID 1<br>└ Television device 1 | System ID 1<br>└ Television device 1<br>　├ Application 1<br>　└ Application 2 |
| 707 — To unregistered user state by refreshing television device → Re-registration without transferring television device to other person | Temporary ID<br>└ Television device 1 | Temporary ID<br>└ Television device 1<br>　└ Application 3<br>System ID 1<br>└ Television device 1<br>　├ Application 1<br>　└ Application 2 |
| 708 — To non-paying/paying user state by new device binding | System ID 1<br>└ Television device 1 | System ID 1<br>└ Television device 1<br>　├ Application 1<br>　└ Application 2<br>Information of temporary ID disappeared |

FIG. 54

AUTHENTICATION SYSTEM, INFORMATION REGISTRATION SYSTEM, SERVER, PROGRAM, AND AUTHENTICATION METHOD

CROSS-REFERENCE TO RELATED APPLICATIONS

The present application is based upon and claims the benefit of priority of the prior Japanese Patent Application No. 2011-088534 filed on Apr. 12, 2011, and is a continuation of the International application No. PCT/JP2012/002493 filed on Apr. 10, 2012, the entire contents of which are incorporated herein by reference.

TECHNICAL FIELD

The present invention relates to an authentication system including a plurality of devices.

BACKGROUND ART

A system is known that acquires data held in an external device other than a device that the system accessed first when displaying a web page. For example, Patent Document 1 discloses a system in which an applet of a web page accesses an advertisement server device via a proxy of a host device and displays an advertisement. Patent Document 2 discloses a system that uses a Java applet incorporated in a first browser window to access an HTTP server device and display a second browser window. Further, Patent Document 3 discloses a system that uses a Java applet to acquire a second set of HTML data and embed it in a display area of a first set of HTML data to display the second set of HTML data.

Meanwhile, a system is known that performs user authentication using an identification ID and a password. For example, Patent Document 4 discloses a system that performs user authentication for purchase via a television shopping service, using a personal ID that is preset in a television and a password entered by a user. Patent Document 5 discloses a system that performs user authentication, using authentication information generated based on a user ID and a password that are entered by the user. Further, Patent Document 6 discloses a system that, upon receiving a user ID and a password from a user, performs authentication of the user based on the user ID that is encrypted or decrypted using the password.

Patent Document 1: U.S. Pat. No. 7,475,404
Patent Document 2: U.S. Pat. No. 7,580,990
Patent Document 3: U.S. Pat. No. 6,065,024
Patent Document 4: JP H9-163346A
Patent Document 5: JP2004-21591A
Patent Document 6: JP2003-528484A

SUMMARY

One embodiment of an authentication system includes a plurality of user terminals that are used by the same user, and a server capable of communicating with the plurality of user terminals. A user terminal transmits, to the server, an identification ID of the user terminal, a first code that is used in common in the plurality of user terminals, and a second code that was encrypted using the first code. The server is configured to decrypt the encrypted second code using the first code, and perform authentication of the user terminal using the identification ID and the decrypted second code. The server, upon receiving a second code that is not encrypted from one of the plurality of user terminals, transmits the second code that was encrypted using the first code to the one of the user terminals.

BRIEF DESCRIPTION OF DRAWINGS

FIG. 6 is a diagram showing an example of television device data 552.

FIG. 7 is a diagram showing an example of product data 553.

FIG. 9 is a diagram showing an example of user data 852.

FIG. 10 is a diagram showing an example of pay product data 853.

FIG. 42 is a diagram showing an example of state transition of user management data in the second embodiment.

FIG. 44 is a diagram showing an exemplary table of state transition of the television device 10 shown in FIG. 43.

FIG. 45 is a diagram showing an exemplary table of state transition of the television device 10 shown in FIG. 43.

FIG. 47 is a diagram showing an exemplary table of state transition of the management server device 11 shown in FIG. 46.

FIG. 48 is a diagram showing an exemplary table of state transition of the management server device 11 shown in FIG. 46.

FIG. 50 is a diagram showing an exemplary table of state transition of the sale server device 12 shown in FIG. 49.

FIG. 51 is a diagram showing an exemplary table of state transition of the sale server device 12 shown in FIG. 49.

FIG. 54 is an exemplary schematic diagram of state transition in the case of refreshing a television device.

EMBODIMENT

Figure 1:
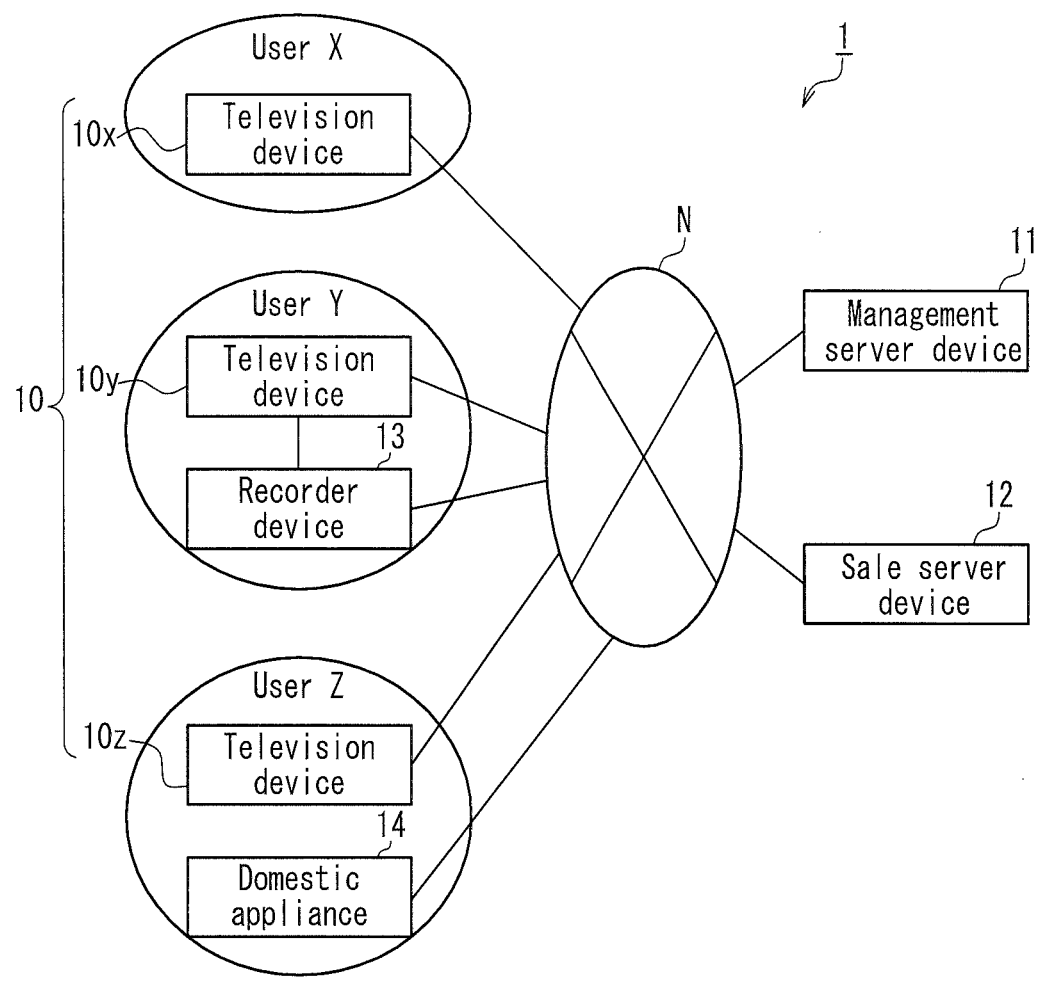
FIG. 1 is a diagram showing an exemplary system configuration of a television system 1 according to the present invention.

Unfortunately, the systems disclosed in Patent Documents 1, 2, and 3 do not taken into account, when data in an external device is updated, reflecting the content of the data update on the display of a device that made access. Therefore, it has been difficult in the aforementioned systems to maintain data consistency among devices.

On the other hand, in the system disclosed in Patent Document 4, the password consists only of numbers, resulting in difficulty in keeping a high level of security. In the systems disclosed in Patent Documents 5 and 6, an entry operation is bothersome because the user needs to enter the ID and the password.

The present invention was made in view of the foregoing situation, and it is an object of the present invention to provide an authentication system capable of simplifying an entry operation and keeping a high level of security.

To achieve the above-stated object, a television system disclosed below is a television system including a television device, a first server device, and a second server device; the television device having a television identification data holding unit that holds television identification data for identifying itself, and a display control unit that transmits the television identification data to the first server device and displays a screen based on an instruction received from the first server device; the first server device having a user identification data holding unit that holds user identification data for identifying a user, in association with the television identification data, a user management unit that transmits, to the second server device, the user identification data corresponding to the television identification data received from the television device, and receives user information corresponding to the transmitted user identification data from the second server device, and an instruction transmission unit that transmits an instruction to the television device, based on the received user information; and the second server device having a user information holding unit that holds the user information in association with the user identification data, and a user information transmission unit that transmits, to the first server device, the user information corresponding to the user identification data received from the first server device.

To achieve the above-stated object, a television system disclosed below is a television system including a television device, a management server device, and a sale server device; the television device having a connection information holding unit that holds identification data for identifying this television device, and a display control unit that transmits the identification data held in the connection information holding unit to the management server device and outputs a display image received from the management server device; the management server device having a television device information holding unit that holds user identification data for making an inquiry to the sale server device about user information regarding a user of the television device, in association with the identification data, and a display screen control unit that causes the television device to display a display screen that is associated with setting the status of the television device and of the user, based on the identification data transmitted from the television device and on the user information transmitted from the sale server device; and the sale server device having a user information holding unit that holds user information regarding the user of the television device in association with the user identification data, and a sales control unit that, upon receiving an inquiry accompanied with the user identification data from the management server device, extracts the user information corresponding to the user identification data from the user information holding unit and transmits the extracted user information to the management server device.

To achieve the above-stated object, an authentication system disclosed below is an authentication system including a user terminal and a server capable of communicating with the user terminal; the user terminal transmitting, to the server, an identification ID of the user terminal, a first code that was entered, and a second code that was encrypted using the first code; the server decrypting the encrypted second code using the first code, and performing authentication of the user terminal using the identification ID of the user terminal and the decrypted second code; with a data volume of the first code being smaller than that of the second code.

EFFECTS OF THE INVENTION

According to the disclosure in the specification of the present application, it is possible to maintain data consistency among devices. Also, according to the disclosure in the specification of the present application, it is possible to provide an authentication system capable of simplifying an entry operation and keeping a high level of security.

Hereinafter, embodiments of the present invention will be described in detail with reference to the drawings.

1. First Embodiment

An exemplary television system according to the present embodiment will be hereinafter described. A description will be given of an example in which, in the television system of the present embodiment, service is provided to a user who uses a television receiver (hereinafter referred to as a television device), using the television device, a management server device, and a sale server device. The aforementioned service includes mail order service and information service, for example.

Note that the television system according to the present embodiment can be configured as an authentication system or a server collaboration system. In this case, a television device can be configured as a user terminal used by the user. Also, any device capable of communicating with a server (e.g., a recorder device, a set-top box, a personal computer, a tablet terminal (tablet PC), a smartphone, a mobile phone, etc.) can be used in place of the television device.

1-1. System Configuration

FIG. 1 is a diagram showing an exemplary system configuration of the television system 1. The television system 1 includes television devices 10 (10x, 10y, 10z) that are user terminals, a management server device 11 that is a first server device, and a sale server device 12 that is a second server device. The television device 10x is a television device used by a user X, the television device 10y is a television device used by a user Y, and the television device 10z is a television device used by a user Z.

The user Y can use a recorder device 13 as well as the television device 10y. The recorder device 13 is connected to the television device 10y. The recorder device 13 is a disk recorder device having record and playback functions, for example. The recorder device 13 can connect to a network N. The user Z can use a domestic appliance 14 as well as the television device 10z. The domestic appliance 14 is a washing machine that can be used in a HEMS (Home Energy Management System), for example. "HEMS" is a generic term of an energy management system for household. Specifically, a domestic appliance that can be used in a HEMS can transmit information regarding the amount of used electricity to a connected server device or the like via a network. Therefore, the domestic appliance 14 can connect to the network N.

The television device 10, the management server device 11, and the sale server device 12 can communicate with one other via the network N, such as the Internet. The network N may also be a network such as a WAN, LAN, or intranet. Although only three television devices 10 (10x, 10y, 10z) are shown in FIG. 1, three or more television devices may be present in practice. There may be a plurality of management server devices 11 and sale server devices 12. The management server device 11 and the sale server device 12 may be present in every country or every area in which the television devices 10 are installed, for example.

The management server device 11 can provide a menu display image or the like, for example, to each television device 10 that is connected via the network N. Note that providing a menu display image or the like by the management server device 11 is a concept including both causing the television device 10 to display the menu display image generated by the management server device 11 and transmitting data that is necessary for generating the menu display image on the television device 10 side.

Also, the management server device 11 can function as a main server that accepts connection of the television device 10x. In this case, high responsiveness is required in processing executed by the management server device 11.

The sale server device 12 can provide, for example, user data, data on products for sale, and the like to the management server device 11 that is connected via the network N. Also, the sale server device 12 can provide, for example, a user registration screen and the like to the television device 10 that is connected via the network N.

Also, the sale server device 12 can function as a server that receives highly confidential data from the television device 10x. In this case, a high level of confidentiality (a high level of security) is required in processing executed by the management server device 11.

For example, if the sale server device 12 is a server that performs credit card payment, a high level of confidentiality can be ensured by satisfying a certain security standard (e.g., PCIDSS (Payment Card Industry Data Security Standard)). For example, the sale server device 12 performs encrypted communication using HTTPS (Hypertext Transfer Protocol over Secure Socket Layer) or the like when transmitting and receiving data of the card number or the like.

1-2. Functional Block

Figure 2A:
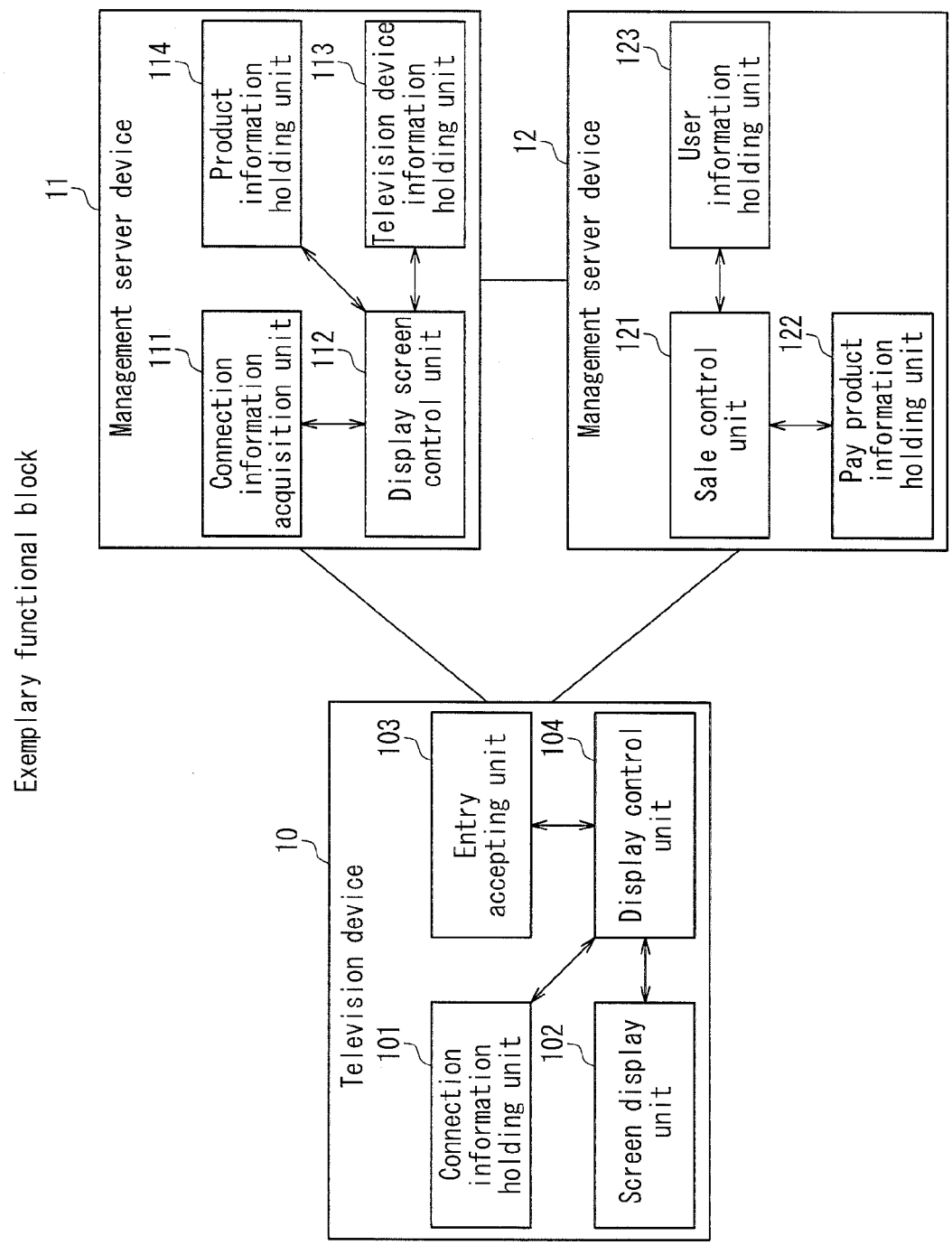
FIG. 2A is a diagram showing an exemplary functional block of the television system 1 according to the present invention.

FIG. 2A is a diagram showing an exemplary functional block diagram of the television system 1. In FIG. 2A, the television device 10 has a connection information holding unit 101, a screen display unit 102, an entry accepting unit 103, and a display control unit 104. The management server device 11 has a connection information acquisition unit 111, a display screen control unit 112, a television device information holding unit 113, and an product information holding unit 114. The sale server device 12 has a sale control unit 121, a pay product information holding unit 122, and a user information holding unit 123.

The connection information holding unit 101 in the television device 10 contains identification data for identifying the television device 10. For example, the identification data includes a MAC address (Media Access Control address) that is uniquely allocated to the television device 10. Note that the identification data may be one including a hush value obtained by converting the MAC address with a predetermined hush function. Also, the identification data may be one including a unique system ID that is uniquely given for identifying the television device 10 in the television system 1. The connection information holding unit 101 is an example of a television identification data holding unit that holds television identification data for identifying the television device itself.

The screen display unit 102 displays a screen that is based on data received from the management server device 11 or the sale server device 12. For example, the screen display unit 102 displays a screen including an image related to an product or the like that the user can purchase in mail order service using the television device 10, or an image related to application software (hereinafter referred to simply as application in some cases) or the like that is available on the television device 10.

The entry accepting unit 103 accepts entry of various kinds of information based on a user operation. For example, the entry accepting unit 103 is a remote controller for the user to perform an operation of entering a password, a credit card number, and so on.

The display control unit 104 communicates with the management server device 11 or the sale server device 12 to perform display control related to a screen including various images displayed on the television device 10. For example, the display control unit 104 transmits the identification data held in the connection information holding unit 101 to the management server device 11, receives, from the management server device 11, a display image generated based on the identification data transmitted to the management server device 11, and outputs it to the screen display unit 102. The display control unit 104 is an example of a display control unit that transmits the television identification data to the first server device and displays a screen based on an instruction received from the first server device.

The connection information acquisition unit 111 in the management server device 11 acquires the identification data transmitted from the television device 10. For example, the connection information acquisition unit 111 acquires information including the MAC address of the television device 10.

The display screen control unit 112 controls a screen including a display image to be displayed on the television device 10. For example, the display screen control unit 112 generates a display screen associated with setting status of the television device 10 and of the user that is based on an identification ID, and transmits the generated display screen to the television device 10. The display screen control unit 112 is an example of a user management unit that transmits, to the second server device, user identification data corresponding to the television identification data received form the television device, and receives user information corresponding to the transmitted user identification data from the second server device. Also, the display screen control unit 112 is an example of an instruction transmission unit that transmits an instruction to the television device, based on the received user information.

The television device information holding unit 113 holds various kinds of information corresponding to each television device 10. For example, the television device information holding unit 113 holds identification data for connecting to the sale server device 12 information on application software that is available for the user of the television device 10, and the like, in association with the television device 10. The television device information holding unit 113 is an example of a user identification data holding unit that holds the user identification data for identifying the user and the television identification data in association with each other.

The product information holding unit 114 holds information regarding products that can be provided to the user of the television device 10. For example, the product information holding unit 114 holds information regarding application software that can be installed for free or at a cost in the television device 10 and information regarding articles that can be sold to the user, in association with product IDs. Note that the product information holding unit 114 may be included in the sale server device 12.

An act of installation in the television device 10 is a concept including installation of both downloaded application software and hosted application software. For example, installation of downloaded application software includes setting of a program downloaded from a server device so that it can be executed on the television device 10. For example, installation of hosted application software includes setting, in the television device 10, of data that indicates a right (hereinafter referred to as an execution right in some cases) to cause a server device to execute application software held in the server device and to acquire an execution result.

The sale control unit 121 in the sale server device 12 responds to an inquiry from the management server device 11 or the television device 10. For example, upon receiving an inquiry about user information from the management server device 11, the sale control unit 121 extracts, from the user information holding unit 123, the user information corresponding to the inquiry from the management server device 11 and transmits the extracted user information to the management server device 11. The sale control unit 121 is an example of a user information transmission unit that transmits, to the first server device, the user information corresponding to the user identification data received from the first server device.

The pay product information holding unit 122 holds information regarding products that can be provided at a cost to the user of the television device 10. For example, the pay product information holding unit 122 holds information regarding application software (pay hosted application software or pay downloaded application software) that can be installed at a cost in the television device 10 and information regarding articles that can be sold to the user at a cost, in association with product IDs. Note that the pay product information holding unit 122 may be included in the management server device 11.

The user information holding unit 123 holds information regarding the user of the television device 10. For example, the user information holding unit 123 holds information regarding user's payment information, information regarding delivery address, and so on. The user information holding unit 123 is an example of a user information holding unit that holds the user information in association with the user identification data.

Each of the functional units (display control unit 104, connection information acquisition unit 111, display screen control unit 112, and sale control unit 121) shown in FIG. 2A includes the function of a CPU that is achieved by a program. Here, the program includes not only a program that can be directly executed by the CPU, but also a program in source format, a compressed program, an encrypted program, and the like.

Figure 2B:
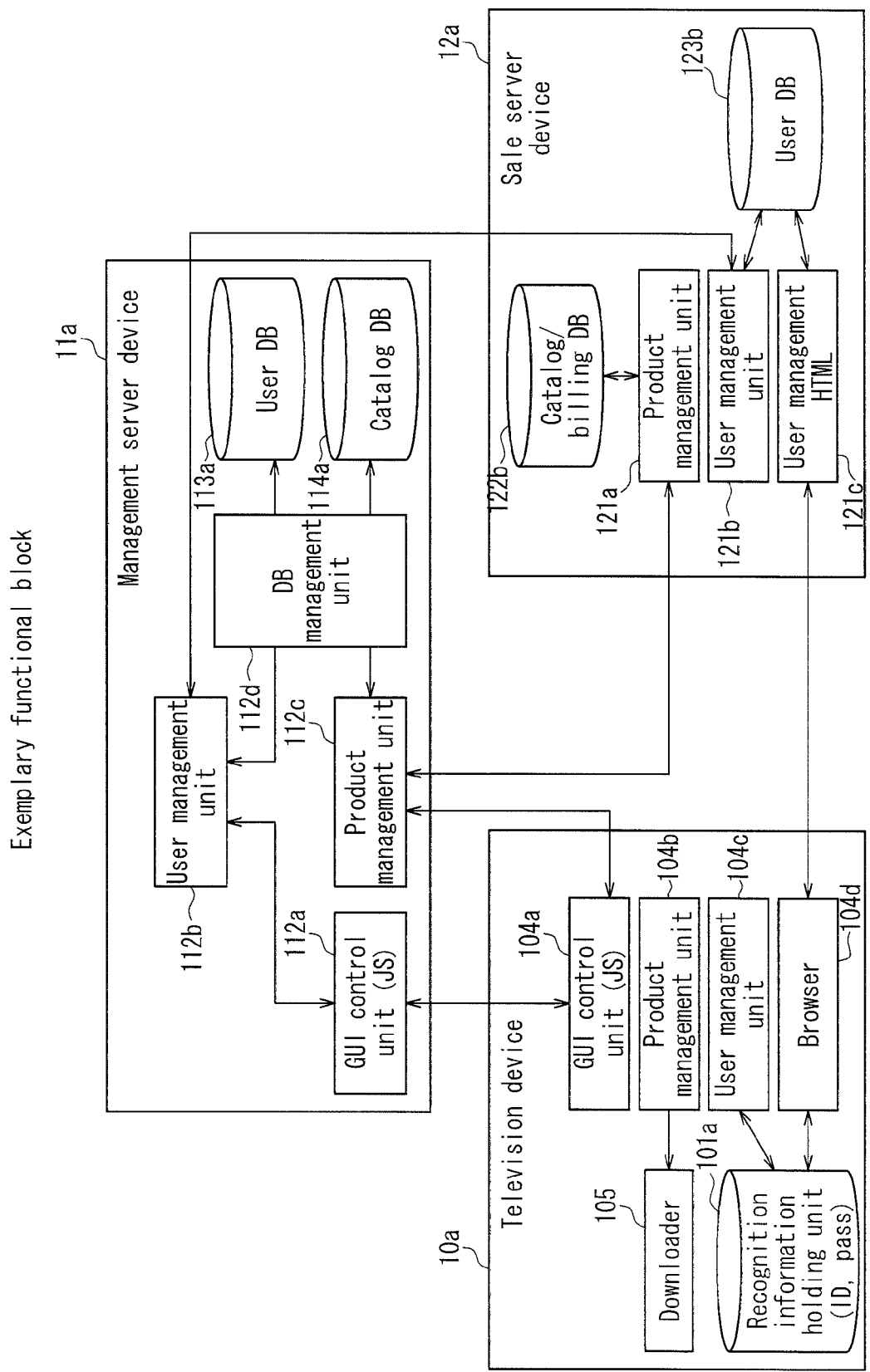
FIG. 2B is a diagram showing an exemplary functional block of the television system 1 according to the present invention.

FIG. 2B is a diagram showing an exemplary functional block diagram of the television system 1 in the case in which the television system is implemented to have a configuration of a different aspect from that of the television system 1 in FIG. 2A. The television system 1 shown in FIG. 2B is provided with a television device 10a, a management server device 11a, and a sale server device 12a.

The television device 10a is provided with a GUI control unit 104a (GUI graphical user interface), an product management unit 104b, a user management unit 104c, a browser 104d, a recognition information holding unit 101a, and a downloader 105. The function of the display control unit 104 shown in FIG. 2A includes the functions of the GUI control unit 104a, the product management unit 104b, the user management unit 104c, and the browser 104d shown in FIG. 2B. The function of the connection information holding unit 101 shown in FIG. 2A includes the function of the recognition information holding unit 101a.

The management server device 11a is provided with a GUI control unit 112a, a user management unit 112b, an product management unit 112c, a DB management unit 112d, a user database (DB) 113a, and a catalog database (DB) 114b. The functions of the connection information acquisition unit 111 and the display screen control unit 112 shown in FIG. 2A include the functions of the GUI control unit 112a, the user management unit 112b, the product management unit 112c, and the database (DB) management unit 112d shown in FIG. 2B. The function of the television device information holding unit 113 shown in FIG. 2A includes the function of the user database (DB) 113a shown in FIG. 2B. The function of the product information holding unit 114 shown in FIG. 2A includes the function of the catalog database (DB) 114a shown in FIG. 2B.

The sale server device 12a is provided with a catalog/billing database (DB) 122b, an product management unit 121a, a user management unit 121b, a user management HTML 121c, and a user database 123b. The function of the sale control unit 121 shown in FIG. 2A includes the functions of the product management unit 121a, the user management unit 121b, and the user management HTML 121c shown in FIG. 2B. The function of the pay product information holding unit 122 shown in FIG. 2A includes the function of the catalog/billing database (DB) 122b shown in FIG. 2B. The function of the user information holding unit 123 shown in FIG. 2A includes the function of the user database 123b shown in FIG. 2B.

1-3. Hardware Configuration 1-3-1. Exemplary Configuration of the Television Device 10

Figure 3:
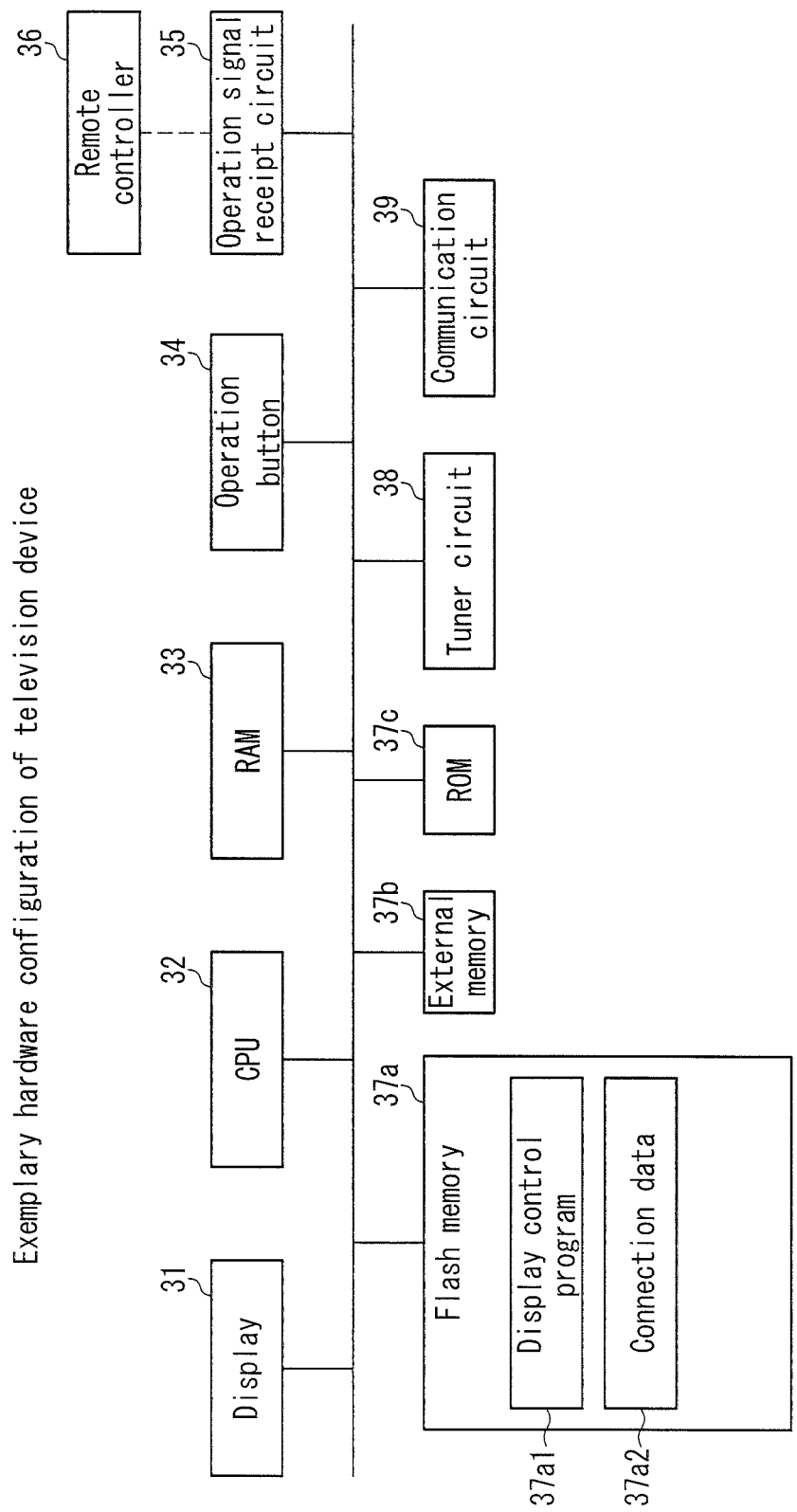
FIG. 3 is a diagram showing an exemplary hardware configuration of the television device 10 shown in FIG. 2A that is embodied by a CPU.

FIG. 3 is a diagram showing an exemplary hardware configuration of the television device 10 shown in FIG. 2 that is embodied using a CPU. For example, the television device 10 is a smart television that can connect to the network N. The television device 10 is provided with a display 31, a CPU 32, a RAM (Random Access Memory) 33, an operation button 34, an operation signal receipt circuit 35 capable of communicating with a remote controller 36, a flash memory 37a, an external memory 37b, a ROM (Read Only Memory) 37c, a tuner circuit 38, and a communication circuit 39.

The display 31 can display a video signal output from a display control program 37a1. The video signal that is output from the display control program 37a1 includes a video signal for television broadcast that is output from the tuner circuit 38. The CPU 32 can execute processing based on an OS and the display control program 37a1, using the RAM 33 and the like. The RAM 33 can provide an address space to the CPU 32 that executes the display control program 37a1.

The operation button 34 and the remote controller 36 can accept an entry operation by the user of the television device. The operation signal receipt circuit 35 can receive an operation signal that is output from the remote controller 36 that accepted an entry operation by the user. Note that the operation signal receipt circuit 35 may be configured to be able to send a data signal to the remote controller 36.

The flash memory 37a can hold the display control program 37a1, the connection data 37a2, and the like. The external memory 37b can hold various data. For example, the flash memory 37a can hold an application software program that was downloaded from the management server device 11. An SD memory card (trademark), for example, is an example of the external memory 37b. The ROM 37c can hold an OS (operating system, not shown in the drawing), a MAC address (Media Access Control address, not shown in the drawing), and the like. Note that the television device 10 may be provided with a hard disk (HDD: Hard Disk Drive), and the OS, the display control program 37a1, the connection data 37a2, and the like may be held within this hard disk.

The tuner circuit 38 can receive a television broadcast radio wave that is appropriate for a specific country area, via a receiving antenna. The communication circuit 39 can communicate with the management server device 11 via the network N, such as the Internet.

In one example, the display control unit 104 shown in FIG. 2A is specifically achieved by executing, on the CPU 32, information processing based on the display control program 37a1, for example. In one example, the screen display unit 102 is achieved by the display 31. In one example, the entry accepting unit 103 is achieved by the operation button 34 or the remote controller 36. In one example, the connection information holding unit 101 is one area of the flash memory 37a that holds the connection data 37a2.

Figure 4:
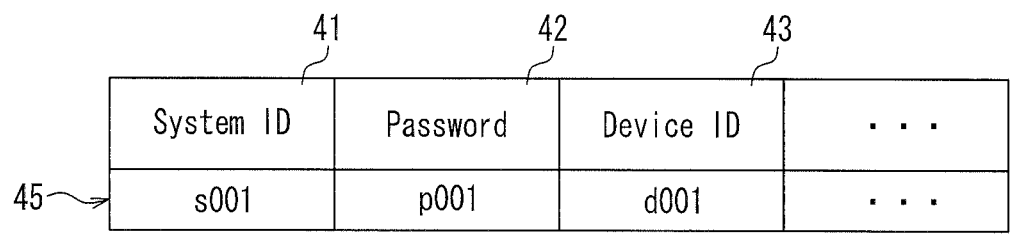
FIG. 4 is a diagram showing an example of connection data 37a2.

FIG. 4 is a diagram showing an example of the connection data 37a2. The connection data 37a2 includes a system ID 41, a password 42, a device ID 43, and so on. The system ID 41 is data for identifying the user who uses the television device 10, in communication between the television device 10 and the management server device 11.

Note that in an initial state in which the television device 10 has never been connected to the management server device 11, for example, the system ID 41 can be set to a NULL value at the time of shipping from the factory of the television device 10. In this case, the television device 10 connects to the management server device 11 using the system ID 41 that is the NULL value. The management server device 11, to which the television device 10 connects using the system ID 41 that is the NULL value, gives a temporary system ID to the television device 10. The television device 10 records the temporary system ID given by the management server device 11 as the system ID 41 in the connection data 37a2. The data of the system ID 41 thereby is updated from the NULL value to the temporary system ID. Here, the temporary system ID is identification data that is set for all of the plurality of television devices 10 in common. Thus, the television device 10 connects to the management server device 11 using the temporary system ID until a system ID is issued with which the user of the television device 10 can be identified as a result of user registration. In other words, when the user of the television device 10 performs user registration, the temporary system ID held as the system ID 41 is updated to a system ID that is unique identification data for identifying each user who uses the television device 10.

The password 42 is data for performing authentication of the user of the television device 10, in communication among the television device 10, the management server device 11, and the sale server device 12. The device ID 43 is data for identifying the television device 10, in communication between the television device 10 and the management server device 11. For example, the password 42 can be a NULL value at the time of shipping from the factory of the television device 10. The CPU 32 in the television device 10 sets data of the password 42 in the connection data 37$a$2 when, for example, the user who uses the television device 10 performs user registration.

As described above, the system ID 41 and the password 42 are set when the television device 10 connects to the management server device 11 or the sale server device 12.

The device ID 43 is an MAC address that was set at the time of shipping from the factory of the television device 10. Note that a hush value obtained by converting the aforementioned MAC address with a predetermined hush function may be used as the device ID 43. In this case, it is easy to prevent a third party from gaining unauthorized access by fraudulently using the MAC address.

For example, as shown in a record 45 in FIG. 4, the user having the system ID 41 of "s001" is associated with the password 42 of "p001", and is associated with the device ID 43 of "d001". Note that although the password 42 consists of a four-digit alphanumeric character string in the present embodiment, the number of digits and the character string are not limited thereto. For example, the password 42 may consist of an alphanumeric character string of four or more digits.

1-3-2. Exemplary Configuration of the Management Server Device 11

Figure 5:
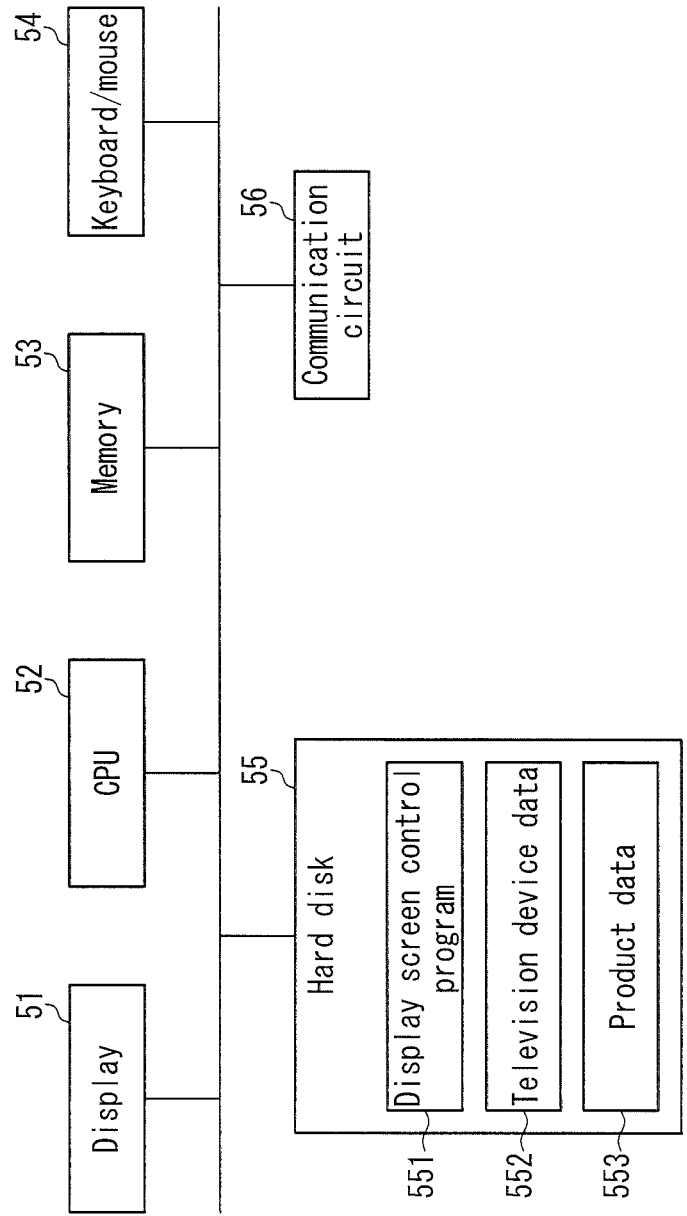
FIG. 5 is a diagram showing an exemplary hardware configuration of a management server device 11 shown in FIG. 2A that is achieved using a CPU.

FIG. 5 is a diagram showing an exemplary hardware configuration of the management server device 11 shown in FIG. 2 that is embodied using a CPU. The management server device 11 is a server/computer device that can connect to the network N, for example. The management server device 11 has a display 51, a CPU 52, a memory 53, a keyboard/mouse 54, a hard disk 55, and a communication circuit 56.

The display 51 can display various kinds of processing status of the management server device 11 on the screen. The CPU 52 can execute processing that is based on an OS and a display screen control program 551, using the memory 53 and the like. The memory 53 can provide an address space to the CPU 53 that executes the display screen control program 551. The keyboard/mouse 54 can output an operation signal to the CPU 52 in response to a user operation on the management server device 11. The hard disk 55 can hold an OS (operating system, not shown in the drawing), as well as the display screen control program 551, television device data 552, product data 553, and the like. The communication circuit 56 can communicate with the television device 10 or the sale server device 12 via the network N.

In one example, the connection information acquisition unit 111 and the display control unit 112 shown in FIG. 2A are specifically achieved by executing, on the CPU 52, information processing that is based on the display screen control program 551. Also, in one example, the television device information holding unit 113 is one area of the hard disk 55 that holds the television device data 552. Further, in one example, the product information holding unit 114 is one area of the hard disk 55 that holds the product data 553.

FIG. 6 is a diagram showing an example of the television device data 552. The television device data 552 includes a system ID 61, a sale user ID 62, a login ID 63, a PIN (Personal Identification Number) 64, a payment flag 65, a device ID (1) 66, a device ID (1) product ID 67, a device ID (2) 68, a device ID (2) product ID 69, and so on.

The system ID 61 is data for identifying the user who uses the television device 10, in communication between the television device 10 and the management server device 11. For example, the system ID 61 is set when the television device 10 connects to the management server device 11.

The sale user ID 62 is data for identifying the user who uses the television device 10, in communication between the management server device 11 and the sale server device 12. For example, the sale user ID 62 is set when the television device 10 connects to the management server device 11 and to the sale server device 12 and then the user who uses the television device 10 performs new registration (paying user registration process).

The login ID 63 is data for identifying the user who uses the television device 10, in communication among the television device 10, the management server device 11, and the sale server device 12. For example, the login ID 63 can be an e-mail address of the user. For example, the login ID 63 is set when the user who uses the television device 10 performs new registration (non-paying user registration process)

The PIN (Personal Identification Number) 64 is data for performing authentication of the user who uses the television device 10, in communication between the television device 10 and the management server device 11. For example, the login ID 63 is set when the user who uses the television device 10 performs new registration (non-paying user registration process).

The payment flag 65 is flag data for determining whether or not the user who uses the television device 10 has registered payment information, in communication between the management server device 11 and the sale server device 12. For example, the payment flag 65 is "T" (True) if the user has registered payment information, and is "F" (False) if the user has not registered payment information. For example, the payment flag 65 is set when the user who uses the television device 10 performs a new registration (paying user registration process).

The device ID (1) 66 and the device ID (2) 68 are data for identifying the television device 10, in communication between the television device 10 and the management server device 11. The device ID (1) 66 and the device ID (2) 68 indicate the respective television devices 10 used by the user who is identified based on the system ID 61. The device ID (1) product ID 67 is data indicating application software that is available on the television device 10 indicated by the device ID (1) 66. The device ID (2) product ID 69 is data indicating application software that is available on the television device 10 indicated by the device ID (2) 68. For example, the device ID (1) 66 and the device ID (2) 68 are set when the television devices 10 connect to the management server device 11.

Note that although only two device IDs, namely the device ID (1) 66 and the device ID (2) 68 are shown in FIG. 6, the television device data 552 may hold three or more device IDs. In other words, a single system ID may be associated with three or more television devices 10. Also, one or more product IDs can be held for each device ID. In other words, one television device 10 may be associated with two or more product IDs that indicate application software or the like.

For example, as shown in a record 60 in FIG. 6, the user having the system ID 61 of "s001" is associated with the sale user ID 62 of "h001", the login ID 63 of "g001@aaa.com", the PIN 64 of "11111", and the payment flag 65 of "T". Also, the user having the system ID 61 of "s001" is associated with the device ID (1) 66 of "d001" and the product IDs 67 of "001" and "002" of the device ID (1) 66 associated with "d001". Also, the user having the system ID 61 of "s001" is associated with the device ID (2) 68 of "d011" and the product ID 69 of "001" that is available on the device ID (2) 68 associated with "d011".

Note that although the PIN 64 consists of a five-digit numeric character string in the present embodiment, the number of digits and the character string are not limited thereto. For example, the PIN 64 may consist of a six-digit numeric character string. For example, the PIN 64 may be a personal identification code consisting of an alphabetic character string or an alphanumeric character string.

Also, it is preferable that the number of digits of the PIN 64 (a first code) be smaller than the number of digits of the password 42 (a second code). For example, it is preferable that the numeric character string that constitutes the PIN 64 be shorter than the alphanumeric character string that constitutes the password 42. In other words, an entry operation can be simplified by shortening the PIN 64, and a high level of security can be kept by lengthening the password 42. For example, if the number of digits of the PIN 64 is smaller than the number of digits of the password 42, the data volume of the character string that constitutes the PIN 64 is smaller than the data volume of the character string that constitutes the password 42.

FIG. 7 is a diagram showing an example of the product data 553. The product data 553 includes an product ID 71, an product type 72, a detailed description 73, a file name 74, size 75, and so on. The product ID 71 is data for identifying a product. The product type 72 is data for distinguishing the type of product. For example, the product type 72 includes "free hosted application software", "pay hosted application software", "free downloaded application software", "pay downloaded application software", "articles", and so on. The detailed description 73 is data for displaying a detailed description of an product identified based on the product ID 71 on a screen. The file name 74 is data indicating an entity file of an product whose the product type 72 is "free download application software" or "pay download application software". The size 75 is data indicating the volume of the entity file (free download application software or pay download application software) indicated by the file name 74.

For example, as shown in a record 70 in FIG. 7, the product having the product ID 71 of "001" is associated with the product type 72 of "free hosted application software", the detailed description 73 of "This product is . . . ", and the file name 74 of "a001.exe".

1-3-3. Exemplary Configuration of the Sale Server Device 12

Figure 8:
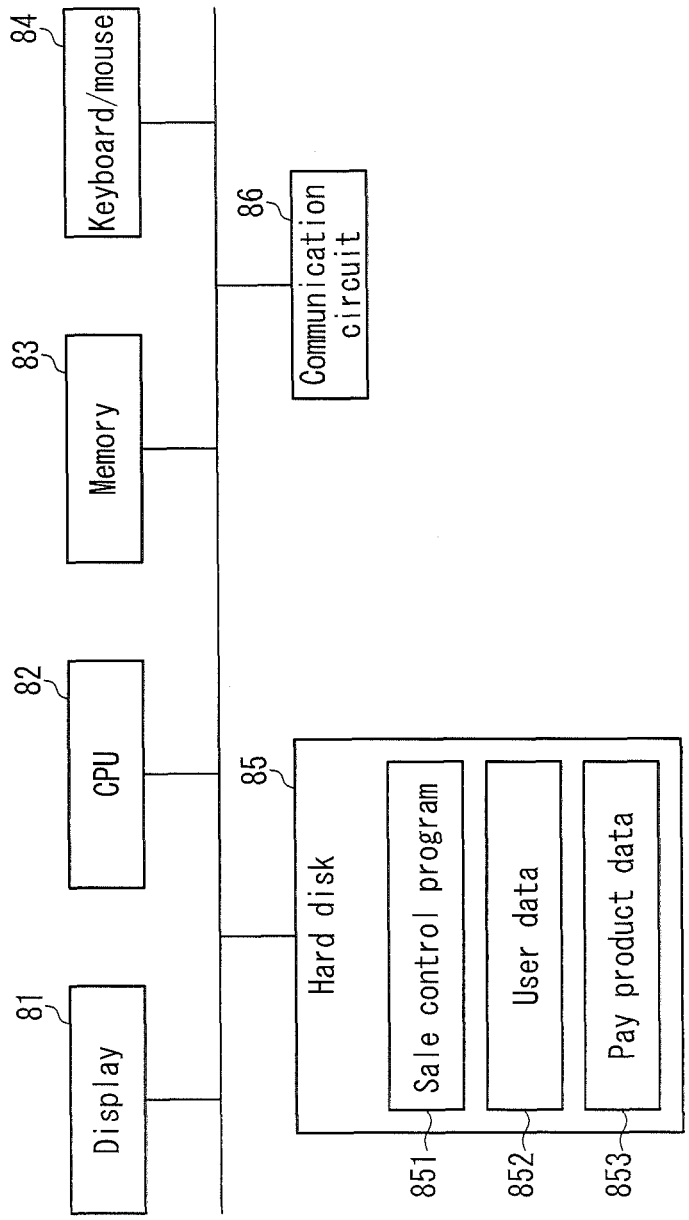
FIG. 8 is a diagram showing an exemplary hardware configuration of a sale server device 12 shown in FIG. 2A that is embodied by a CPU.

FIG. 8 is a diagram showing an exemplary hardware configuration of the sale server device 12 shown in FIG. 2 that is embodied using a CPU. The sale server device 12 is a server/computer device that can connect to the network N, for example. The sale server device 12 has a display 81, a CPU 82, a memory 83, a keyboard/mouse 84, a hard disk 85, and a communication circuit 86.

The display 81 can display various kinds of processing status of the sale server device 12 on the screen. The CPU 82 can execute processing that is based on an OS and a sale control program 851, using the memory 83 and the like. The memory 83 can provide an address space to the CPU 82 that executes the sale control program 851. The keyboard/mouse 84 can output an operation signal to the CPU 82 in response to a user operation on the sale server device 12. The hard disk 85 holds the OS (operating system, not shown in the drawing), as well as the sale control program 851, user data 852, and pay product data 853. The communication circuit 86 can communicate with the management server device 11 or the television device 10 via the network N.

In one example, the sale control unit 121 shown in FIG. 2 is specifically achieved by executing, on the CPU 82, information processing based on the sale control program 851. Also, in one example, the user information holding unit 123 is one area of the hard disk 85 that holds the user data 852. Further, in one example, the pay product information holding unit 122 is one area of the hard disk 85 that holds the pay product data 853.

FIG. 9 is a diagram showing an example of the user data 852 The user data 852 includes a sale user ID 91, a login ID 92, a password 93, payment information 94, a delivery address 95, purchase history 96, and so on. The sale user ID 91 is data for identifying the user who uses the television device 10, in communication between the management server device 11 and the sale server device 12. For example, the sale user ID 91 is set when the user who uses the television device 10 performs new registration (paying user registration process).

The login ID 92 is data for identifying the user who uses the television device 10, in communication among the television device 10, the management server device 11, and the sale server device 12. For example, the login ID 92 is set when the user who uses the television device 10 performs new registration (paying user registration process).

The password 93 is data for performing authentication of the user of the television device 10, in communication among the television device 10, the management server device 11, and the sale server device 12. For example, the password 93 is set when the user who uses the television device 10 performs new registration (paying user registration process).

The payment information 94 is data used in payment when the user who uses the television device 10 uses pay service. For example, the payment information 94 includes a credit card number issued by a credit company with whom the user made a contract in advance. The delivery address 95 is address data used when the user uses the service. For example, the delivery address 95 is an address to which the user who used mail order service wants an article to be delivered. For example, the payment information 94 and the delivery address 95 are set when the user who uses the television device 10 performs new registration (paying user registration process).

The purchase history 96 is data indicating the content of service used by the user in the past. For example, the purchase history 96 includes the date of purchase when an product is purchased through the mail order service, the product name, and the like. Also, for example, if the product is application software to be downloaded, the purchase history 96 includes data regarding downloading expiry and the number of times of downloading. For example, the purchase history 96 is set when the user who uses the television device 10 purchases an product (including free and pay products) using the mail order service.

For example, as shown in a record 90 in FIG. 9, the use for whom the sale user ID 91 of "h001" is set is associated with the login ID 92 of "g001@aaa.com" and the password 93 of "p001". Also, the user for whom the sale user ID 91 of "h001" is set is associated with the payment information 94 of "1234 . . . ", the delivery address 95 of "Osaka . . . ", and the purchase history 96 of "2011/1/31 . . . ".

FIG. 10 is a diagram showing an example of the pay product data 853. The pay product data 853 includes an product ID 75, a detailed description 76, a price 77, a file name 78, size 79, and so on. The product ID 75 is data for identifying an product (pay hosted application software, pay download application software, an article) that is handled as a pay product. The detailed description 76 is data for displaying a detailed description of the application software identified by the product ID 75 on a screen. The price 77 is data indicating a selling price of the product identified by the product ID 75. The file name 78 is data indicating an entity file of the product (pay download application software) identified by the product ID 75. The size 79 is data indicating a volume of the entity file (pay download application software) indicated by the file name 78.

For example, as shown in a record 80 in FIG. 10, the product (pay hosted application software) having the product ID 75 of "002" is associated with the detailed description 76 of "This product is . . . ", the price 77 of "200 yen", and the file name 78 of "a002.exe".

1-4. Example of Screen Processing

The screen processing in the present embodiment refers to processing for causing the television device 10 to display a screen including various images other than pictures of received television broadcasting on the display 31. The screen includes, for example, images of an icon menu (main menu) of executable application software, an product menu (market menu) for mail order, various kinds of settings menu, and the like. The CPU 32 in the television device 10 accesses the management server device 11 and requests a "(0) main menu screen", in response to a user operation.

When requesting the "(0) main menu screen" from the management server device 11, the CPU 32 in the television device 10 transmits the connection data 37a2 held in the hard disk 37 in the television device 10 to the management server device 11.

As described above, in an initial state in which the television device 10 has never been connected to the management server device 11, the connection data 37a2 does not hold the system ID 41 and the password 42. Therefore, for example, the CPU 32 transmits connection data in which a "NULL value" is set as the system ID 41, a "NULL value" is set as the password 42, and "d001" is set as the device ID 43, to the management server device 11. Note that upon the connection data being transmitted from the television device 10, the CPU 52 in the management server device 11 gives a temporary system ID, and records the temporary system ID and the device ID as the system ID 61 and the device ID (1) 67 in the television device data 552 (FIG. 6).

On the other hand, if the user who uses the television device 10 has performed user registration, the connection data 37a2 holds the password 42. Therefore, the CPU 32 transmits the connection data 37a2 including the system ID 41, the password 42, and the device ID 43 to the management server device 11. For example, as shown in the record 45 of the connection data 37a2 (FIG. 4), the CPU 32 transmits, to the management server device 11, "s001" as the system ID 41, "p001" as the password 42, and "d001" as the device ID 43, collectively as the connection data.

Note that the timing of the CPU 32 in the television device 10 transmitting the connection data to the management server device 11 is arbitrary. For example, the CPU 32 in the television device 10 can transmits the connection data 37a2 to the management server device 11 simultaneously with the request of the "(0) main menu screen" or at an arbitrary timing after the request.

Figure 11:
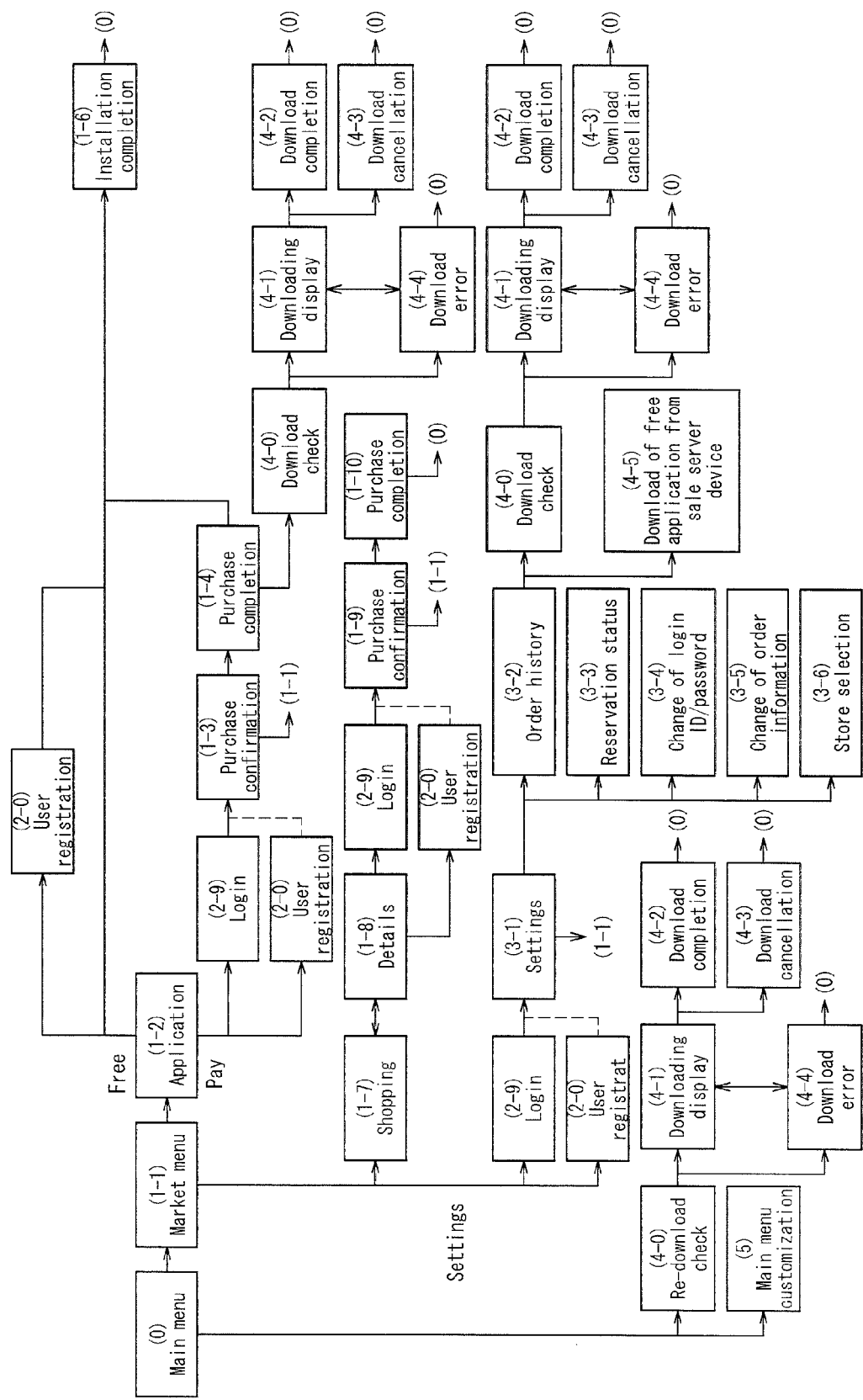
FIG. 11 is a diagram showing an example of screen transition in screen processing based on a display control program 37a1 (FIG. 3), a display screen control program 551 (FIG. 5), and a sale control program 851 (FIG. 8).

FIG. 11 is a diagram showing an example of screen transition in the screen processing based on the display control program 37a1 (FIG. 3), the display screen control program 551 (FIG. 5), and the sale control program 851 (FIG. 8). In FIG. 11, the "(0) main menu screen" is a screen that is the uppermost layer in the steps of screen transition. In other words, each screen is displayed as a result of transition from the "(0) main menu screen".

Figure 12:
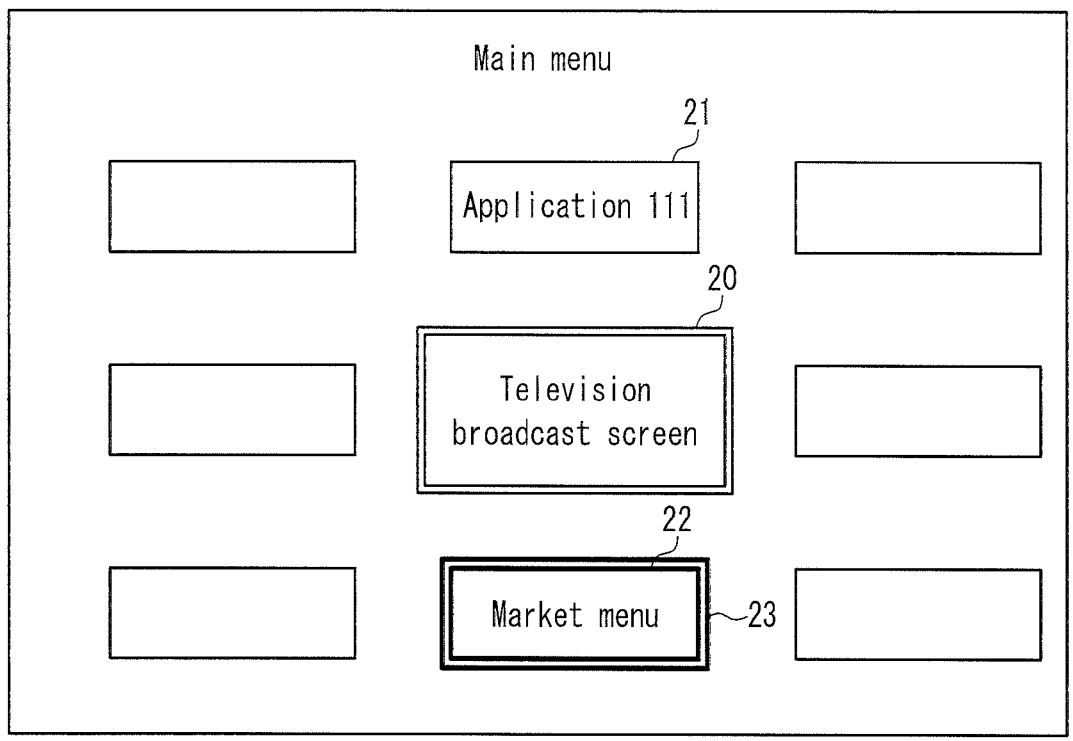
FIG. 12 is a diagram showing an example of a "(0) main menu screen".
Figure 13:
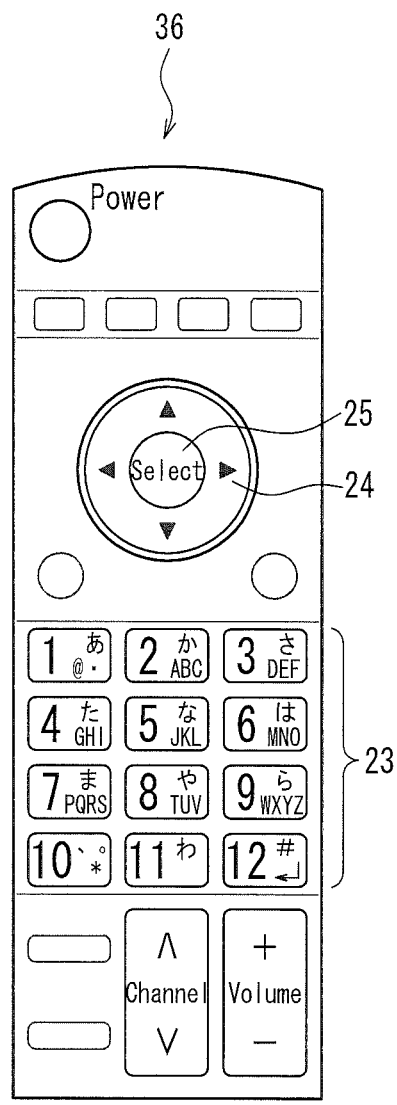
FIG. 13 is a diagram showing an exemplary appearance of a remote controller 36 operated by a user who uses the television device 10.

FIG. 12 is a diagram showing an example of the "(0) main menu screen. The "(0) main menu screen" includes a television broadcast screen 20, an application icon 21, and a market menu icon 22. The television broadcast screen 20 is a screen on which pictures are sequentially displayed that are based on a video signal output from the tuner circuit 38 in the television device 10 that received the television broadcast radio wave. The application icon 21 is an icon for executing application software that is available on the television device 10. As shown in FIG. 11, the market menu icon 22 is an icon for transitioning to a "(1-1) market menu screen" that is a lower layer than the "(0) main menu screen", FIG. 13 is a diagram showing an exemplary appearance of the remote controller 36 operated by the user who uses the television device 10. The remote controller 36 includes at least number/character entry keys 23, a direction key 24, and a select key 25. For example, the remote controller 36 is configured to be able to enter symbols such as numbers and characters.

On the "(0) main menu screen" shown in FIG. 12, the user operates, for example, the direction key 24 on the remote controller 36 and places an icon selection frame 23 on the market menu icon 22. Upon the user pressing the select key 25 in a state in which the icon selection frame 23 is placed on the market menu icon 22, the CPU 32 in the television device 10 displays the "(1-1) market menu screen". In the following description, the present specification refers to an act of the user pressing the select key 25 in a state in which the icon selection frame 23 is placed on any of icons or buttons simply as "to select" in some cases.

Note that the CPU 32 in the television device 10 may display the "(1-1) market menu screen" in the case where, for example, the user operates the direction key 24 on the remote controller 36 and presses the select key 25 in a state in which a cursor, which is not shown in the drawing, is superposed on the market menu icon 22.

Figure 14:
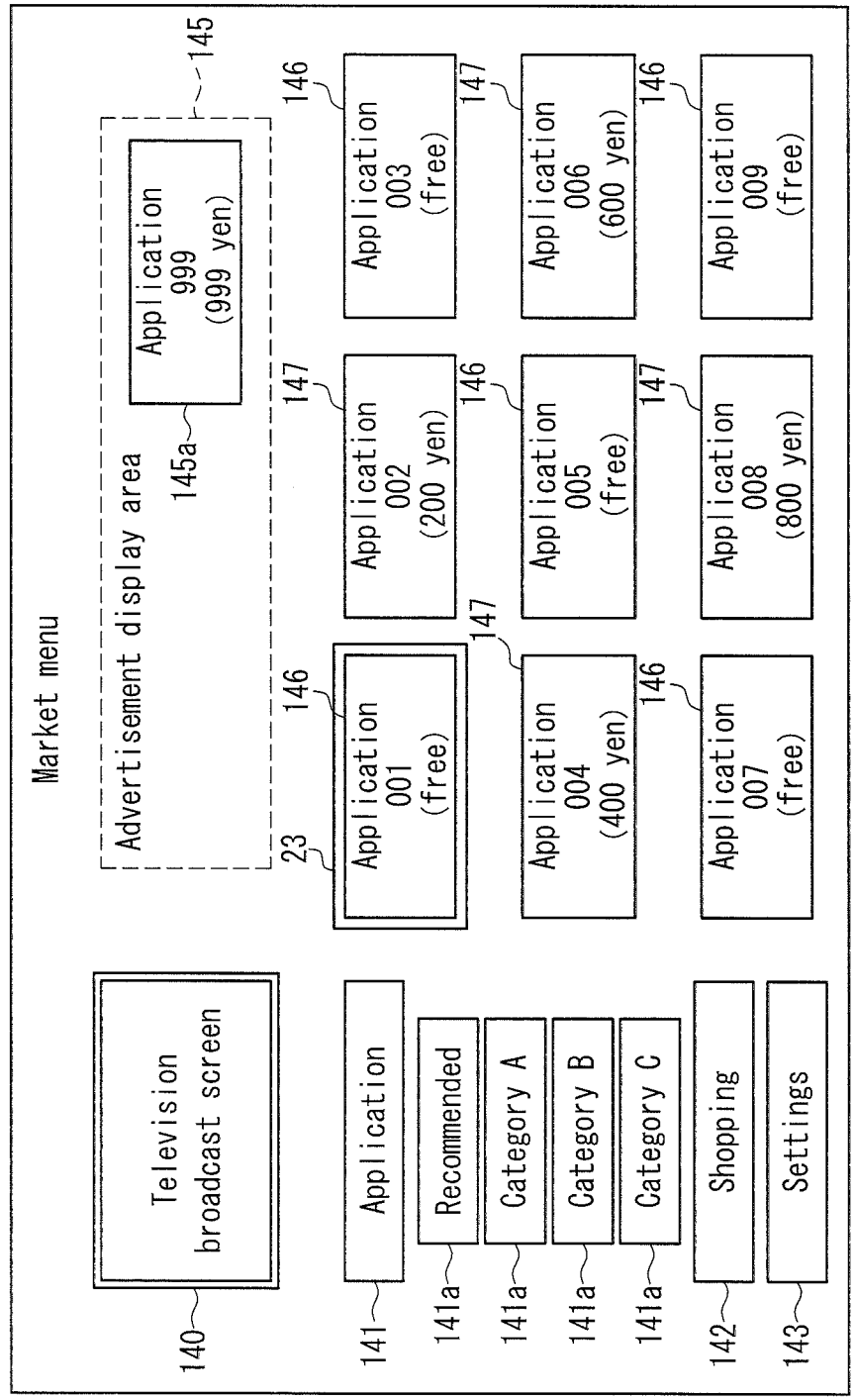
FIG. 14 is a diagram showing an example of a "(1-1) market menu screen".

FIG. 14 is a diagram showing an example of the "(1-1) market menu screen". The "(1-1) market menu screen" includes a television broadcast screen 140, an advertisement display area 145, an application icon 141, a shopping icon 142, a settings icon 143, free application icons 146, and pay application icons 147.

Each free application icon 146 is an icon indicating free hosted application software or free download application software. Each pay application icon 147 is an icon indicating pay hosted application software or pay download application software. The advertisement display area 145 includes an application icon 145a, which serves as an advertisement.

The "(1-1) market menu screen" includes category icons 141a below the application icon 141. The category icons 141a include icons for different categories such as "Recommended", "Category A", "Category B", and "Category C". Upon any one of the category icons 141a being selected, the television device 10 changes and displays application software corresponding to the free application icons 146 and to the pay application icons 147, in accordance with the type of the category icons 141a.

The free application icons 146 and the pay application icons 147 are created based on the records held in the aforementioned product data 553. For example, each free application icon 146 is created based on a record of the product ID whose product type 72 in the product data 553 is "free hosted application software" and "free downloaded application software".

On the other hand, for example, each pay application icon 147 is created based on a record of the product ID whose product type 72 in the product data 553 is "pay hosted application software" and "pay downloaded application software". Note that price information on the pay application icon 147 is acquired by referring to the pay product data 853 in the sale server device 12 based on the product ID.

On the "(1-1) market menu screen" shown in FIG. 14, the user operates the direction key 24 on the remote controller 36 and places the icon selection frame 23 on the "application 001 (free)" icon 146, for example. When the user presses the select key 25 in the state in which the icon selection frame 23 is placed on the "application 001 (free)" icon 146, the CPU 32 in the television device 10 displays a "(1-2) application screen".

Figure 15:
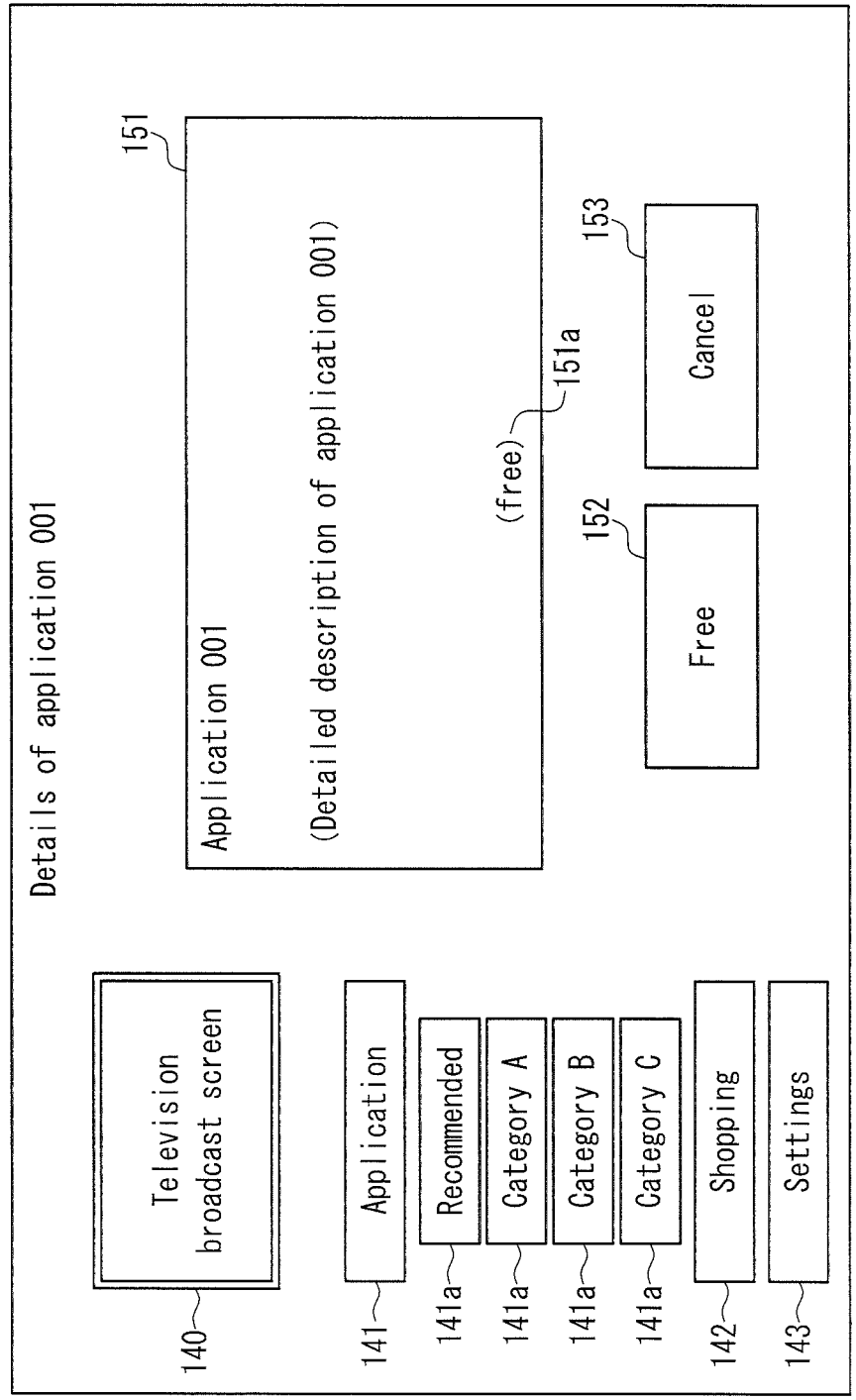
FIG. 15 is a diagram showing an example of a "(1-2) application screen".

FIG. 15 is a diagram showing an example of the "(1-2) application screen". As in FIG. 14, the "(1-2) application screen" includes the television broadcast screen 140, the application icon 141, the category icons 141*a*, the shopping icon 142, and the settings icon 143. The "(1-2) application screen" includes a detailed description screen 151 that is associated with the application icon 146 selected in FIG. 14. The detailed description screen 151 displays a detailed description of the application 001. Since the application 001 is free application software, the detailed description screen 151 may be displayed so as to include a display 151*a* indicating a free application in the detailed description.

The "(1-2) application screen" shown in FIG. 15 includes a "free" icon 152 for making an instruction to install the selected application software, and a "cancel" icon 153 for cancelling selection of the application software and returning to the "(1-1) market menu screen". Upon the "free" icon 152 being selected, the CPU 32 in the television device 10 transmits selection data including "001", which indicates the product ID of the application 001 associated with the "free" icon 152, to the management server device 11.

Figure 16:
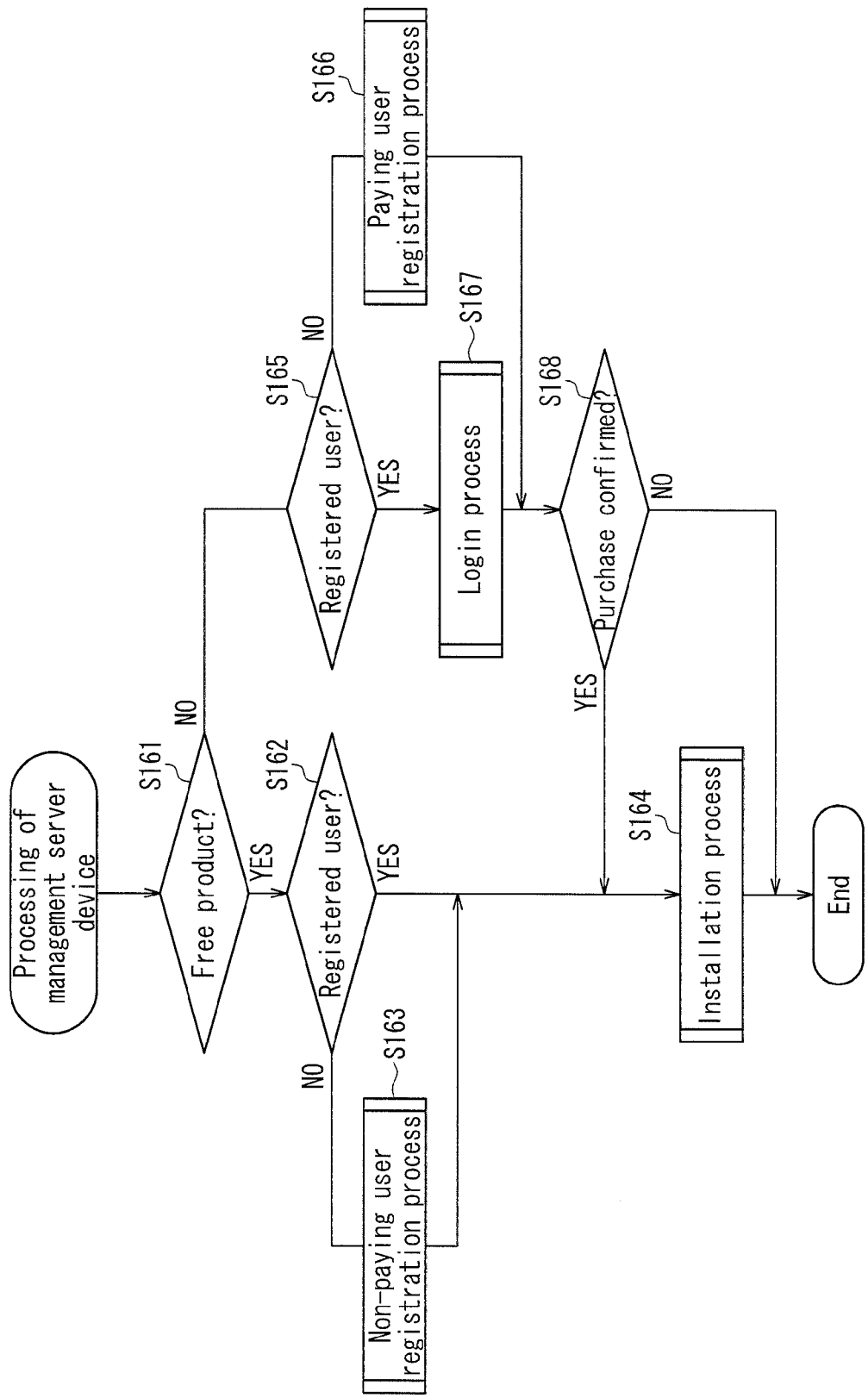
FIG. 16 is a diagram showing an exemplary flowchart of screen processing based on the display screen control program 551 (FIG. 5) of the management server device 11.

Upon the selection data being transmitted from the television device 10, the CPU 52 in the management server device 11 executes processing shown in FIG. 16. The television device 10 can thereby execute the selected application software. On the other hand, if the "cancel" icon 153 is selected, the CPU 52 in the management server device 11 causes the television device 10 again to display the "(1-1) market menu screen" shown in FIG. 14.

Note that the free application software includes "free hosted application software" or "free downloaded application software", as described above. In the case of installation of "free hosted application software", the CPU 52 in the management server device 11 configures various settings so that the television device 10 can execute "free hosted application software" on the management server device 11.

On the other hand, in the case of installation of "free downloaded application software", the CPU 52 in the management server device 11 causes the television device 10 to download "free downloaded application software", and performs processing so that "free downloaded application software" can be executed on the television device 10.

1-4-1. Example of Free Product

FIG. 16 is a diagram showing an exemplary flowchart of screen processing based on the display screen control program 551 (FIG. 5) of the management server device 11.

Upon the selection data indicating the product ID of the selected application software being transmitted from the television device 10, the CPU 52 in the management server device 11 determines whether or not the product ID received from the television device 10 indicates a free product (step S161).

For example, the CPU 52 refers to the product data 553 based on the product ID, and determines that the product corresponding to the product ID is a free product if the data of the product type 72 corresponding to the product ID is "free hosted application software" or "free downloaded application software". For example, the CPU 52 determines that the product corresponding to the product ID is a free product if the product ID corresponds to data of the product ID 71 of "001" or "003" in the product data 553 shown in FIG. 7 ("YES" determination in step S161).

Note that if the selection data indicating the product ID of the application software selected from the television device 10 includes flag data indicating a free product, the CPU 52 in the management server device 11 may determine whether or not the application software is a free product based on the flag data in the selection data.

1-4-1-1. Example of Registered User

If it is determined that the application software based on the product ID received from the television device 10 is a free product, the CPU 52 in the management server device 11 determines whether or not the user of the television device 10 is registered (step S162). For example, if the connection data transmitted from the television device 10 includes at least data related to a password, the CPU 52 can determine that the user of the television device 10 is registered ("YES" determination in step S162). Also, for example, if the password in the connection data transmitted from the television device 10 is not a NULL value, the CPU 52 can determine that the user of the television device 10 is registered.

Note that the CPU 52 may determine that the user of the television device 10 is registered if none of the system ID, the password, and the device ID included in the record of the connection data transmitted from the television device 10 is a NULL value. For example, the CPU 52 can determine that the user of the television device 10 is registered if data of "s001", "p001", and "d001" is included in the record of the connection data respectively as the system ID 41, the password 42, and the device ID 43, which are shown in the record 45 of the connection data 37*a*2 in FIG. 4.

Also, if, in the television device data 552, the payment flag corresponding to the system ID included in the record of the connection data transmitted from the television device 10 is "T", the CPU 52 can determine that the user of the television device 10 is registered because the payment information is registered.

1-4-1-2. Example of Non-Paying User Registration Process

On the other hand, for example, if at least data related to a password is not included in the connection data transmitted from the television device 10, the CPU 52 in the management server device 11 determines that the user of the television device 10 is not registered ("NO" determination in step S162). Also, for example, if the password in the connection data transmitted from the television device 10 is a NULL value, the CPU 52 may determine that the user of the television device 10 is not registered.

If the CPU 52 in the management server device 11 determines that the user of the television device 10 is not registered, it executes the non-paying user registration process (step S163).

Figure 17:
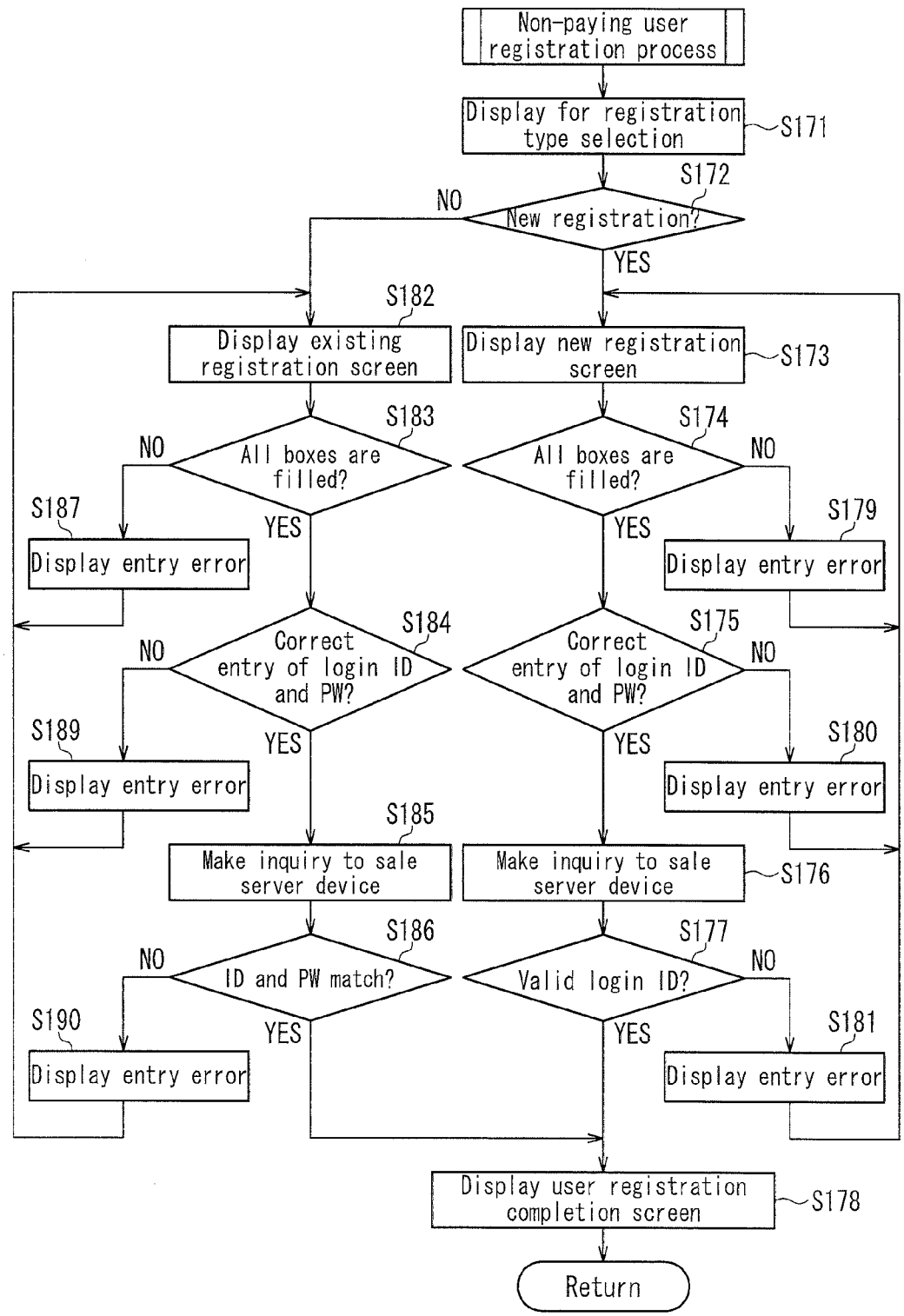
FIG. 17 is a diagram showing an exemplary flowchart of a non-paying user registration process.
Figure 18:
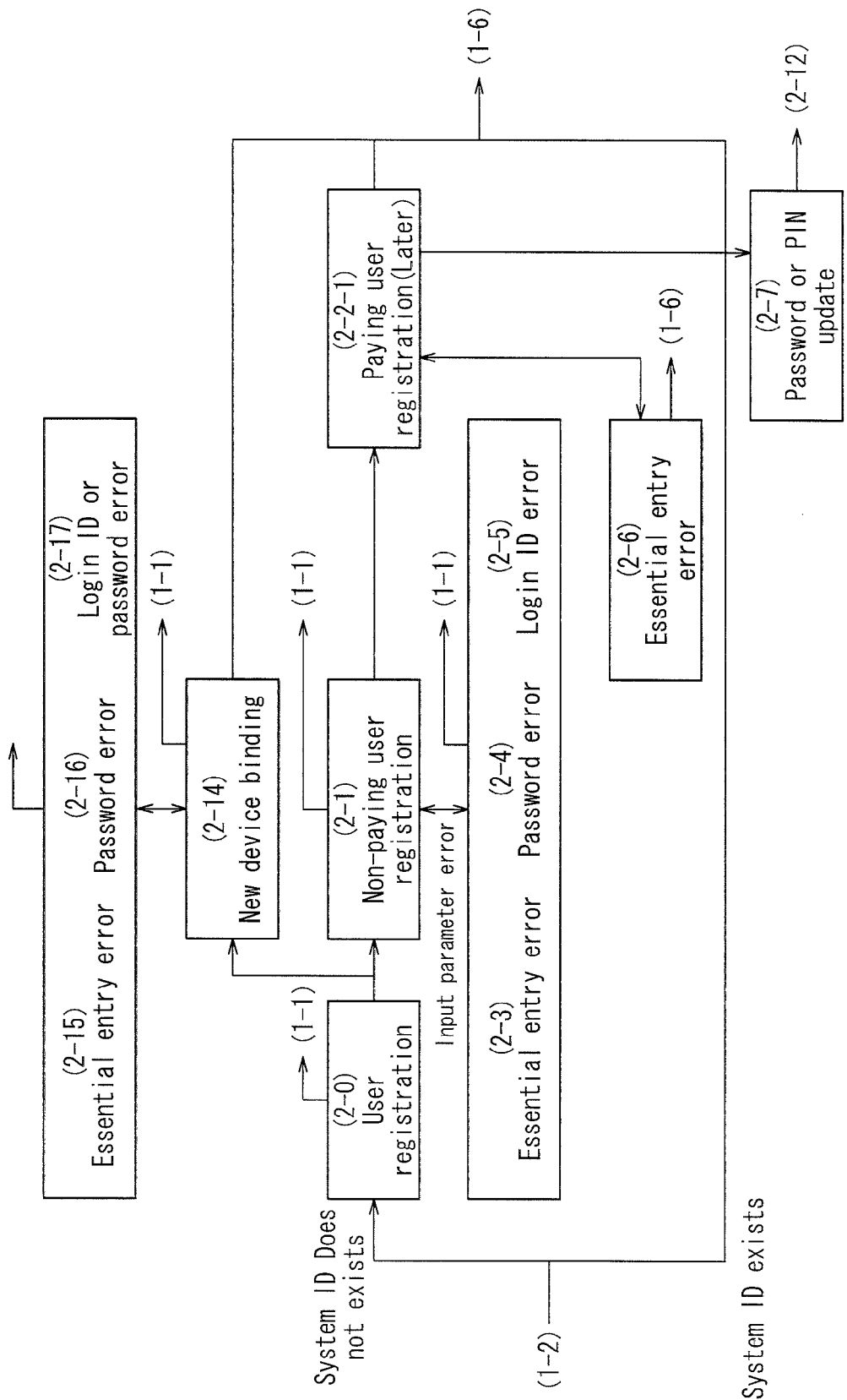
FIG. 18 is a diagram showing an example of screen transition corresponding to FIG. 17.
Figure 19:
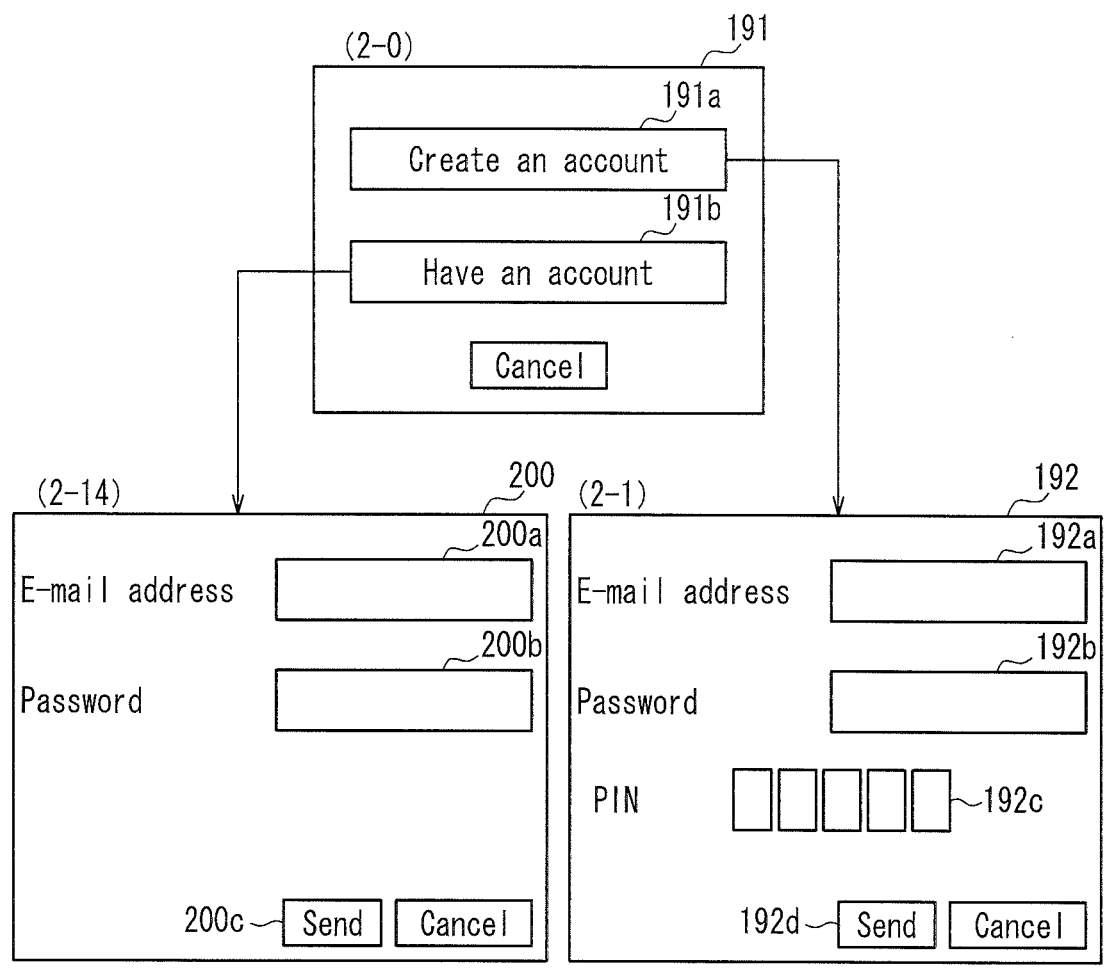
FIG. 19 is a diagram showing an example of screen transition in steps S171 to S173 and S182 in FIG. 17.

FIG. 17 is a diagram showing an exemplary flowchart of the non-paying user registration process. FIG. 18 is a diagram showing an example of screen transition corresponding to FIG. 17. FIG. 19 is a diagram showing an example of screen transition in steps S171 to S173 and S182 in FIG. 17.

The CPU 52 in the management server device 11 provides a display for registration type selection to check with the user whether or not to register a new account (step S171). Specifically, the CPU 52 causes the television device 10 to display a "(2-0) check screen (user registration screen)" 191 shown in FIG. 19. If the user selects a "create an account" icon 191*a*, the CPU 52 determines that new registration is to be performed ("YES" determination in step S172) and causes the television device 10 to display a "(2-1) new registration screen (non-paying user registration screen)" 192 (step S173).

On the other hand, if the user selects a "have an account" icon 191*b*, the CPU 52 determines that new registration is not to be performed ("NO" determination in step S172), and causes the television device 10 to display a "(2-14) existing registration screen (new device binding screen)" 200 (step S182).

Note that the "(2-1) new registration screen (non-paying user registration screen)" 192 is displayed on a screen executed by a program other than the program of the "(2-0) check screen (user registration screen)" 191. For example, the "(2-1) new registration screen (non-paying user registration screen)" 192 is displayed on a browser program executed on the CPU 32 in the television device 10. For example, the "(2-1) new registration screen (non-paying user registration screen)" 192 is displayed by executing, on this browser program, control processing of a web page containing JavaScript (trademark) acquired from the management server device 11. In this case, the management server device 11 can generate the aforementioned web page (control information) with Ajax (Asynchronous JavaScript+XML), for example.

(1) Example of New Registration

Figure 20A:
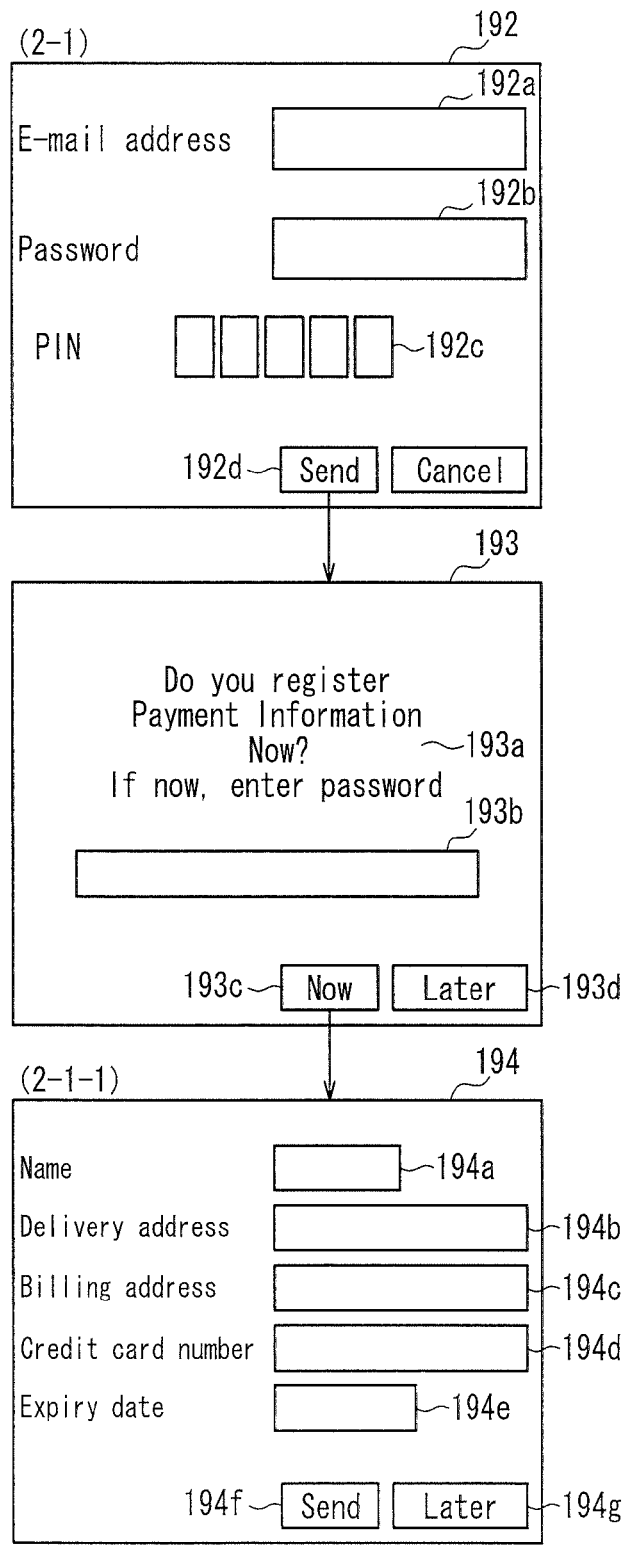
FIG. 20A is a diagram showing an example of screen transition in the case of new registration.
Figure 21:
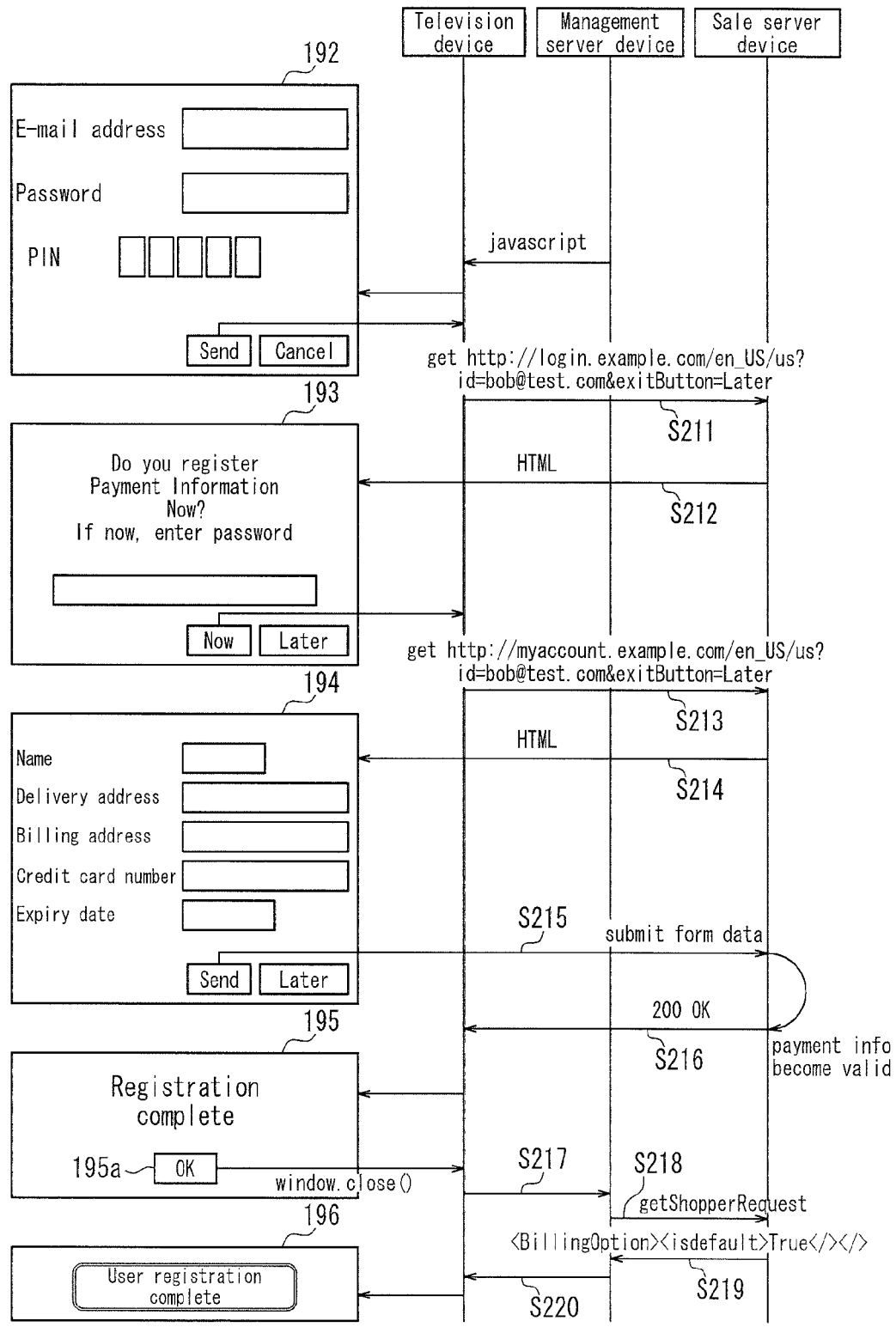
FIG. 21 is a diagram showing an exemplary sequence of sequential processes executed in the case of a new registration.

FIG. 20A is a diagram showing an example of screen transition in the case of new registration. FIG. 21 is a diagram showing an exemplary sequence of sequential processes executed in the case of new registration. Note that the processes from step S175 to step S176 in FIG. 17 will be described using the sequence in FIG. 21.

On the "(2-1) new registration screen (non-paying user registration screen)" 192 (FIG. 19), the user operates the number/character entry keys 23 or the like on the remote controller 36 (FIG. 13), for example, to enter an e-mail address in an e-mail address entry box 192*a*. Similarly, the user enters a password in a password entry box 192*b*, and enters a PIN (personal identification number) in a PIN entry box 192*c*. Note that the user can use arbitrary characters or numbers as the e-mail address, the password, and the PIN, under a predetermined entry condition.

Figure 20B:
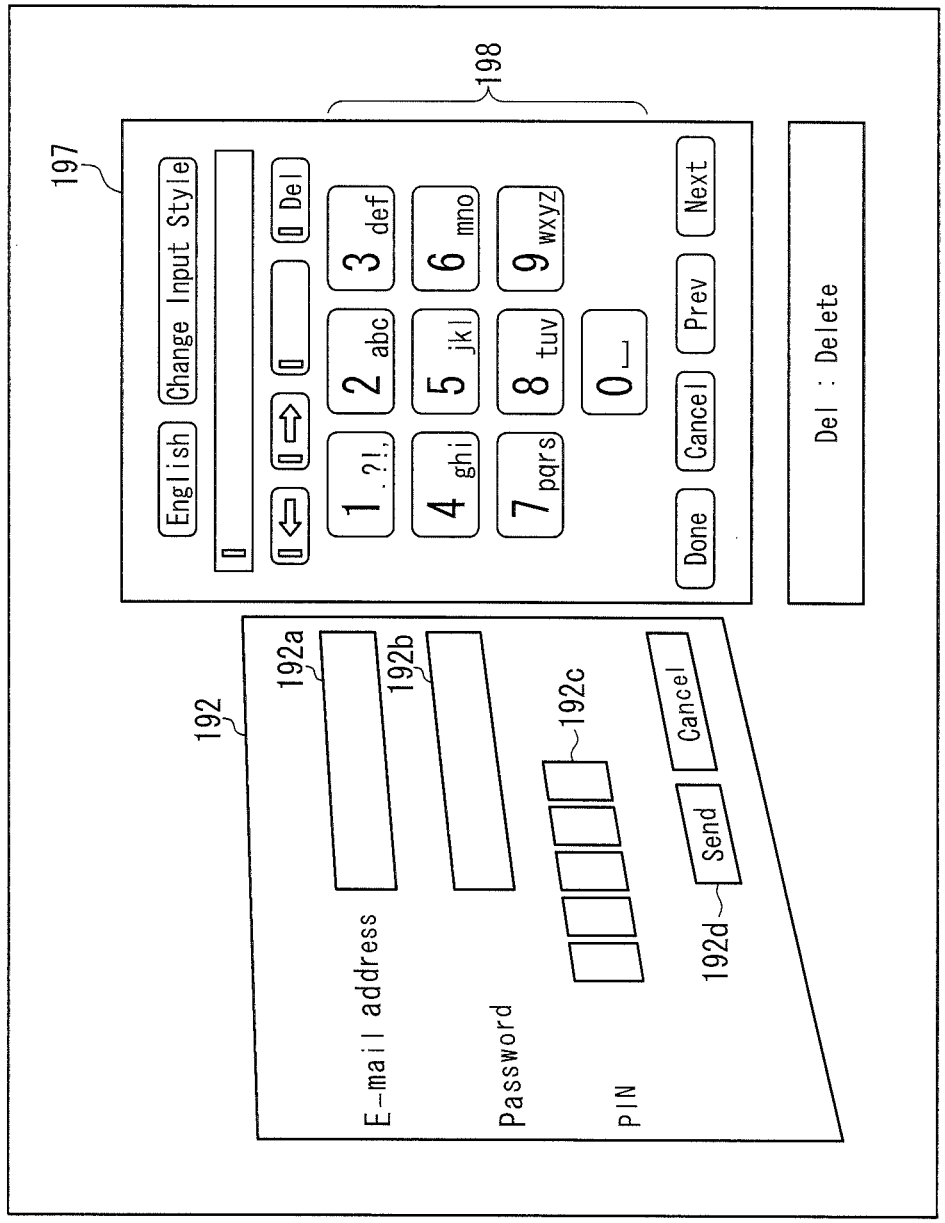
FIG. 20B is a diagram showing an example in the case of displaying a software keyboard.

Note that at the time of entry on the "(2-1) new registration screen (non-paying user registration screen)" 192, the user can operate a predetermined key (not shown in the drawing) on the remote controller 36, for example, to display a software keyboard 197 on the display 31 of the television device 10, as shown in FIG. 20B. For example, the user can enter the e-mail address and so on by selecting number/character entry keys 198 and the like displayed within the software keyboard 197, using the remote controller 36. Note that the software keyboard 197 can be used at any time at the time of entry on each screen.

Upon a "send" button 192*d* being pressed by the user who entered the e-mail address, the password, and the PIN to the "(2-1) new registration screen (non-paying user registration screen)" 192 (a user operation associated with a first process or a user operation associated with a second process), the CPU 32 in the television device 10 determines whether or not all boxes for entries are filled (step S174). For example, the CPU 32 can check the entries by executing control processing of a web page containing JavaScript (trademark) acquired from the management server device 11 on the "(2-1) new registration screen (non-paying user registration screen)" 192.

If the CPU 32 determines that not all boxes for the entries are filled ("NO" determination in step S174), it causes the television device 10 to display a screen (e.g., a "(2-3) essential entry error screen" in FIG. 18) that indicates an entry error (step S179) and returns to aforementioned step S173.

On the other hand, if the CPU 32 determines that all boxes for the entries are filled ("YES" determination in step S174), it further determines whether or not the e-mail address and the password (PW) satisfy a predetermined condition (step S175).

For example, the CPU 32 can determine whether or not the e-mail address that was entered above is not registered as the login ID 63 in the television device data 552 on the management server device 11. Also, for example, the CPU 32 can determine whether or not the password satisfies the predetermined condition, by executing control processing of a web page containing JavaScript (trademark) acquired from the management server device 11 on the "(2-1) new registration screen (non-paying user registration screen)" 192. The predetermined condition includes the number of entered characters of the password being eight or larger, for example.

If the e-mail address is already registered, or if the CPU 32 determines that the password does not satisfy the predetermined condition ("NO" determination in step S175), the CPU 32 causes the television device 10 to display a screen indicating an entry error (e.g., a "(2-5) login ID error screen" or a "(2-4) password error screen" in FIG. 18) (step S180) and returns to aforementioned step S173.

On the other hand, if the CPU 32 determines that the e-mail address and the password satisfy the predetermined condition ("YES" determination in step S175), it transmits data of the e-mail address entered in the e-mail address entry box 192*a* and data of the password entered in the password entry box 192*b* to the sale server device 12 (step S211 in FIG. 21) (i.e., accesses the second server to cause the second server to execute the second process).

Also, if the CPU 32 determines that the e-mail address and the password satisfy the predetermined condition ("YES" determination in step S175), it transmits the data of the e-mail address entered in the e-mail address entry box 192*a*, the data of the password entered in the password entry box 192*b*, and data of the PIN entered in the PIN entry box 192*c* to the management server device 11 (i.e., accesses the first server to cause the first server to execute the first process).

Upon the data indicating the e-mail address that serves as the login ID, the password, and the PIN being transmitted from the television device 10, the CPU 52 in the management server device 11 records the data indicating the login ID and the PIN as the login ID 63 and the PIN 64 in the television device data 552 (FIG. 6) in association with the system ID and the device ID (first process). Also, the CPU 52 records the data of the password transmitted from the television device 10 as the password 42 in the connection data 37*a*2 on the television device 10.

The CPU 82 in the sale server device 12 records the e-mail address and the password that are transmitted from the television device 10 as the login ID 92 and the password 93 in the user data 852 (second process). The CPU 82 in the sale server device 12 issues a unique sale user ID that is uniquely held, and records the issued sale user ID as the sale user ID 91 in association with the e-mail address and the password that are transmitted from the television device 10 (second process).

The CPU 82 in the sale server device 12 causes the television device 10 to display a "payment information registration check screen" 193 (FIG. 20A) (step S212 in FIG. 21) (second process). For example, the television device 10 can display the "payment information registration check screen" 193 by displaying HTML data (control information) acquired from the sale server device 12 on a browser program that is activated by JavaScript (trademark) acquired from the management server device 11.

The "payment information registration check screen" 193 includes a display 193*a* for checking with the user about registration of payment information, a password re-entry box 193b, a "now" button 193c to be pressed by the user who intends to register the payment information at this time, and a "later" button 193d to be pressed by the user who does not intend to register the payment information at this time. In other words, the user can press the "later" button 193d in order not to perform the paying user registration. On the other hand, the user can press the "now" button 193c in order to successively perform the non-paying user registration and the paying user registration.

Upon the user who intends to successively perform non-paying user registration and paying user registration entering the password in the password re-entry box 193b and pressing the "now" button 193c, the CPU 32 in the television device 10 transmits the password entered in the password re-entry box 193b to the sale server device 12 (step S213 in FIG. 21).

If the password transmitted from the television device 10 matches the password held as the password 93 in the user data 852 in aforementioned step S212, the CPU 82 in the sale server device 12 causes the television device 10 to display a "(2-2-1) paying user registration screen" 194 (step S214 in FIG. 21). For example, the television device 10 can display the "(2-2-1) paying user registration screen" 194 by displaying HTML data acquired from the sale server device 12 on a browser program that is activated by JavaScript (trademark) acquired from the management server device 11.

As shown in FIG. 20A, the "(2-2-1) paying user registration screen" 194 includes a name entry box 194a, a delivery address entry box 194b, a billing address entry box 194c, a credit card number entry box 194d, an expiry entry box 194e, a "send" button 194f, and a "later" button 194g.

On the "(2-2-1) paying user registration screen" 194, the user can press the "later" button 194g in order not to perform the paying user registration, as with the "payment information registration check screen" 193. On the other hand, the user can press the "send" button 194f in order to successively perform the non-paying user registration and the paying user registration.

Note that the television system 1 presented in the present embodiment can employ a configuration in which the "payment information registration check screen" 193 is not displayed on the television device 10. In other words, the television system 1 can employ a configuration in which the aforementioned processes in steps S212 and S213 are skipped, and step S214 is executed after step S211.

On the "(2-2-1) paying user registration screen" 194 shown in FIG. 20A, the user operates the number/character entry keys 23 or the like on the remote controller 36 (FIG. 13), for example, and enters the payment information (personal information or payment information of the user) in entry boxes 194a to 194e. Note that the CPU 32 can display the software keyboard 197 shown in FIG. 20B simultaneously with the "(2-2-1) paying user registration screen" 194 on the display 31. Use of the software keyboard 197 can improve usability for users when entering the payment information.

Upon the user entering the payment information in the entry boxes 194a to 194e and pressing the "send" button 194f (a user operation associated with the second process), the CPU 32 in the television device 10 transmits the payment information entered in the entry boxes 194a to 194e to the sale server device 12 (step S215 in FIG. 21) (i.e., accesses the second server to cause the second server to execute the second process). Note that if the user presses the "later" button 194g, the CPU 32 terminates the "(2-2-1) payment information entry screen" 194 and interrupts the payment information entry process.

Upon the payment information being transmitted from the television device 10, the CPU 82 in the sale server device 12 checks whether or not the payment information is proper (second process). For example, the CPU 82 checks with a server device or the like of the credit card company whether or not the credit card number included in the payment information is valid.

If the CPU 82 in the sale server device 12 determines that the payment information is valid, it records the payment information in the user data 852 (second process). For example, the CPU 82 records the data entered in the name entry box 194a, the credit card number entry box 194d, and the expiry entry box 194e on the "(2-2-1) paying user registration screen" 194 shown in FIG. 20A as the payment information 94 in the user data 852 (FIG. 9). Also, for example, the CPU 82 records the data entered in the delivery address entry box 194b on the "(2-2-1) paying user registration screen" 194 in FIG. 20A as the delivery address 95 in the user data 852 (FIG. 9).

Also, if the CPU 82 in the sale server device 12 determines that the payment information is valid, it transmits a "registration completion screen" 195 (FIG. 21) to the television device 10 (step S216 in FIG. 21) (second process). The "registration completion screen" 195 includes an "OK" button 195a with which the user confirms completion of payment information registration.

Upon the user pressing the "OK" button 195a, the CPU 32 in the television device 10 transmits information indicating completion of payment information registration to the management server device 11 (step S217 in FIG. 21) (i.e., transmits information indicating that the second process was finished to the first server). Note that if the CPU 82 in the sale server device 12 determines that the payment information is invalid, it transmits a screen indicating that the payment information is invalid (not shown in the drawing) to the television device 10.

If the information indicating completion of payment information registration is transmitted from the television device 10, or if the user presses the "later" button 193d on the "payment information registration check screen" 193 or the "later" button 194d on the "(2-2-1) paying user registration screen" 194, the CPU 52 in the management server device 11 transmits the login ID (e-mail address) and the password of the television device 10 to the sale server device 12, and makes an inquiry about whether or not the sale user ID of the user is validly registered (step S176 in FIG. 17, step S218 in FIG. 21) (i.e., transmits an inquiry about whether or not the second process for the user terminal was finished).

For example, the CPU 52 transmits the login ID (e-mail address) 92 held in the television device data 552 and the password 42 that are held in the connection data 37a2 on the television device 10 to the sale server device 12.

The reason that the CPU 52 in the management server device 11 makes an inquiry to the sale server device 12 about whether or not the sale user ID is validly registered is because the entry status on the "(2-2-1) paying user registration screen" 194 cannot be judged on the management server device 11 side. Accordingly, the CPU 52 in the management server device 11 makes an inquiry to the sale server device 12 about whether or not the sale user ID is validly registered, thereby being able to maintain consistency of the payment information of the user between the management server device 11 and the sale server device 12.

The CPU 82 in the sale server device 12 determines whether or not the login ID and the password transmitted from the management server device 11 exist in the user data 852 (FIG. 9). If the login ID and the password transmitted from the management server device 11 exist in the user data 852 (FIG. 9), the CPU 82 makes a reply with information including the sale user ID that is held in the user data 852 in association with the login ID and the password, to the management server device 11 (step S219 in FIG. 21) (i.e., transmits information indicating whether or not the second process for the user terminal was successful to the first server).

If the sale user ID is not contained in the reply from the sale server device 12 ("NO" determination in step S177), the CPU 52 in the management server device 11 causes the television device 10 to display a screen indicating an entry error (e.g., the "(2-5) login ID error screen" in FIG. 18) (step S181) and returns to aforementioned step S173.

On the other hand, if the sale user ID is contained in the reply from the sale server device 12 ("YES" determination in step S177), the CPU 52 in the management server device 11 records the sale user ID contained in the reply from the sale server device 12 as the sale user ID 62 in the television device data 552 in association with the login ID and the password transmitted to the sale server device 12.

Meanwhile, if the reply from the sale server device 12 contains the sale user ID ("YES" determination in step S177), the CPU 52 in the management server device 11 causes the television device 10 to display a "user registration completion screen" 196 (FIG. 21) (step S178 in FIG. 17 and step S220 in FIG. 21) (i.e., determines new control information and transmits the new control information to the user terminal). Note that the CPU 52 may omit a process of causing the television device 10 to display the "user registration completion screen" 196 (FIG. 21).

As described above, in the system of the present embodiment, the payment information data entered on the television device 10 is configured to be transmitted to the sale server device 12, rather than to the management server device 11. Therefore, among processes that constitute the sequential processes, a highly confidential process of handing highly confidential payment information (second process) can be executed only on the sale server device 12 side. Thus, the management server device 11 does not necessarily have to satisfy a certain security standard (e.g., PCIDSS).

Accordingly, the operator of the management server device 11 can outsource the highly confidential process (second process) to the operator of the sale server device 12. Thus, development of the management server device 11 can be advanced, focusing on processes in which confidentiality is not so required (first process) among the processes that constitute the sequential processes. Accordingly, the operator of the management server device 11 can suppress system development costs, and can shorten the time taken for development. Also, the operator of the management server device 11 can suppress system development costs by locally outsourcing the highly confidential process among the processes that constitute the sequential processes.

Also, the operator of the management server device 11 flexibly can handle alteration and expansion of the processes in which confidentiality is not so required. In other words, the operator of the management server device 11 can improve the expandability and flexibility of the overall system.

Furthermore, the television device 10 executes control processing using a web page (control information) containing JavaScript (trademark) acquired from the management server device 11 or the sale server device 12. Therefore, it is easy to achieve seamless cooperation between processing of the management server device 11 and the sale server device 12.

(2) Example of Existing Registration

Figure 22:
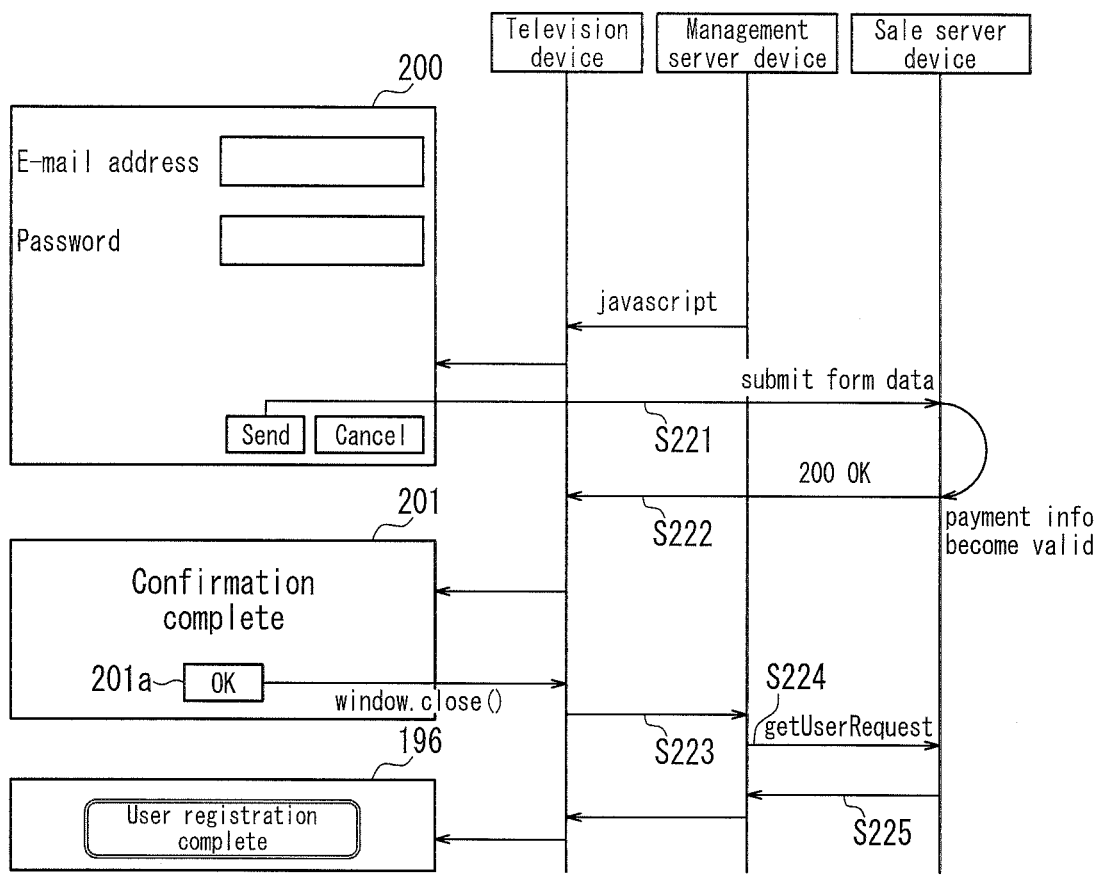
FIG. 22 is a diagram showing an exemplary sequence in the case of an existing registration.

FIG. 22 is a diagram showing an exemplary sequence in the case of existing registration ("NO" determination in step S172 in FIG. 17). On the "(2-14) existing registration screen (new device binding screen)" 200 shown in FIG. 19, the user operates the number/character entry keys 23 or the like (FIG. 13) on the remote controller 36, for example, and enters an e-mail address in an e-mail address entry box 200a. Similarly, the user enters a password in a password entry box 200b. Note that the CPU 32 can display the software keyboard shown in FIG. 20B simultaneously with the "(2-14) existing registration screen (new device binding screen)" 200 on the display 31.

Upon the "send" button 200c being pressed by a user operation, the CPU 32 in the television device 10 determines whether or not all boxes for entries are filled (step S183 in FIG. 17). For example, the CPU 32 can check the entries by executing control processing of a web page containing JavaScript (trademark) acquired from the management server device 11 on the "(2-14) existing registration screen (new device binding screen)" 200.

If the CPU 32 determines that not all boxes for the entries are filled ("NO" determination in step S183), it causes the television device 10 to display a screen indicating an entry error (e.g., a "(2-15) essential entry error screen" in FIG. 18) (step S187) and returns to aforementioned S182.

On the other hand, if the CPU 32 determines that all boxes for the entries are filled ("YES" determination in step S173), it further determines whether or not the e-mail address and the password (PW) satisfy a predetermined condition (step S184). For example, the CPU 32 can determine whether or not the e-mail address that was entered above is registered as the login ID 63 in the television device data 552 on the management server device 11.

Further, for example, the CPU 32 can determine whether or not the password satisfies the predetermined condition by executing control processing of a web page containing JavaScript (trademark) acquired from the management server device 11 on the "(2-14) existing registration screen (new device binding screen)" 200. The predetermined condition includes the number of entered characters of the password being eight or larger, for example.

If the e-mail address is not registered, or if the CPU 32 determines that the password does not satisfy the predetermined condition ("NO" determination in step S184), the CPU 32 causes the television device 10 to display a screen indicating an entry error (e.g., a "(2-17) login ID or password error screen" or a "(2-16) password error screen" in FIG. 18) (step S189), and returns to aforementioned step S182.

On the other hand, if the CPU 32 determines that the password satisfies the predetermined condition ("YES" determination in step S185), it transmits the e-mail address entered in the e-mail address entry box 200a and the password entered in the password entry box 200b to the sale server device 12 and makes an inquiry about whether or not the sale user ID of the user is validly registered (step S221 in FIG. 22).

The CPU 82 in the sale server device 12 determines whether or not the login ID and the password transmitted from the management server device 11 exist in the user data 852 (FIG. 9). If the login ID and the password (PW) transmitted from the management server device 11 exist in the user data 852 (FIG. 9), the CPU 82 causes the television device 10 to display a "registration completion screen" 201 (step S222 in FIG. 22).

The "registration completion screen" 201 includes an "OK" button 201a with which the user confirms completion of payment information registration. Upon the user pressing the "OK" button 201a, the CPU 32 in the television device 10 transmits information indicating that registration confirmation by the user is complete to the management server device 11 (step S223 in FIG. 22).

The CPU 52 in the management server device 11 makes an inquiry to the sale server device 12 about whether or not the login ID (e-mail address) and the password are valid, based on the information transmitted from the television device 10 (step S185 in FIG. 17, step S224 in FIG. 22).

The CPU 82 in the sale server device 12 determines whether or not the login ID and the password transmitted from the management server device 11 exist in the user data 852 (FIG. 9). If the login ID and the password (PW) transmitted from the management server device 11 exist in the user data 852 (FIG. 9), the CPU 82 makes a reply with information including the sale user ID that is held in the user data 852 in association with the login ID and the password, to the management server device 11 (step S225 in FIG. 22).

If the reply from the sale server device 12 does not contain the sale user ID ("NO" determination in step S186), the CPU 52 in the management server device 11 causes the television device 10 to display a screen indicating an entry error (e.g., the "(2-17) login ID or password error screen" in FIG. 18) (step S190) and returns to aforementioned step S182.

On the other hand, if the reply from the sale server device 12 contains the sale user ID ("YES" determination in step S186), the CPU 52 in the management server device 11 records the sale user ID contained in the reply from the sale server device 12 as the sale user ID 62 in the television device data 552 in association with the login ID and the password transmitted to the sale server device 12.

Also, if the reply from the sale server device 12 contains the sale user ID ("YES" determination in step S186), the CPU 52 in the management server device 11 causes the television device 10 to display the "user registration completion screen" 196 (FIG. 22) (step S178 in FIG. 17 and step S220 in FIG. 21). Note that the CPU 52 may omit a process of causing the television device 10 to display the "user registration completion screen" 196 (FIG. 22).

1-4-1-3. Example of Installation Process

If the user is registered in step S162 shown in FIG. 16, or if the non-paying user registration process shown in step S163 was finished, the CPU 52 in the management server device 11 executes a process of installing application software (step S164). For example, in the case of hosted application software for which a right to execute application software on a remote server is purchased, the CPU 52 sets the execution right so that the application software can be executed on the television device 10. Specifically, the CPU 52 records the product ID in the record corresponding to the device ID of the television device 10 in the television device data 552 shown in FIG. 6. For example, the CPU 52 records the product ID data of "001" as the device (1) application 67 corresponding to the device ID (1) of "d001" in the record 60.

Also, in the case of downloaded application software that is application software on a server to be downloaded on the television device 10, the CPU 52 causes the television device 10 to download the application software and to record the downloaded application software in, for example, the external memory 37b (FIG. 3) of the television device 10.

Figure 23:
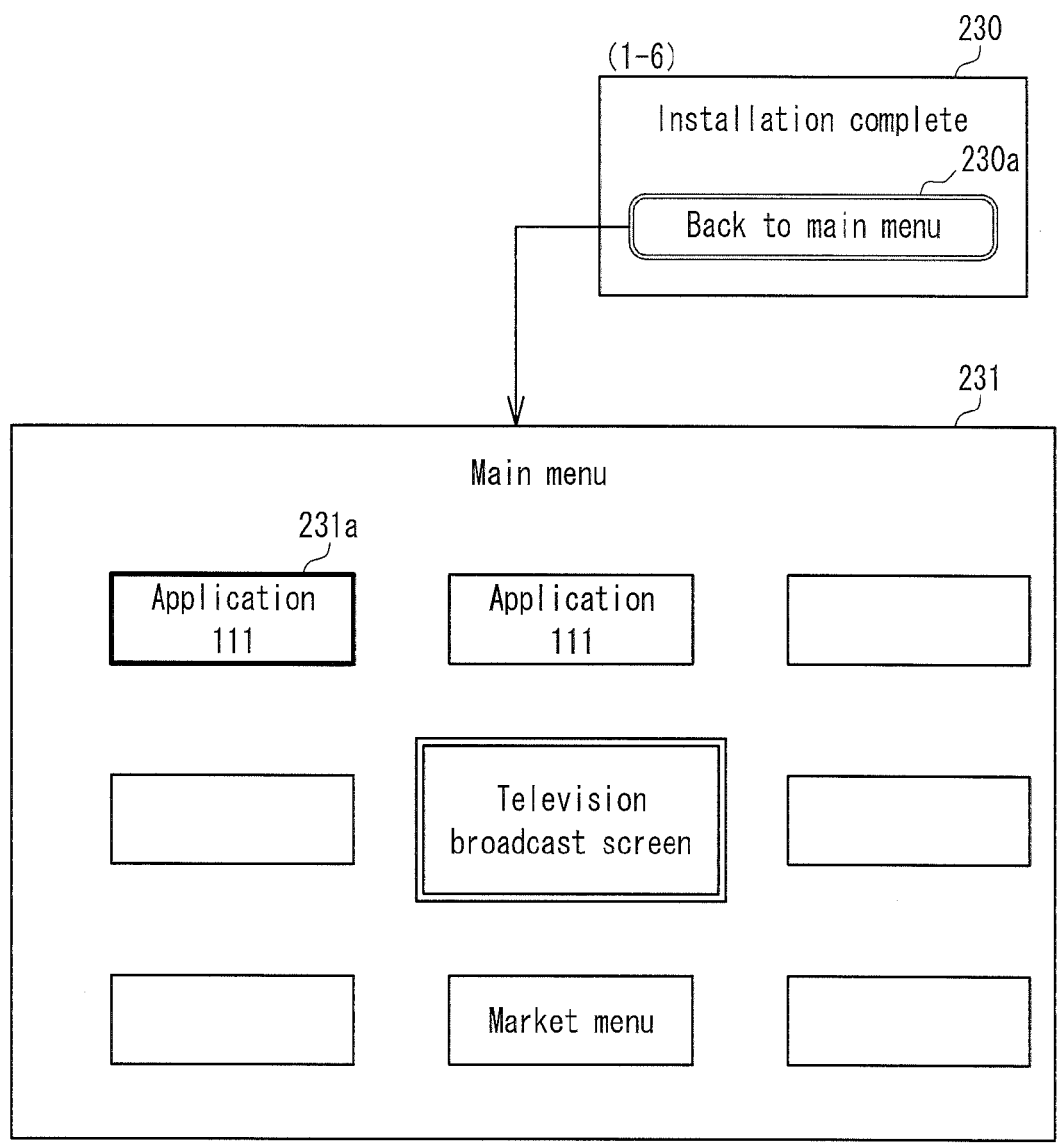
FIG. 23 is a diagram showing an example of a "(1-6) installation completion screen" 230 and a "(0) main menu screen" 231.

After completing installation of the application software, the CPU 52 causes the television device 10 to display a "(1-6) installation completion screen" 230 shown in FIG. 23. Upon the user pressing a "back to main menu" button 230a displayed on the "(1-6) installation completion screen", the CPU 52 causes the television device 10 to display the "(0) main menu screen" 231 in FIG. 23, for example. As shown in FIG. 23, the "(0) main menu screen" 231 is updated so as to include an icon 231a of the application 001 selected by the user in FIG. 14.

The television system 1 of the present embodiment prompts the user to select an product (including application software) prior to the user registration process or the login process. It is therefore easy for the television system 1 to prompt user registration.

1-4-1-4. Other Modes

Figure 24:
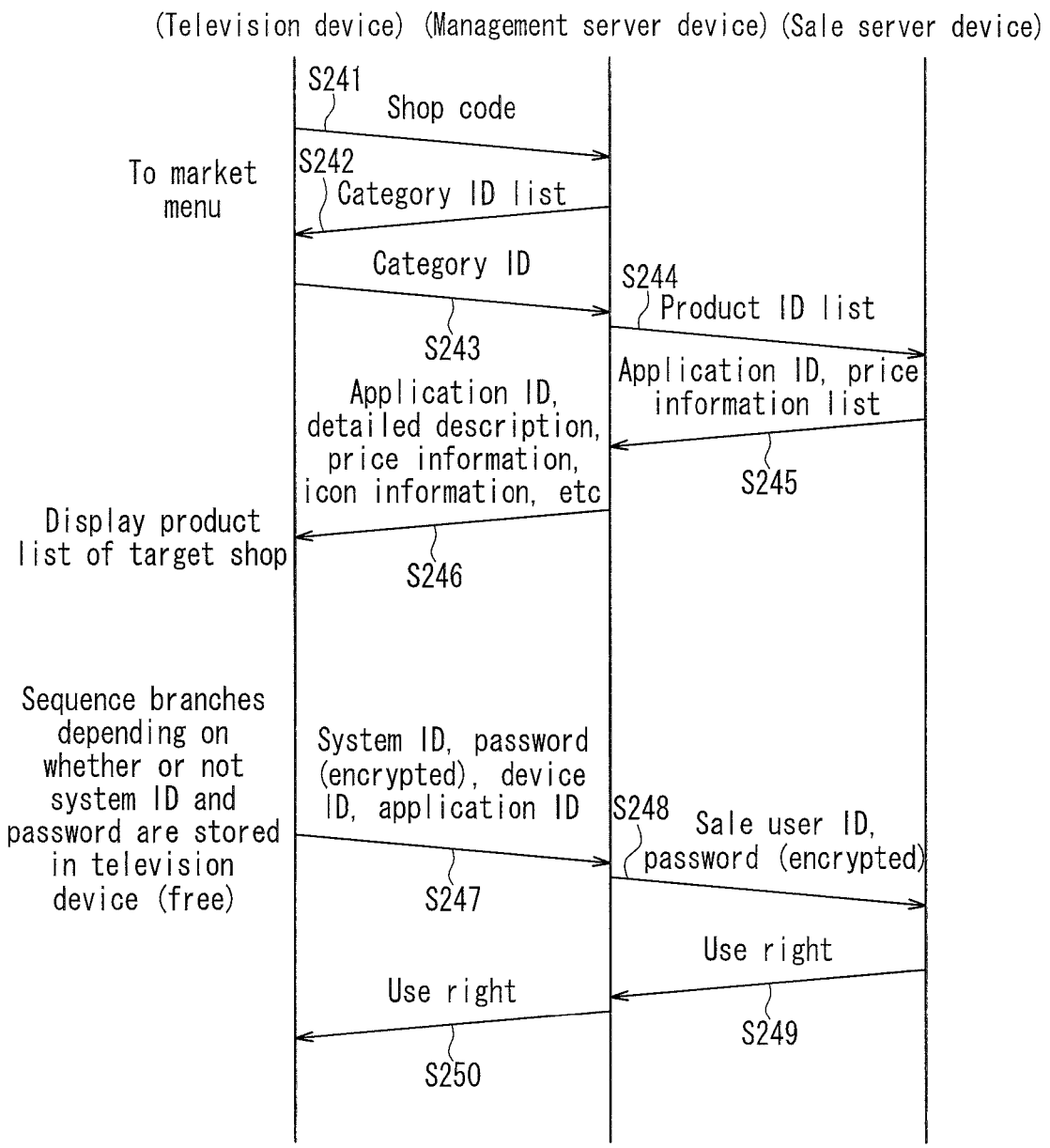
FIG. 24 is a diagram showing an exemplary sequence in the case of installing hosted application software.

FIG. 24 is a diagram showing an exemplary sequence in the case of installing hosted application software. In the mode shown in FIG. 24, the product data 553 held in the hard disk 55 in the management server device 11 in the above description is held in the hard disk 85 in the sale server device 12.

The television device 10 transmits a shop code to the management server device (step S241). The shop code refers to a code indicating a shop that exists in each area where mail order is available.

The management server device 11 transmits a category ID list to the television device 10 (step S242). The category IDs are for identifying the category icons 141a shown in FIG. 14. Upon category icons 141a being selected on the television device 10, the television device 10 transmits the category ID corresponding to the category icon 141 to the management server device 11 (step S243). The management server device 11 makes an inquiry to the sale server device 12 about the product ID included in the category ID (step S244).

The sale server device 12 makes a reply with the product ID, price information, and the like, to the management server device 11 (step S245). The management server device 11 transmits the product ID, a detailed description, the price information, icon information, and the like to the television device 10 (step S246).

The television device 10 displays the product ID, the detailed description, the price information, the icon information, and the like that are transmitted from the management server device 11, on the "(1-1) market menu screen". Upon the user selecting an application icon 145a on the "(1-1) market menu screen", the television device 10 transmits the system ID, the password (encrypted), the device ID, the product ID, and the like to the management server device 11 (step S247). The management server device 11 transmits the sale user ID and the password (encrypted) to the sale server device 12 (step S248).

The sale server device 12 transmits information indicating the right to use the application software corresponding to the product ID to the management server device 11 (step S249). The management server device 11 transmits information indicating the right to use the application software corresponding to the product ID to the television device 10 (step S250).

1-4-2. Example of Pay Product

Upon the user selecting an "application 002 (pay)" icon 147 on the "(1-1) market menu screen" shown in FIG. 14, the CPU 32 in the television device 10 displays the "(1-2) application screen" related to an "application 002 (pay)".

Figure 25:
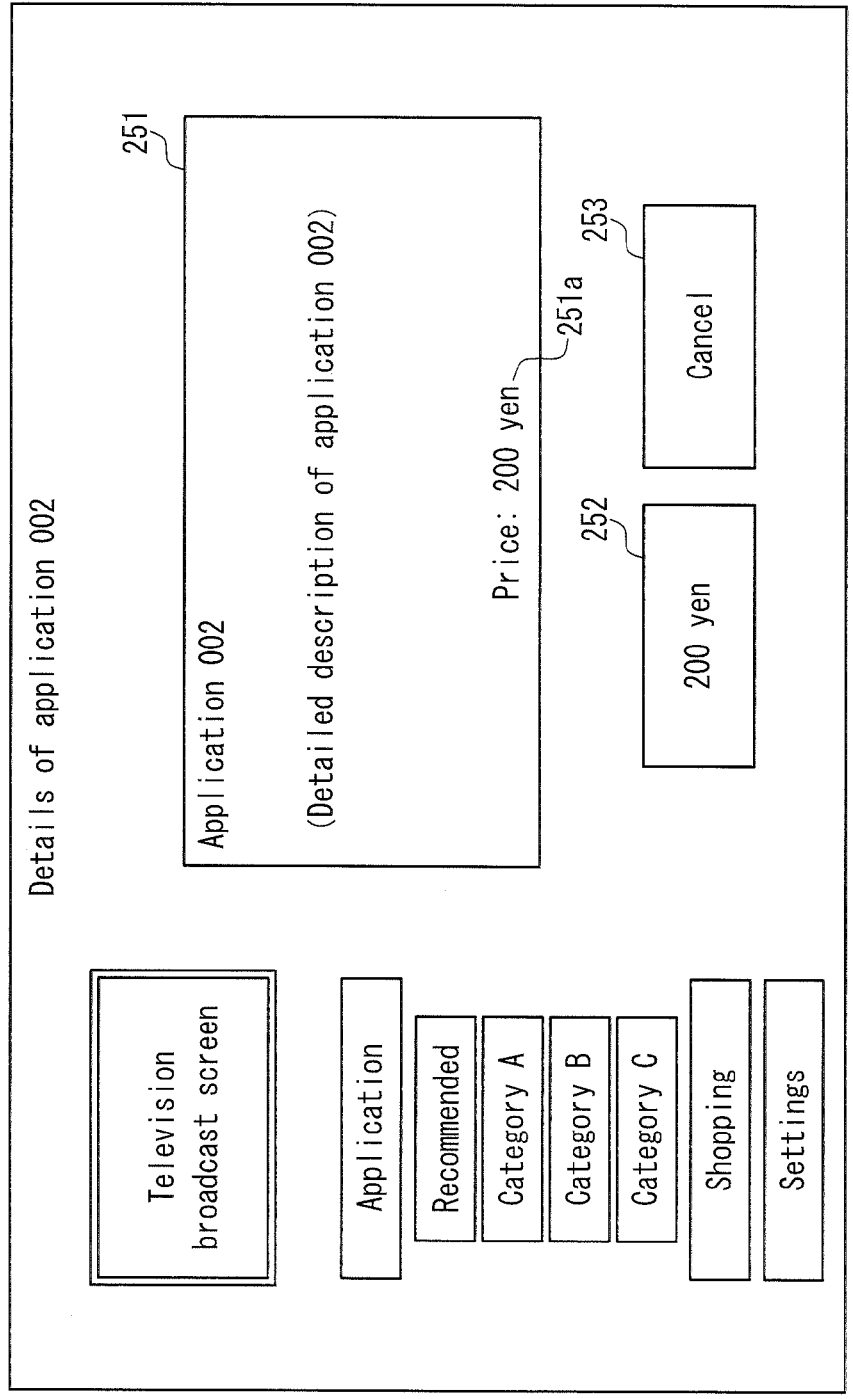
FIG. 25 is a diagram showing an example of the "(1-2) application screen".

FIG. 25 is a diagram showing an example of the "(1-2) application screen" related to the "application 002 (pay)". In FIG. 25, a detailed description of the application 002 is displayed. Because the application 002 is pay application software, the detailed description may include a price display 251a ("200 yen").

The "(1-2) application screen" shown in FIG. 25 includes an icon 252 that is an icon displaying the price (200 yen) of the selected application software and is for making an instruction to install this application software, and a "cancel" icon 253 for cancelling selection of the application software and returning to the "(1-1) market menu screen".

Note that the price information of the application 002, which is pay application software, is acquired by referring to the pay product data 853 in the sale server device 12, based on the product ID.

Upon the icon 252 displaying the price (200 yen) of the selected application software being selected, the CPU 52 in the management server device 11 that accepted the instruction from the television device 10 executes processing shown in FIG. 16, and thereafter executes an installation process so that the application software can be executed on the television device 10. Note that if the "cancel" icon 253 is selected, the CPU 32 in the television device 10 again displays the "(1-1) market menu screen" shown in FIG. 14.

Note that the pay application software includes "pay hosted application software" or "pay downloaded application software", as described above.

In the case of installing "pay hosted application software", the CPU 52 in the management server device 11 configures settings so that the television device 10 can execute "pay hosted application software" on the management server device 11.

On the other hand, in the case of installing "pay downloaded application software", the CPU 52 in the management server device 11 causes the television device 10 to download "pay downloaded application software" and performs processing so that "pay downloaded application software" can be executed on the television device 10.

In step S161 in FIG. 16, the CPU 52 in the management server device 11 determines whether or not the product corresponding to the product ID received from the television device 10 is a pay product. For example, the CPU 52 refers to the product data 553 based on the product ID, and determines that the product corresponding to the product ID is a pay product if the data of the product type 72 corresponding to the product ID is "pay hosted application software" or "pay downloaded application software". For example, the CPU 52 determines that the product corresponding to the product ID is a pay product if the product ID corresponds to data of the product ID 71 of "002" or "004" in the product data 553 shown in FIG. 7 ("NO" determination in step S161).

Note that, for example, a record 80 with the product ID of "002" exists in the pay product data 853 shown in FIG. 10. Therefore, the CPU 52 may determine whether or not "002", which is the product ID received from the television device 10, is a pay product by making an inquiry to the sale server device 12 about whether or not the record 80 with the product ID of "002" exists.

Also, if the selection data indicating the product ID of the application software selected from the television device 10 includes flag data indicating a pay product, the CPU 52 in the management server device 11 may determine whether or not the application software is a pay product, based on the flag data in the selection data.

1-4-2-1. Example of Registered User

If it is determined in step S161 in FIG. 16 that the application software based on the product ID received from the television device 10 is a pay product, the CPU 52 in the management server device 11 determines whether or not the user of the television device 10 is a registered user (step S165). For example, if at least data related to a password is included in the connection data transmitted from the television device 10, the CPU 52 can determine that the user of the television device 10 is registered ("YES" determination in step S165). For example, if the password in the connection data transmitted from the television device 10 is not a NULL value, the CPU 52 can determine that the user of the television device 10 is registered.

Note that the CPU 52 may determine that the user of the television device 10 is registered if none of the system ID, the password, and the device ID included in the record of the connection data transmitted from the television device 10 is a NULL value. For example, the CPU 52 can determine that the user of the television device 10 is registered if data of "s001", "p001", and "d001" are included in the record of the connection data respectively as the system ID 41, the password 42, and the device ID 43, which are shown in the record 45 of the connection data 37a2 in FIG. 4.

Also, if, in the television device data 552, the payment flag corresponding to the system ID included in the record of the connection data transmitted from the television device 10 is "T", the CPU 52 can determine that the user of the television device 10 is registered because the payment information is registered.

1-4-2-2. Example of Paying User Registration Process

On the other hand, if at least data related to a password is not included in the connection data transmitted from the television device 10, for example, the CPU 52 in the management server device 11 determines that the user of the television device 10 is not a registered user ("NO" determination in step S165). For example, if the password in the connection data transmitted from the television device 10 is a NULL value, the CPU 52 can determine that the user of the television device 10 is not registered.

If the CPU 52 in the management server device 11 determines that the user of the television device 10 is not registered, it executes a paying user registration process (step S166). Note that the reason for executing the paying user registration process is because the user has selected a pay product. In other words, with the completion of the paying user registration process, the sale server device 12 can perform a payment process for a pay product.

Figure 26:
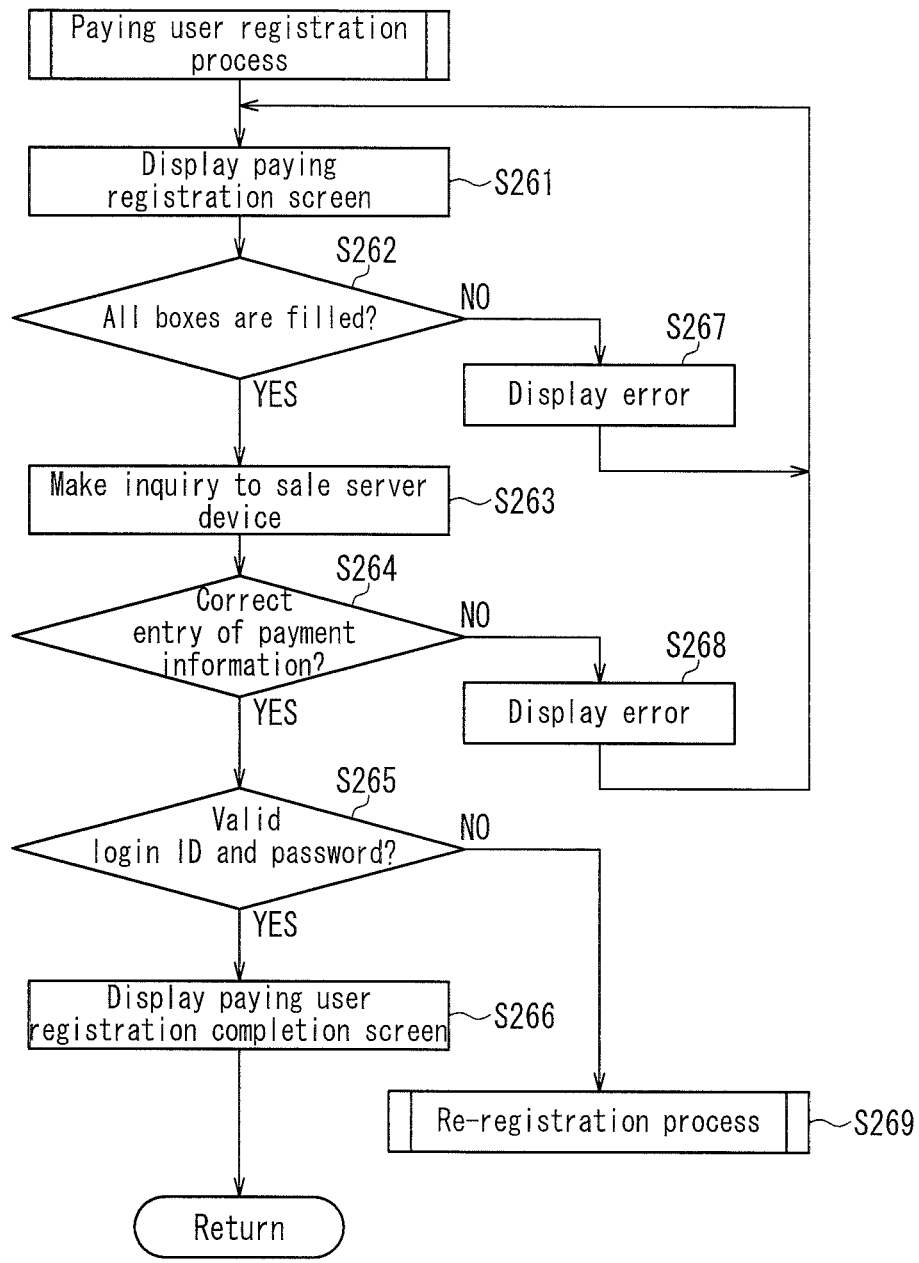
FIG. 26 is a diagram showing an exemplary flowchart of a paying user registration process.
Figure 27:
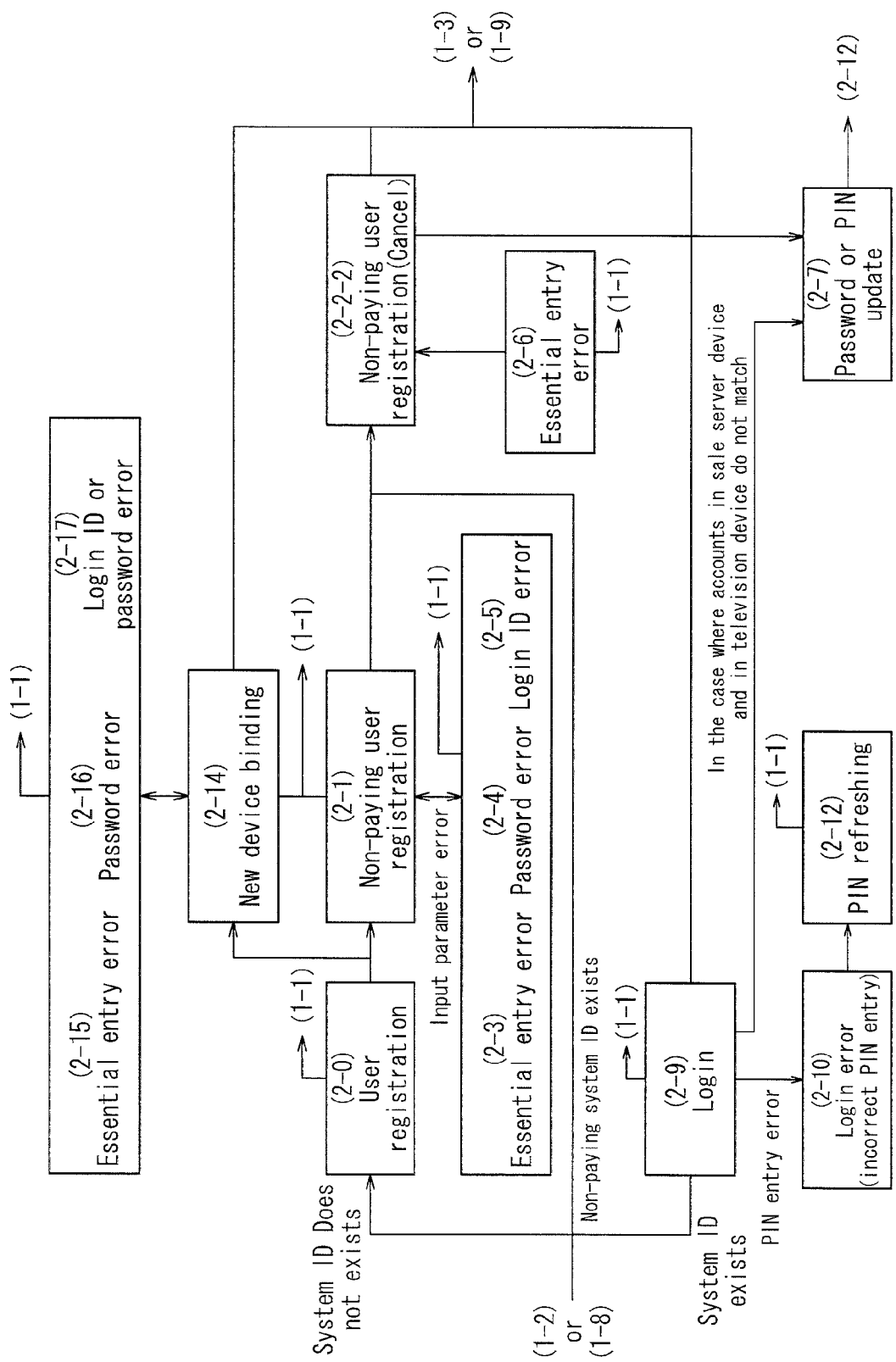
FIG. 27 is a diagram showing an example of screen transition corresponding to FIG. 26.
Figure 28:
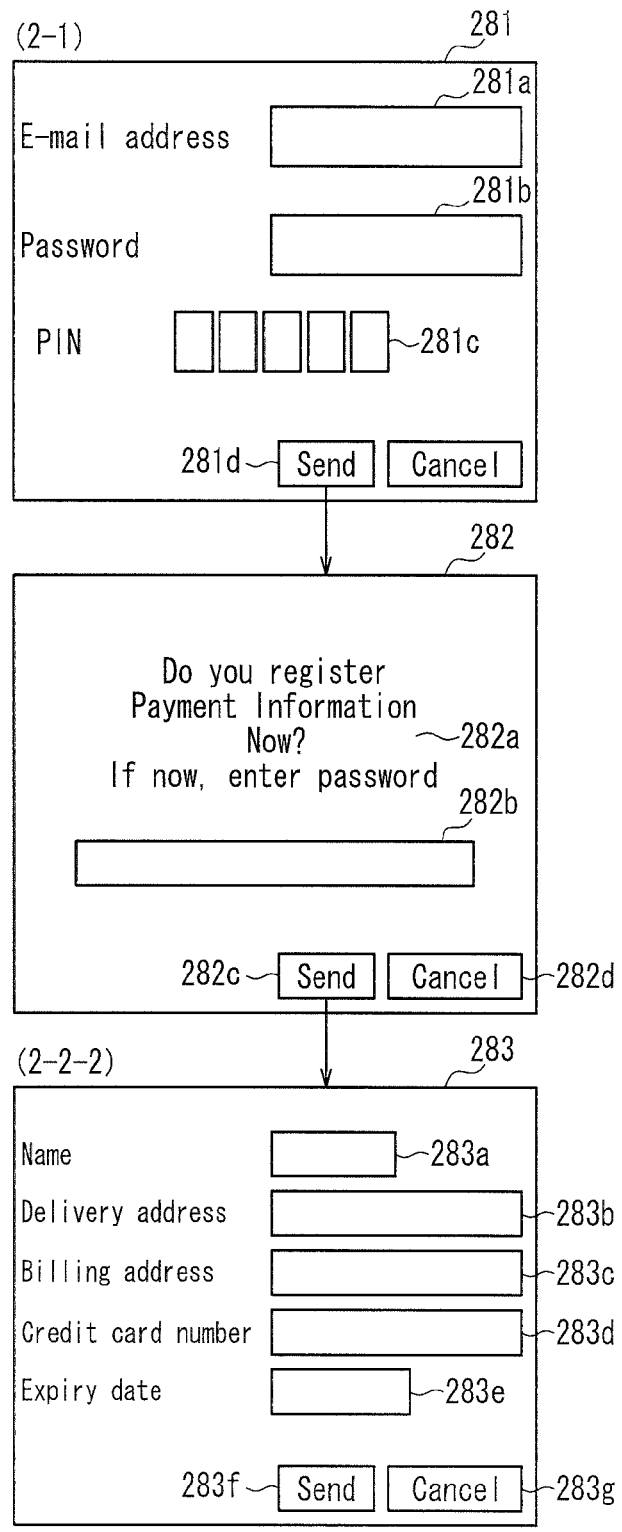
FIG. 28 is a diagram showing an example of screen transition in the case of paying registration.
Figure 29:
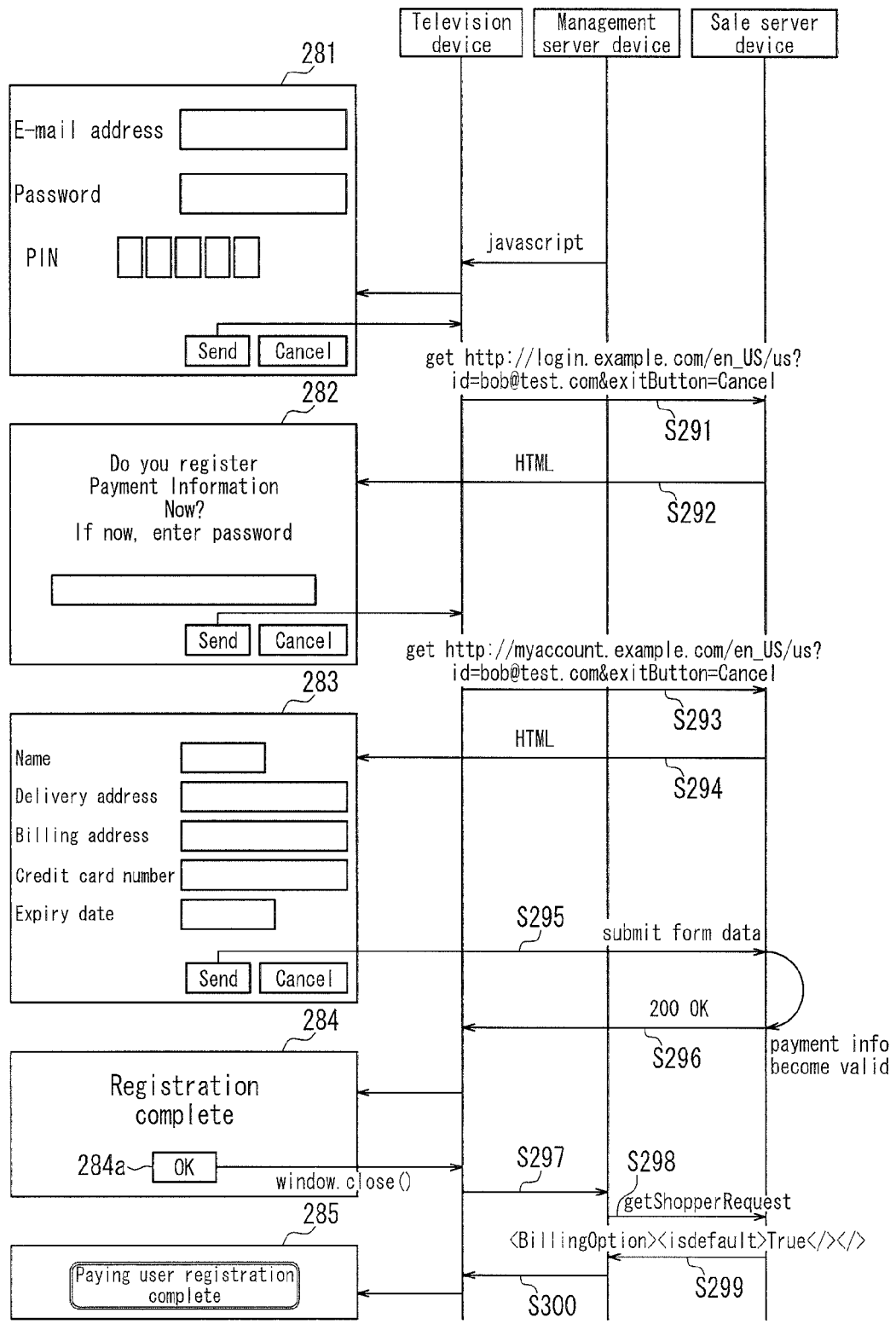
FIG. 29 is a diagram showing an exemplary sequence in the case of paying registration.

FIG. 26 is a diagram showing an exemplary flowchart of the paying user registration process. FIG. 27 is a diagram showing an example of screen transition corresponding to FIG. 26. FIG. 28 is a diagram showing an example of screen transition in step S261 in FIG. 26. FIG. 29 is a diagram showing an exemplary sequence in the case of paying registration. Note that the processes from step S262 to step S263 in FIG. 26 will be described using the sequence in FIG. 29.

The CPU 52 in the management server device 11 causes the television device 10 to display the "(2-1) paying registration screen (non-paying user registration screen)" 281 (FIG. 28) (step S261). On the "(2-1) paying registration screen (non-paying user registration screen)" 281, the user operates the number/character entry keys 23 or the like on the remote controller 36 (FIG. 13), for example, and enters an e-mail address in an e-mail address entry box 281a. Similarly, the user enters a password in a password entry box 281b, and enters a PIN (personal identification number) in a PIN entry box 281c. Note that the user can use arbitrary characters or numbers as the e-mail address, the password, and the PIN under a predetermined entry condition.

Upon a "send" button 281d being pressed by a user who entered the e-mail address, the password, and the PIN, the CPU 32 in the television device 10 determines whether or not all boxes for entries are filled (step S262). For example, the CPU 32 can check the entries by executing control processing of a web page containing JavaScript (trademark) acquired from the management server device 11 on the "(2-1) paying registration screen (non-paying user registration screen)" 281.

If the CPU 32 determines that not all boxes for the entries are filled ("NO" determination in step S262), it causes the television device 10 to display a screen indicating an entry error (e.g., the "(2-3) essential entry error screen") in FIG. 27) (step S267) and returns to aforementioned S261.

On the other hand, if the CPU 32 determines that all boxes for the entries are filled ("YES" determination in step S262), it may further determine whether or not the password satisfies a predetermined condition. For example, the CPU 32 can determine whether or not the password satisfies the predetermined condition by executing control processing of a web page containing JavaScript (trademark) acquired from the management server device 11 on the "(2-1) paying registration screen (non-paying user registration screen)" 281. The predetermined condition includes the number of entered characters of the password being eight or larger, for example.

If the CPU 32 determines that the password does not satisfy the predetermined condition, it may cause the television device 10 to display a screen indicating an entry error (e.g., the "(2-4) password error screen in FIG. 27) to return to aforementioned step S173.

On the other hand, if the CPU 32 determines that all boxes for the entries are filled ("YES" determination in step S262), and also if, when necessary, it determines that the password satisfies the predetermined condition, the CPU 32 transmits the e-mail address entered in the e-mail address entry box 281a, the password entered in the password entry box 281b, and the PIN entered in the PIN entry box 281c to the sale server device 12 (step S291 in FIG. 29).

Also, after "YES" determination in step S262, the CPU 32 transmits the data of the e-mail address entered in the e-mail address entry box 281a, the data of the password entered in the password entry box 281b, and the data of the PIN entered in the PIN entry box 281c to the management server device 11. Upon the data indicating the login ID, the password, and the PIN being transmitted from the television device 10, the CPU 52 in the management server device 11 records the data indicating the login ID and the PIN as the login ID 63 in the television device data 552 (FIG. 6) in association with the system ID and the device ID. Also, the CPU 52 records the data of the password transmitted from the television device 10 as the password 42 in the connection data 37a2 on the television device 10.

The CPU 82 in the sale server device 12 records the e-mail address and the password transmitted from the television device 10 as the login ID 92 and the password 93 in the user data 852. The CPU 82 in the sale server device 12 issues a unique sale user ID that is uniquely held, and records the issued sale user ID as the sale user ID 91 in association with the e-mail address and the password transmitted from the television device 10.

The CPU 82 in the sale server device 12 causes the television device 10 to display a "payment information registration check screen" 282 (FIG. 28) (step S292 in FIG. 29). The "payment information registration check screen" 282 includes a display 282a for checking with the user about registration of the payment information, a password re-entry box 282b, a "send" button 282c to be pressed by the user when performing registration at this time, and a "cancel" button 282d to be pressed by the user when cancelling the entire paying registration process. In other words, the "payment information registration check screen" 282 in the paying registration process does not display a "later" button 193d (FIG. 20A) to be pressed by the user who does not intend to register the payment information at this time.

Upon the user entering the password in the password re-entry box 282b and pressing the "send" button 282c, the CPU 32 in the television device 10 transmits the password entered in the password re-entry box 282b to the sale server device 12 (step S293 in FIG. 29).

If the password transmitted from the television device 10 matches the password held as the password 93 in the user data 852 in aforementioned step S292, the CPU 82 in the sale server device 12 causes the television device 10 to display a "(2-2-2) paying user registration screen" 283 (step S294 in FIG. 29). As shown in FIG. 28, the "(2-2-2) paying user registration screen" 283 includes a name entry box 283a, a delivery address entry box 283b, a billing address entry box 283c, a credit card number entry box 283d, an expiry entry box 283e, a "send" button 283f, and a "cancel" button 283g. In other words, the "(2-2-2) paying user registration screen" 283 does not display the "later" button 194g (FIG. 20A) to be pressed by the user who does not intend to register the payment information at this time, as with the "payment information registration check screen" 282.

Note that the television system 1 of the present embodiment also can employ a configuration in which the "payment information registration check screen" 282 is not displayed on the television device 10. In other words, the processes of aforementioned steps S292 and S293 may be skipped, and step S294 may be executed after step S291.

On the "(2-2-2) paying user registration screen" 283 shown in FIG. 28, the user operates the number/character entry keys 23 or the like on the remote controller 36 (FIG. 13), for example, and enters the payment information in the entry boxes 283a to 283e. Note the CPU 32 can display the software keyboard shown in FIG. 20B on the display 31 simultaneously with the "(2-2-2) paying user registration screen" 283.

Upon the user entering the payment information in the entry boxes 283a to 283e and pressing the "send" button 283f, the CPU 32 in the television device 10 transmits the payment information entered in the entry boxes 283a to 283e to the sale server device 12 (step S295 in FIG. 29). Note that if the user presses the "cancel" button 283g, the CPU 32 terminates the "payment information entry screen" 283 and interrupts processing.

Upon the payment information being transmitted from the television device 10, the CPU 82 in the sale server device 12 checks whether or not the payment information is proper. For example, the CPU 82 checks with a server device or the like of the credit card company about whether or not the credit card number included in the payment information is valid.

If the CPU 82 in the shopping server device 12 determines that the payment information is valid, it records the payment information in the user data 852. For example, the CPU 82 records the data entered in the name entry box 283a, the credit card number entry box 283d, and the expiry entry box 283e on the "(2-2-2) paying user registration screen" 283 in FIG. 28 as the payment information 94 in the user data 852 (FIG. 9). Also, for example, the CPU 82 records the data entered in the delivery address entry box 283b on the "(2-2-2) paying user registration screen" 283 in FIG. 28 as the delivery address 95 in the user data 852 (FIG. 9).

Also, if the CPU 82 in the sale server device 12 determines that the payment information is valid, it transmits a "registration completion screen" 284 (FIG. 29) to the television device 10 (step S296 in FIG. 29). The "registration completion screen" 284 includes an "OK" button 284a with which the user confirms completion of payment information registration. Upon the user pressing the "OK" button 284a, the CPU 32 in the television device 10 transmits information indicating completion of payment information registration to the management server device 11 (step S297 in FIG. 29). Note that if the CPU 82 in the sale server device 12 determines that the payment information is invalid, it transmits a screen indicating that the payment information is invalid (not shown in the drawing) to the television device 10.

If the information indicating completion of payment information registration is transmitted from the television device 10, the CPU 52 in the management server device 11 transmits the login ID (e-mail address) and the password of the television device 10 to the sale server device 12 and makes an inquiry about whether or not the sale user ID of the user is validly registered (step S263 in FIG. 26, step S298 in FIG. 29). For example, the CPU 52 transmits the login ID (e-mail address) 92 held in the television device data 552 and the password 42 held in the connection data 37a2 of the television device 10 to the sale server device 12.

Thus, the CPU 52 in the management server device 11 reliably can recognize completion of payment information registration on the sale server device 12, by making an inquiry to the sale server device 12 about whether or not the sale user ID of the user is validly registered. For example, even if the payment information registration process has not been performed on the television device 10 while the payment information registration process has been performed on the other terminal around the same time, the management server device 11 reliably can recognize completion of payment information registration.

The reason that the CPU 52 in the management server device 11 makes an inquiry to the sale server device 12 about whether or not the sale user ID is validly registered is because the state of entry on the "payment information entry screen" 283 cannot be judged on the management server device 11 side, as described above. Accordingly, the CPU 52 in the management server device 11 makes an inquiry to the sale server device 12 about whether or not the sale user ID is validly registered, thereby being able to maintain consistency of the payment information of the user between the management server device 11 and the sale server device 12.

The CPU 82 in the sale server device 12 determines whether or not the login ID and the password transmitted from the management server device 11 exist in the user data 852 (FIG. 9). If the login ID and the password transmitted from the management server device 11 exist in the user data 852 (FIG. 9), the CPU 82 makes a reply with information including the sale user ID that is held in the user data 852 in association with the login ID and the password, to the management server device 11 (step S299 in FIG. 29).

If the sale user ID is not contained in the reply from the sale server device 12 ("NO" determination in step S265), the CPU 52 in the management server device 11 executes a re-registration process (step S269). In the re-registration process, the CPU 52 in the management server device 11 causes the television device 10 again to display the "paying registration screen" 281.

On the other hand, if the reply from the sale server device 12 contains the sale user ID ("YES" determination in step S265), the CPU 52 in the management server device 11 records the sale user ID contained in the reply from the sale server device 12 as the sale user ID 62 in the television device data 552 in association with the login ID and the password transmitted to the sale server device 12. Also, if the reply from the sale server device 12 contains the sale user ID ("YES" determination in step S265), the CPU 52 in the management server device 11 causes the television device 10 to display a "paying user registration completion screen" 285 (FIG. 29) (step S266 in FIG. 26, step S300 in FIG. 29). Note that the CPU 52 may omit a process of causing the television device 10 to display the "paying user registration completion screen" 285 (FIG. 29).

1-4-2-3. Purchase Confirmation Process

Figure 30:
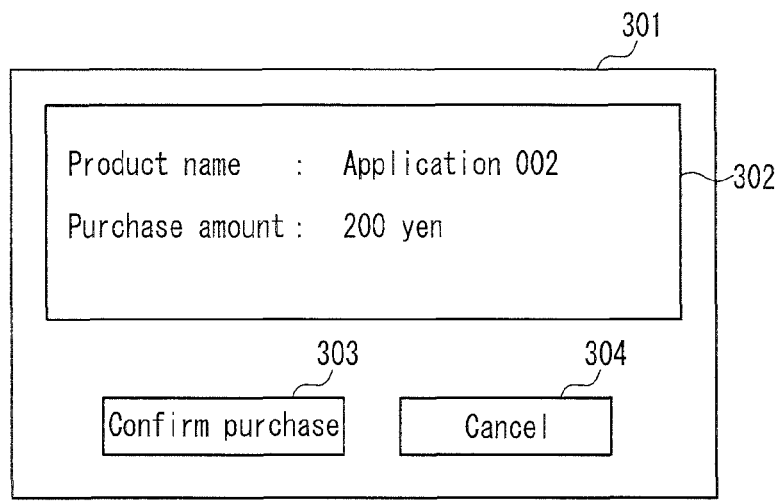
FIG. 30 is a diagram showing an example of a purchase confirmation screen for confirming purchase of application software.

Upon completion of the paying user registration process (step S166 in FIG. 16), the CPU 52 in the management server device 11 causes the television device 10 to display a purchase confirmation screen. FIG. 30 is a diagram showing an example of a purchase confirmation screen for confirming the purchase of application software. A purchase confirmation screen 301 includes a purchased product information 302, a purchase confirmation button 303, and a cancel button 304. The purchased product information 302 includes data indicating the "application 002" as the name of the product to be purchased and the purchase amount of "200 yen", for example.

Upon the user pressing the purchase confirmation button 303, the CPU 32 in the television device 10 transmits purchase confirmation information to the management server device 11 ("YES" determination in step S168). The management server device 11 to which the purchase confirmation information is transmitted from the television device 10 executes the aforementioned installation process (step S164).

1-4-2-4. Example of Login Process

Figure 31:
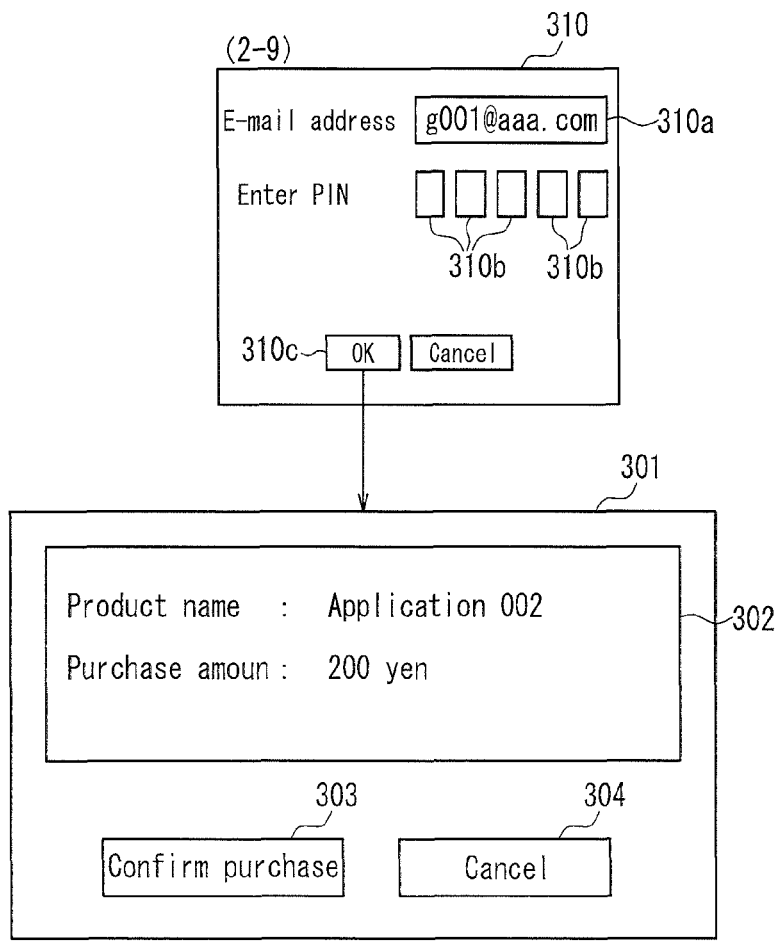
FIG. 31 is a diagram showing an example of a "(2-9) login screen" used in a login process.

If the CPU 52 in the management server device 11 determines that the user of the television device 10 is registered in step S165 in FIG. 16, it executes a login process (step S167). FIG. 31 is a diagram showing an example of a "(2-9) login screen" used in the login process.

The CPU 52 in the management server device 11 refers to the television device data 552 based on the system ID and the device ID of the television device 10, and acquires data of the login ID 63 associated with the system ID and the device ID. The CPU 52 causes the e-mail address to be displayed in advance in an e-mail address entry box 310a on "the (2-9) login screen" 310 (FIG. 31), based on the data of the login ID 63 acquired from the television device data 552.

Accordingly, the user of the television device 10 can cause the management server device 11 to execute the process of logging in to the television system 1 by entering the PIN (personal identification number) in a PIN entry box 310b.

Note that if, for example, the PIN consists only of numbers, the user can operate the number/character entry keys 23 on the remote controller 36 and easily enter the PIN when entering the PIN in the PIN entry box 310b on the "(2-9) login screen" 310.

Upon an "OK" button 310c being pressed by an operation of the user who entered the PIN (personal identification number), the CPU 32 in the television device 10 transmits the e-mail address (login ID) displayed in the e-mail address entry box 310a and the PIN entered in the PIN entry box 310b to the management server device 11.

Upon the e-mail address (login ID) and the PIN being transmitted from the television device 10, the CPU 52 in the management server device 11 refers to the television device data 552 (FIG. 6) and acquires data of the sale user ID 62 corresponding to the transmitted e-mail address (login ID). The CPU 52 checks whether or not the password exists in the sale server device 12, using the acquired data of the sale user ID 62 and the transmitted e-mail address (login ID). For example, if the television device 10 corresponds to the record 60 of the television device data 552, data of "h001" and "g001@aaa.com" are transmitted respectively as the sale user ID 62 and the login ID 63 to the sale server device 12.

The record 90 of the user data 852 (FIG. 9) on the sale server device 12 includes the sale user ID 91 of "h001" and the login ID 92 of "g001@aaa.com". Therefore, the CPU 82 in the sale server device 12 transmits "p001", which is the data of the password 93 held in the record 90, to the management server device 11.

Since "p001" that is the data of the password 93 transmitted from the sale server device 12 matches "p001" that is the password 42 transmitted from the television device 10, the CPU 32 in the management server device 11 determines that login is permitted, and terminates the login process (step S167 in FIG. 16). Note that the purchase confirmation process and the installation process after step S167 in FIG. 16 are the same as aforementioned steps S168 and S164.

1-4-2-5. Example of Shopping

Figure 32:
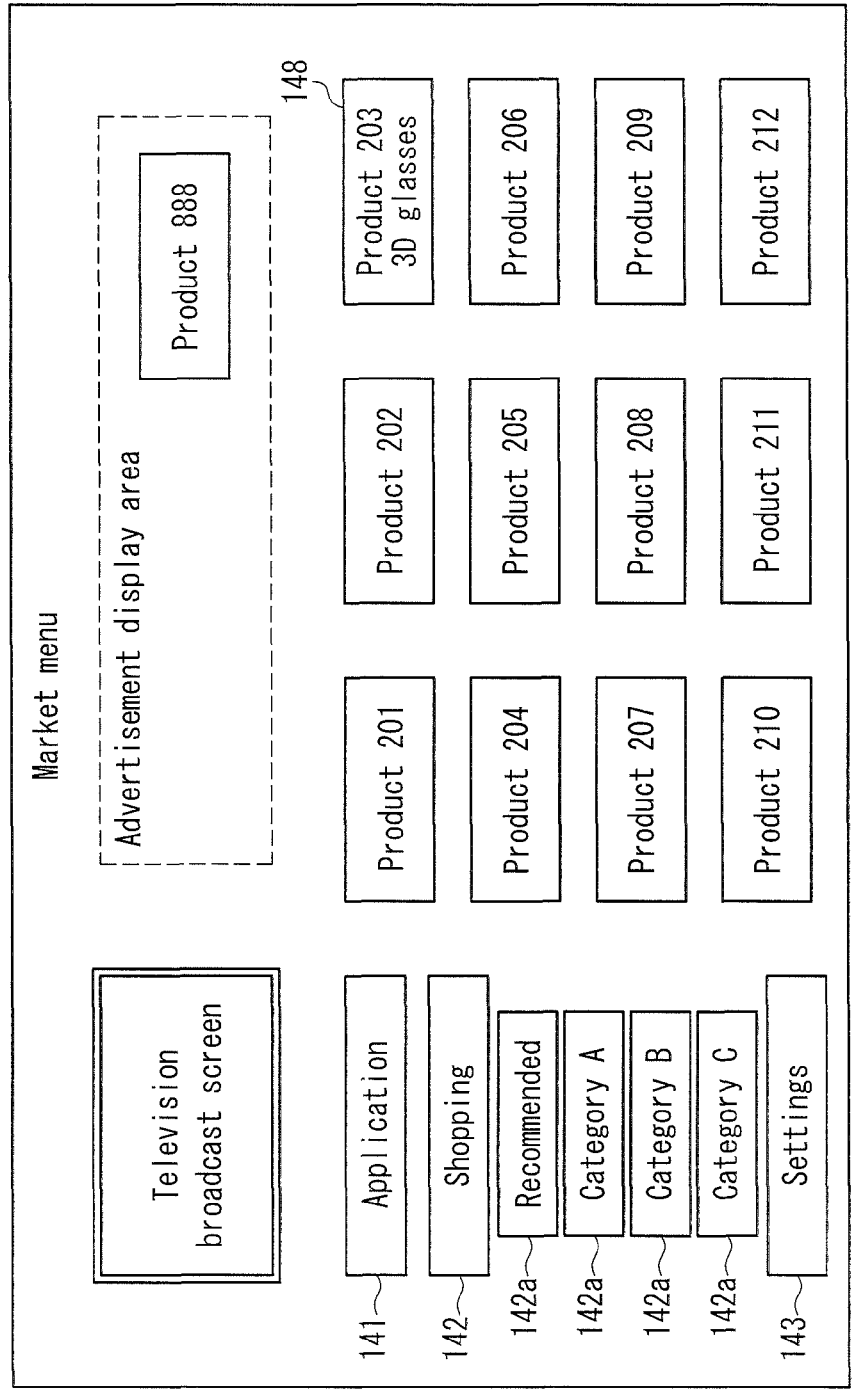
FIG. 32 is a diagram showing an example of a market menu screen in the case where a user selected a shopping icon 142.

The user can purchase products other than application software (e.g., tangible articles) using the market menu shown in FIG. 14. For example, the user can purchase products other than application software by selecting the shopping icon 142 shown in FIG. 14. FIG. 32 shows the "(1-1) market menu screen" in the case where the user selected the shopping icon 142. The "(1-1) market menu screen" shown in FIG. 32 includes category icons 142a for products other than application software below the shopping icon 142.

Figure 33:
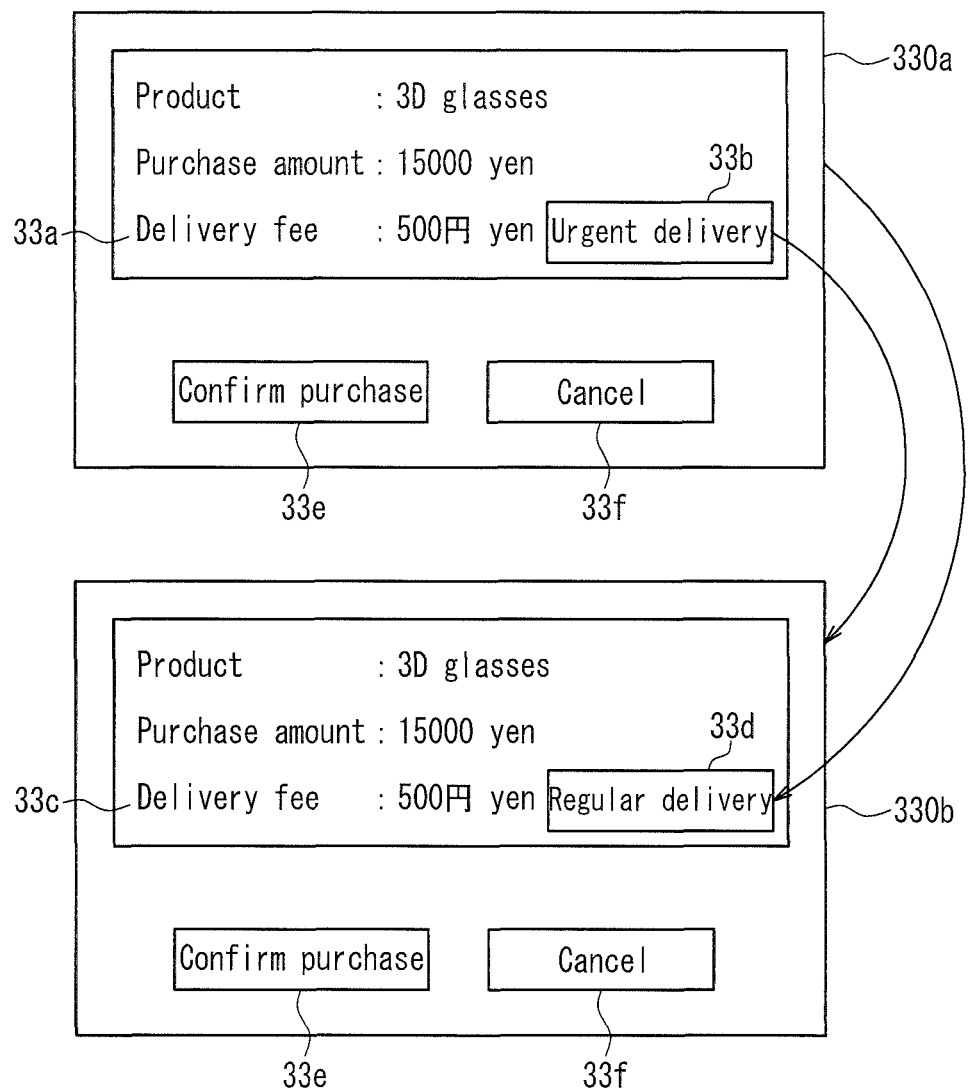
FIG. 33 is a diagram showing an example of a details screen for "product 203: 3D glasses" on the "(1-2) application screen".

When the user selects a "product 203: 3D glasses" icon 148 on the "(1-1) market menu screen", the CPU 52 causes the television device 10 to display a details screen for the "product 203: 3D glasses". FIG. 33 is a diagram showing an exemplary details screen for the "product 203: 3D glasses" on the "(1-2) application screen". Since the "product 203: 3D glasses" is a tangible product, a details screen 330a in FIG. 33 includes a delivery fee display 33a. The purchase amount (price information) on the details screen 330a is acquired by referring to the pay product data 853 in the sale server device 12 based on the product ID.

Note that in the case of urgent delivery, the user can request that the time for delivery be shortened by pressing an "urgent delivery" button 33b. Upon the "urgent delivery" button 33b being pressed by the user, the CPU 52 in the management server device 11 calculates the delivery fee in the case where the time for delivery is shortened, and causes the television device 10 to display the details screen 330b including the calculated delivery fee display 33c. Also, upon the user pressing a "regular delivery" button 33d on the details screen 330b, the CPU 52 causes the television device 10 again to display the details screen 330a with the regular delivery fee.

The user who wants to purchase the product selects a "purchase confirmation button" 33e on the details screen 330a or 330b in FIG. 33. Also, the user who cancels the purchase of the product selects a "cancel button" 33f.

1-4-2-6. Other Modes

Figure 34:
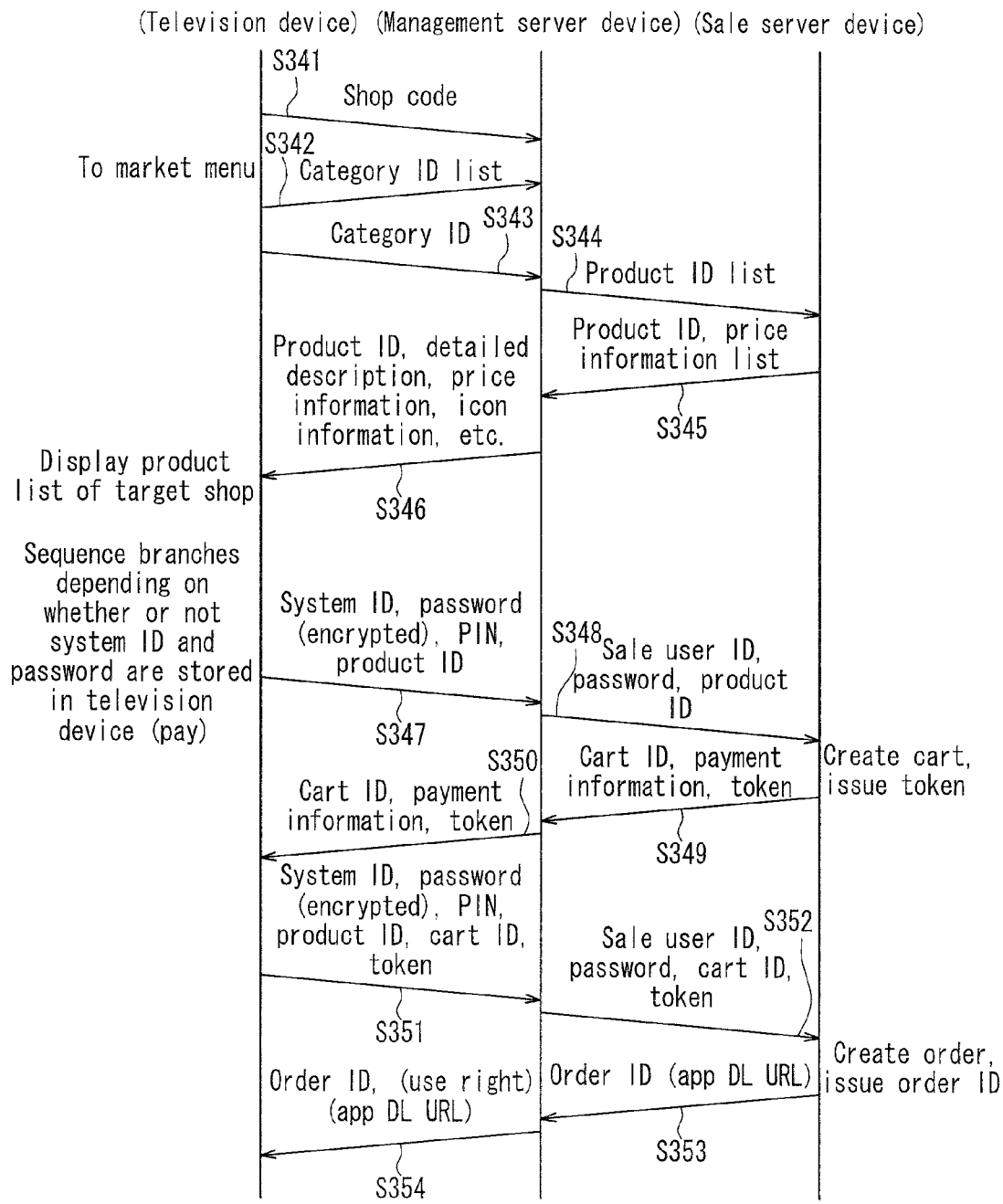
FIG. 34 is a diagram showing an exemplary sequence in the case of purchasing a pay product (including application software and an article).

FIG. 34 is a diagram showing an exemplary sequence in the case of purchasing a pay product (including application software and articles). In the mode shown in FIG. 34, the pay product data 553 is held in the hard disk 85 in the sale server device 12.

The television device 10 transmits a shop code to the management server device (step S341). The shop code refers to a code indicating a shop existing in each area where mail order is available.

The management server device 11 transmits a category ID list to the television device 10 (step S342). The category IDs are for identifying the category icons 141a shown in FIG. 14 or the category icons 142a shown in FIG. 32. Upon a category icon 141a or a category icon 142a being selected on the television device 10, the television device 10 transmits the category ID corresponding to the category icon 141a or the category icon 142a to the management server device 11 (step S343). The management server device 11 makes an inquiry to the sale server device 12 about product IDs included in the category ID (step S344).

The sale server device 12 makes a reply with the product IDs, price information, and the like to the management server device 11 (step S345). The management server device 11 transmits the product IDs, the detailed description, the price information, icon information, and the like to the television device 10 (step S346).

The television device 10 displays the product IDs, the detailed description, the price information, the icon information, and the like that are transmitted from the management server device 11, on the "(1-1) market menu screen". Upon the user selecting the product icon 148 and the like (FIG. 32) on the "(1-1) market menu screen", the television device 10 transmits the system ID, the password (encrypted), the PIN, the product IDs, and the like to the management server device 11 (step S347). The management server device 11 transmits the sale user ID, the password (encrypted), the product ID, and the like to the sale server device 12 (step S348).

The sale server device 12 creates cart information for collectively handling products corresponding to the product IDs, and issues a cart ID for identifying the cart information and a token for preventing inconsistency of the cart information. The sale server device 12 transmits the cart ID, the payment information, and the token to the management server device 11 (step S349).

The management server device 11 transmits the cart ID, the payment information, and the token to the television device 10 (step S350).

The television device 10 displays the cart ID, the payment information, the token, and the like that are transmitted from the management server device 11, on a "(1-9) purchase confirmation screen". Upon the user selecting the purchase confirmation button 303 or the like (FIG. 33) on the "(1-9) purchase confirmation screen", the television device 10 transmits the system ID, the password (encrypted), the PIN, the cart ID, the token, and the like to the management server device 11 (step S351). The management server device 11 transmits the sale user ID, the password (encrypted), the cart ID, the token, and the like to the sale server device 12 (step S352).

The sale server device 12 creates an order based on the cart information corresponding to the cart ID, and issues an order ID. The sale server device 12 transmits the order ID and information indicating the right to use hosted application software or information indicating a URL for downloading application software to the management server device 11 (step S353). The management server device 11 transmits the order ID and the information indicating the right to use hosted application software or the information indicating a URL for downloading application software, to the television device 10 (step S354).

1-4-3. Example of Setting

The user can configure various settings of the television device 10 by selecting the settings icon 143, using the market menu shown in FIG. 14. For example, the user can perform non-paying user registration or paying user registration.

Figure 35:
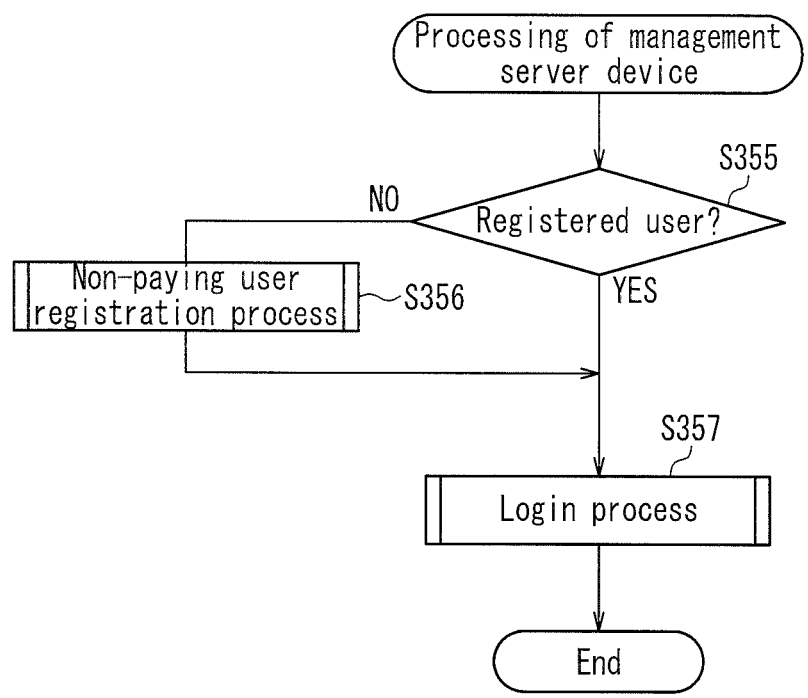
FIG. 35 is a diagram showing an exemplary flowchart of screen processing based on the display screen control program 551 (FIG. 5) of the management server device 11.
Figure 36:
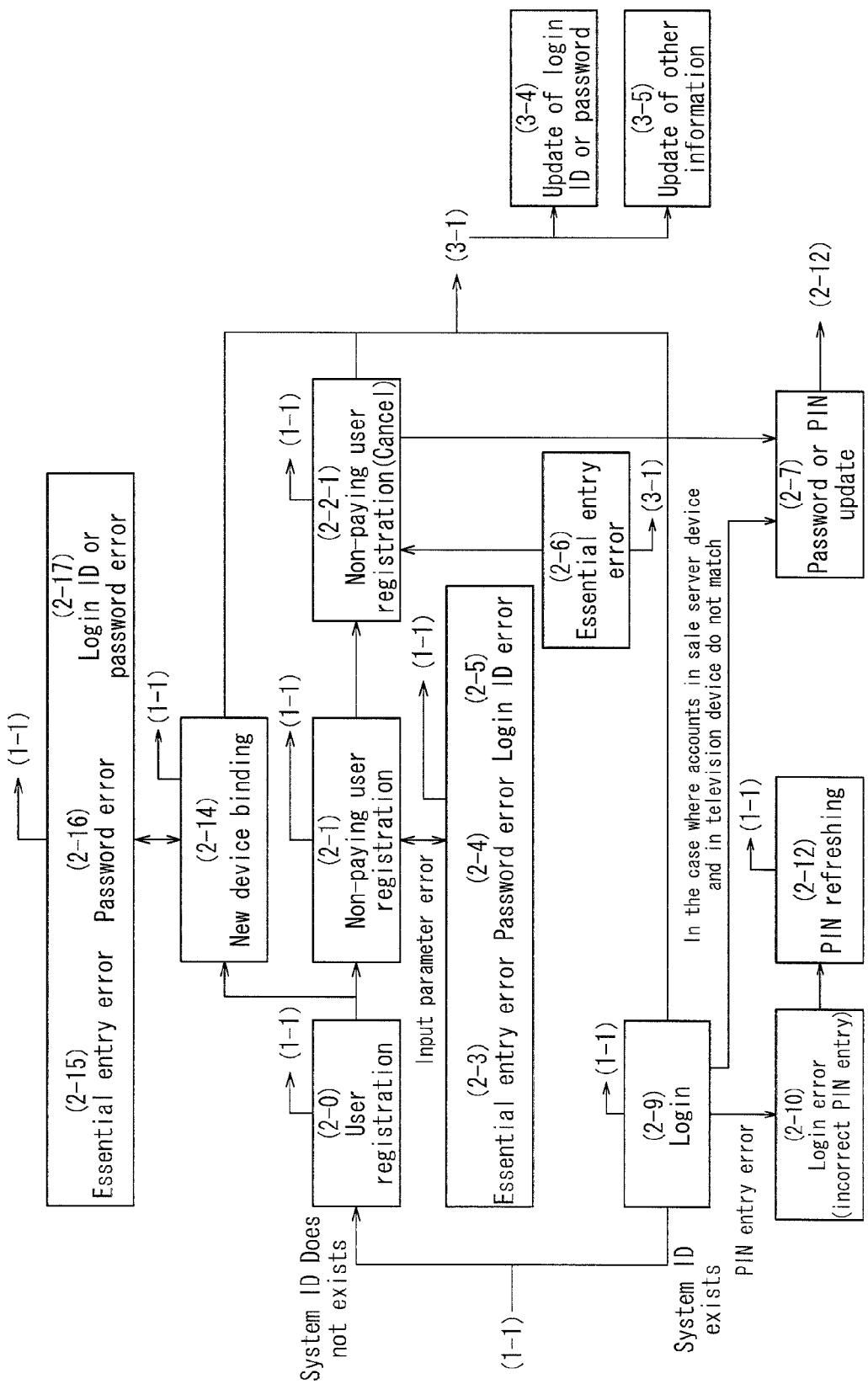
FIG. 36 is an example of screen transition in the case of configuring various settings using "setting".

FIG. 35 is a diagram showing an exemplary flowchart of screen processing based on the display screen control program 551 (FIG. 5) of the management server device 11. FIG. 36 is a diagram showing an example of screen transition in the case of configuring various settings using "settings".

Upon the user selecting the settings icon 143 on the "(1-1) market menu screen" shown in FIG. 14, the CPU 52 in the management server device 11 determines whether or not the user of the television device 10 is registered (step S355 in FIG. 35). Note that the process in step S355 is the same as the process in step S162 shown in FIG. 16.

If the CPU 52 in the management server device 11 determines that the user of the television device 10 is not registered ("NO" determination in step S355), it executes the non-paying user registration process (step S356). Note that the process in step S356 is the same as the process in step S163 shown in FIG. 16.

If the CPU 52 in the management server device 11 determines in step S355 in FIG. 35 that the user of the television device 10 is registered ("YES" determination in step S355), or if the non-paying user registration process (step S356) was finished, the CPU 52 executes a login process (step S357). Note that the process in step S357 is the same as the process in step S167 shown in FIG. 16.

Figure 37:
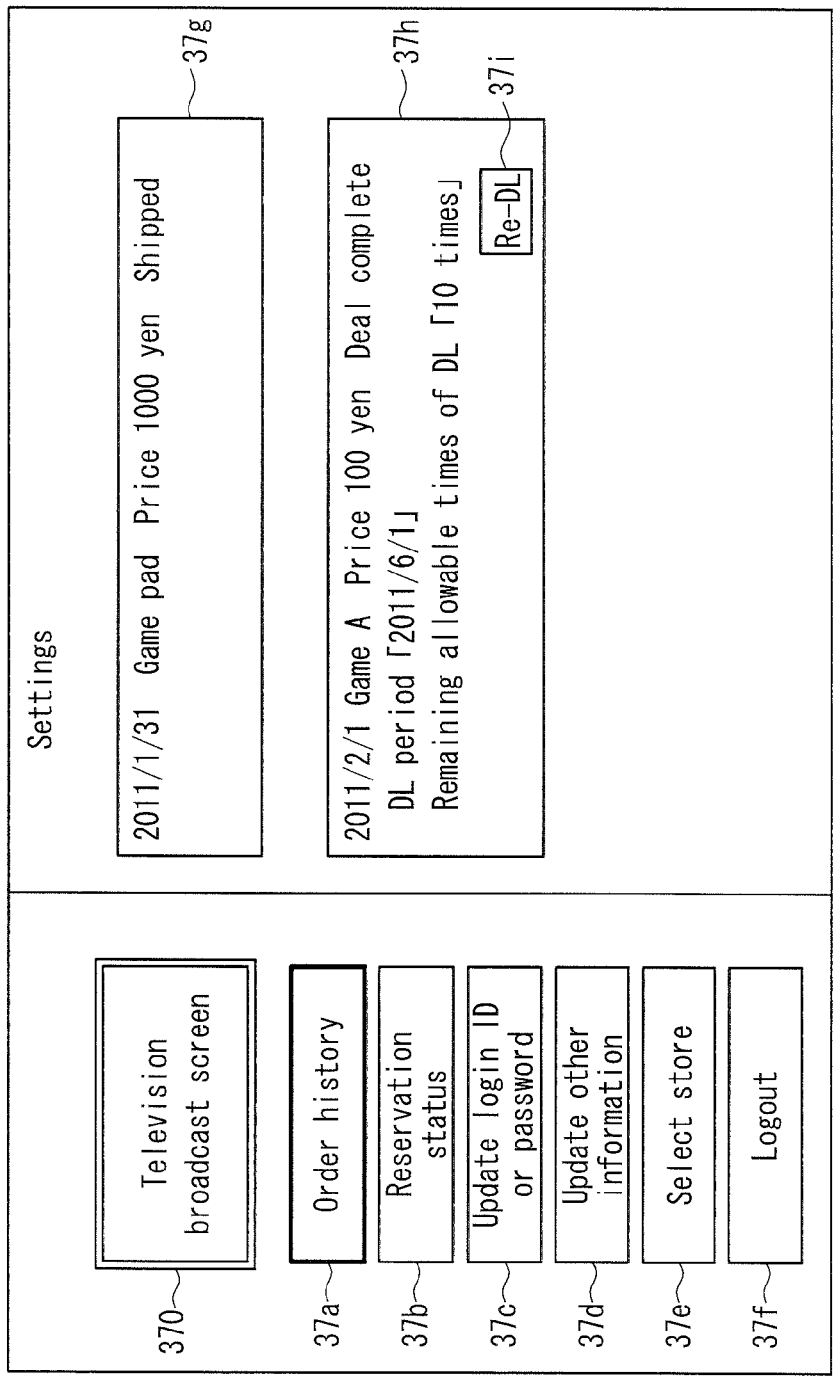
FIG. 37 is a diagram showing an example of a "(3-1) settings screen".

If the login process is successful, the CPU 52 in the management server device 11 causes the television device 10 to display a "(3-1) settings screen". FIG. 37 is a diagram showing an example of the "(3-1) settings screen". The "(3-1) settings screen" includes a television broadcast screen 370, an "order history" icon 37a, a "reservation status" icon 37b, a "update login ID or password" icon 37c, an "update other information" icon 37d, a "select store" icon 37e, and a "logout" icon 37f.

1-4-3-1. Example of Order History

Upon the "order history" icon 37a being selected by a user operation, the CPU 32 in the television device 10 displays a history list of products bought by the user in the past, for example. The CPU 32 displays, for example, a history screen 37g and a history screen 37h. The history screen 37g indicates the history of purchase of a "game pad", which is an article. The history screen 37h indicates history of purchase of a "game A", which is download application software. The history screen 37h includes "2011/6/1", which is data indicating the download (DL) period in which download is possible, and "10 times", which is data indicating the remaining allowable times of download (DL). Also, the history screen 37h includes a "re-DL" button 37i for again downloading the "game A", which is downloaded application software.

1-4-3-2. Example of Update of Other Information

Upon the "update other information" icon 37d being selected by a user operation, the CPU 52 in the management server device 11 displays a list of icons for transferring application software that can be executed on one television device 10 to another television device 10, for example, for each television device.

Figure 38:
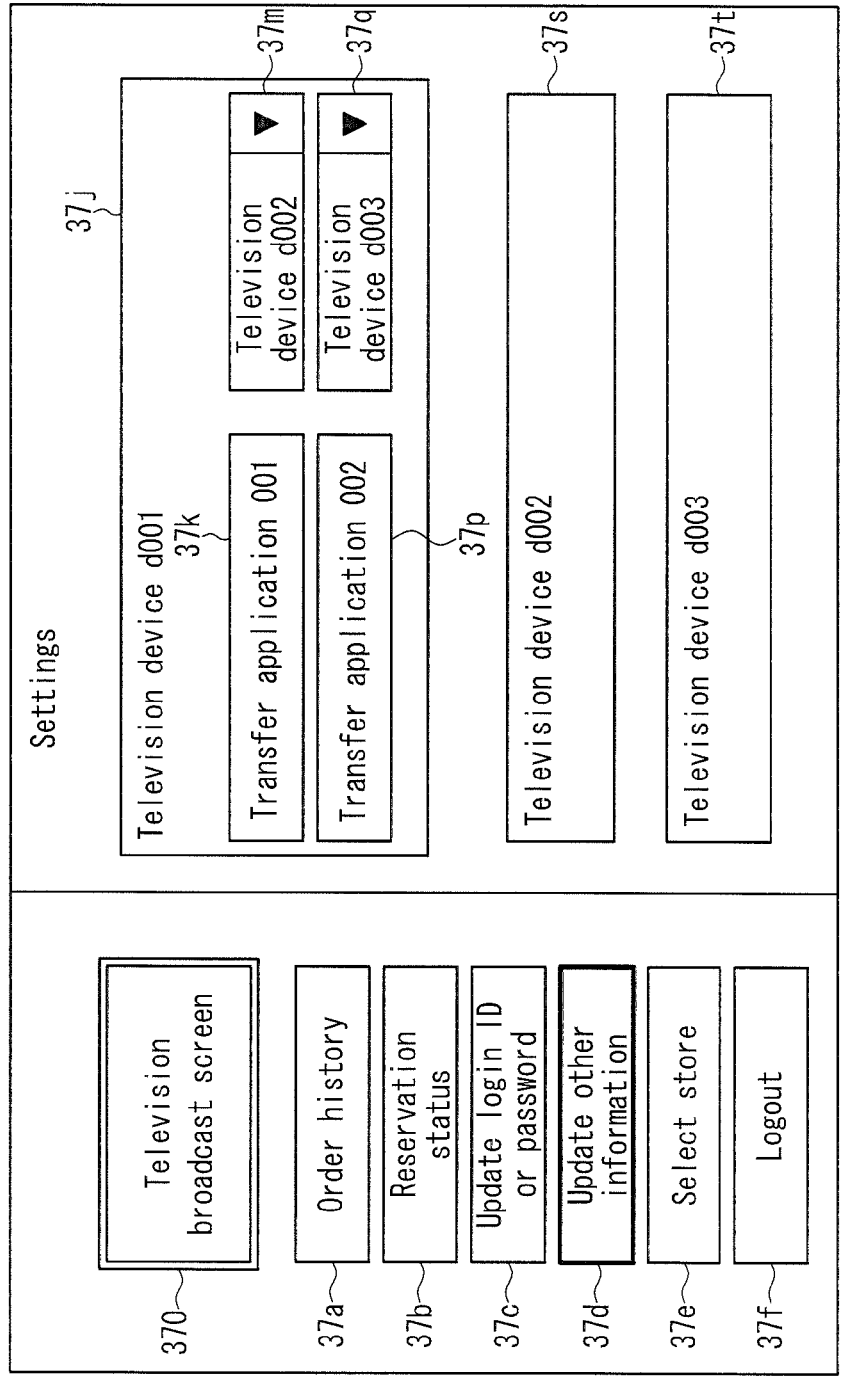
FIG. 38 is a diagram showing an example of user data 3752.

The CPU 32 causes a "transfer application 001" icon 37k and a "transfer application 002" icon 37p, which respectively are icons for transferring hosted applications 001 and 002 that can be executed on the television device of "d001", to be displayed on a screen 37j (FIG. 38) of the television device 10, for example.

Also, the CPU 52 causes, for example, a pull-down menu with which the user selects the device ID of the television device indicating a transfer destination to be displayed respectively on the right of each of the "transfer application 001" icon 37k and the "transfer application 002" icon 37p.

For example, if the user selects the "transfer application 001" icon 37k, the right to execute the application 001 is transferred from the television device "d001" to the television device "d002". Similarly, for example, if the user selects the "transfer application 002" icon 37p, the right to execute the application 002 is transferred from the television device "d001" to the television device "d003". In the case of transferring the right to execute application software, for example, the CPU 52 can perform processing so as to hold, as the device ID (2) product ID 69, the data of the product ID held as the device (1) product ID 67 in the television device data 552 shown in FIG. 6.

1-4-4. Modification 1

The user entered the payment information in the entry boxes 194a to 194e on the "(2-2-1) payment information entry screen" 194 shown in FIG. 20A and the "(2-2-1) payment information entry screen" 283 shown in FIG. 28, using, for example, the remote controller 36 of the television device 10. However, the user can perform entry on the "(2-2-1) payment information entry screen" 194 and the "(2-2-1) payment information entry screen 283" using devices other than the television device 10. For example, other devices include a personal computer device with a keyboard, a mobile phone, a smartphone, and the like.

Figure 39:
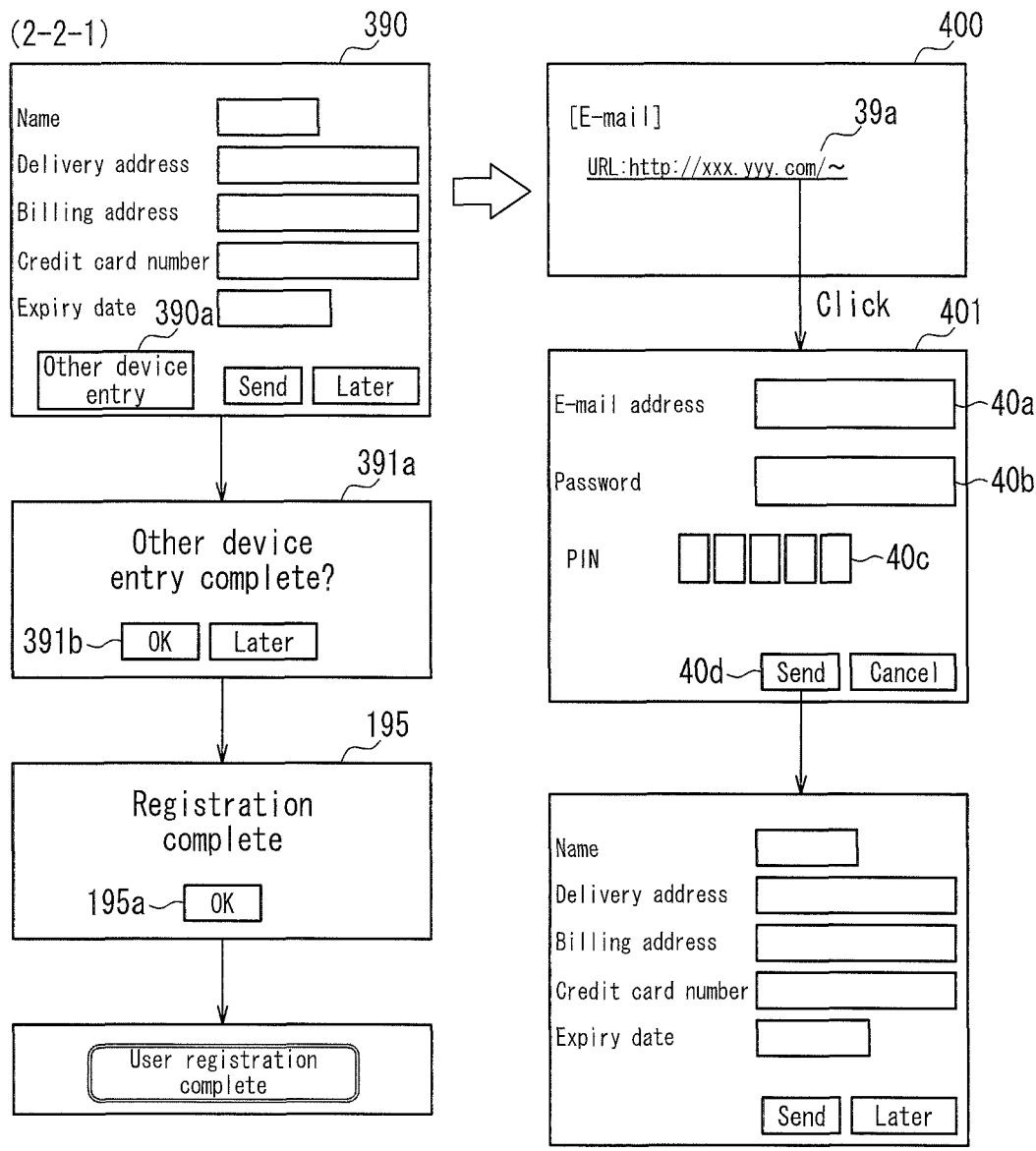
FIG. 39 is a diagram illustrating an outline in the case of displaying a payment information entry screen on a device other than the television device 10.

FIG. 39 is a diagram illustrating an outline in the case of performing entry on the "(2-2-1) payment information entry screen" on a device other than the television device 10. A "(2-2-1) payment information entry screen" 390 includes an "other device entry" button 390a in the lower part of the screen. Upon the user selecting the "other device entry" button 390a, the CPU 52 in the management server device 11 acquires an e-mail address (login ID 63) that is held in association with the system ID 61 of the television device 10 in the television device data 552. The CPU 52 creates an e-mail 400 containing a URL 39a for entering the payment information on the other device and transmits the created e-mail 400 to the acquired e-mail address.

Upon the user who received the e-mail 400 on the other device clicking the URL 39a, a CPU in the other device causes a new registration screen 401 to be displayed on a display of the other device. The user operates a keyboard or the like of the other device, for example, to enter the e-mail address, the password, and the PIN (personal identification number) in the e-mail address entry box 40a, the password entry box 40b, and the PIN entry box 40c, respectively.

Upon a "send" button 40d being pressed by the user who entered the e-mail address, the password, and the PIN on the other device, the CPU in the other device checks entries and a password entry condition. The CPU in the other device transmits, to the management server device 11, data of the e-mail address entered in the e-mail address entry box 40a, data of the password entered in the password entry box 40b, and data of the PIN entered in the PIN entry box 40c. Note that the processes after the "send" button 40d is pressed can be the same as the processes in steps S211 to S215 in FIG. 21.

Meanwhile, after the user selects the "other device entry" button 390a on the television device 10, the CPU 52 in the management server device 11 causes the television device 10 to display a screen 391a for prompting the user to enter whether or not entry on the other device is finished. Upon the user pressing an "OK" button 391b on the screen 391a, the CPU 32 in the television device 10 transmits, to the sale server device 12, information for making an inquiry about whether or not the user of the television device 10 entered the payment information on the other device.

Upon the inquiry information being transmitted from the television device 10, the CPU 82 in the sale server device 12 determines whether or not the payment information of the user of the television device 10 is valid, and if valid, transmits the "registration completion screen" 195 (FIG. 39) to the television device 10 (same as step S216 in FIG. 21).

The "registration completion screen" 195 includes the "OK" button 195a with which the user confirms completion of payment information registration. Upon the user pressing the "OK" button 195a, the CPU 32 in the television device 10 transmits information indicating completion of payment information registration to the management server device 11 (step S217 in FIG. 21). Note that the processes after the "OK" button 195a is pressed can be the same as the processes in steps S217 to S220 in FIG. 21.

1-4-5. Modification 2

The display position of the application icon 21 displayed on the aforementioned "(0) main menu screen" (e.g., FIG. 12) is arbitrary. Also, the display position of the free application icons 146 or the pay application icons 147 displayed on the aforementioned "(1-1) market menu screen" (e.g., FIG. 14) is arbitrary.

For example, if the user is using the recorder device 13 as well as the television device 10y as shown in FIG. 1, the CPU 52 in the management server device 11 can determine the position of the icons displayed on the "(0) main menu screen" and the "(1-1) market menu screen", based on scheduled recording information and content reproduction information on the recorder device 13.

Specifically, the CPU 52 preferentially can display icons according to user preference by correlating meta data (information regarding data) contained in the scheduled recording information and in the content reproduction information with information associated with the icons. For example, if a basketball game is included in the scheduled recording information, the CPU 52 can preferentially display icons of products and application software that are associated with basketball. If, for example, the icons that are preferentially displayed overlap other icons, they can be displayed at the foremost position.

In this case, the scheduled recording information and the content reproduction information on the recorder device 13 are held in the management server device 11 or other server device. Also, the CPU 52 in the management server device 11 can manage the status of the recorder device 13 in the television device data 552 by giving a system ID to the recorder device 13.

1-4-6. Modification 3

For example, if the user is using the domestic appliance 14 that can be used in a HEMS (Home Energy Management System) as well as the television device 10z as shown in FIG. 1, the CPU 52 in the management server device 11 can determine the position of icons displayed on the "(0) main menu screen" and the "(1-1) market menu screen", based on HEMS information.

Specifically, the CPU 52 can preferentially display icons according to characteristics of user's life by correlating data on electricity use for a product included in the HEMS information with information regarding icons. For example, if it can be determined from the HEMS information that electricity for a washing machine is used at night, the CPU 52 can expect that the user dries the laundry in a room, and therefore can preferentially display icons of products related to detergent dedicated to room drying. In this case, the HEMS information transmitted from the product used in the HEMS is held in the management server device 11 or other server device.

2. Second Embodiment

In the present embodiment, a description will be given of an example in which screen control is performed on the television device 10 in view of an account status of the user who is associated with the television device 10 (e.g., FIG. 1), in addition to the configuration of the first embodiment. Note that the same functional units or elements as those of the above-described first embodiment will be given the same symbols, and repetitive descriptions thereof will be omitted.

2-1. Example of Account Status

In the present embodiment, the account status of the user associated with the television device 10 is categorized into four states, as listed below.

(1) Unconnected state: This refers to a state in which the television device 10 has never connected to the management server device 11 (e.g., FIG. 1). For example, the television device 10 is in the unconnected state at the time of shipping from the factory.

(2) Unregistered user state: This refers to a state in which the television device 10 firstly connects to the management server device 11. For example, upon the television device 10 connecting to the management server device 11 via the network N, the television device 10 is set automatically to this state at a stage before the main menu is displayed. For example, the management server device 11 records information including the device ID of the television device 10 in the television device data 552 (e.g., FIG. 6) in association with a temporary system ID. The unregistered user state is a state in which the account is linked to the device ID for identifying the television device 10.

(3) Non-paying user state: This refers to a state in which the device ID and the system ID are associated with a login ID (e.g., an e-mail address) and a password. For example, it is a state in which the login ID (e-mail address) entered by the user is recorded as part of the television device data 552 in association with information including the device ID of the television device 10 and with the system ID, and in which the password entered by the user is recorded as part of the user data 852 (e.g., FIG. 9) in association with the login ID (e-mail address).

Note that a PIN (personal identification number) may be recorded as part of the television device data 552. Also, environmental data (e.g., data regarding available application software, data on various settings, etc.) on the television device 10 in the unregistered user state is carried over to environmental data on the television device 10 in the non-paying user state. The non-paying user state is a state in which the account is linked to the device ID for identifying the television device 10 and with the login ID (e-mail address) for identifying the user.

(4) Paying user state: This refers to a state in which the device ID, the system ID, the login ID, and the password are associated with the payment information of the user. For example, it is a state in which the payment information and delivery address information that are entered by the user are recorded in the user data 852 in association with the login ID and the password.

2-2. Temporary System ID

In the unregistered user state, the management server device 11 records the device ID of the television device 10 in the television device data 552 in association with the temporary system ID. For example, the temporary system ID is data by which a plurality of users who use the television device 10 are identified in common. With the temporary system ID, the management server device 11 can identify and handle the television device 10 even if user information such as the login ID is not registered. For example, the management server device 11 can hold the status of main menu settings (layout, etc.) and the status of application software settings in association with the temporary system ID and the device ID.

Also, when the television device 10 is in the non-paying user state after the user performs the non-paying user registration, the management server device 11 updates the temporary system ID to a unique system ID. Therefore, the management server device 11 can carry over the environmental data on the television device 10 in the unregistered user state to the environmental data on the television device 10 in the non-paying user state, by internal processing.

Note that setting information on the television device 10 in the unregistered user state is carried over in association with the user who firstly performed the non-paying user registration or the paying user registration on this television device 10.

In the television device 10 on which the non-paying user registration or the paying user registration was performed through the "(2-14) new device binding screen" (FIG. 18, etc.), setting information in the unregistered user state is abandoned, and setting information regarding the system ID that was registered on the new device binding screen is carried over. Note that in the television device 10 on which the non-paying user registration or the paying user registration is performed through the "(2-14) new device binding screen" (FIG. 18, etc.), setting information may be carried over in which the setting information in the unregistered user state and the setting information regarding the system ID registered on the new device binding screen are merged. Further, the television device 10 preferentially may carry over the setting information regarding free application software or pay application software, among the setting information in the unregistered user state.

2-3. Example of Data Storage

Figure 40:
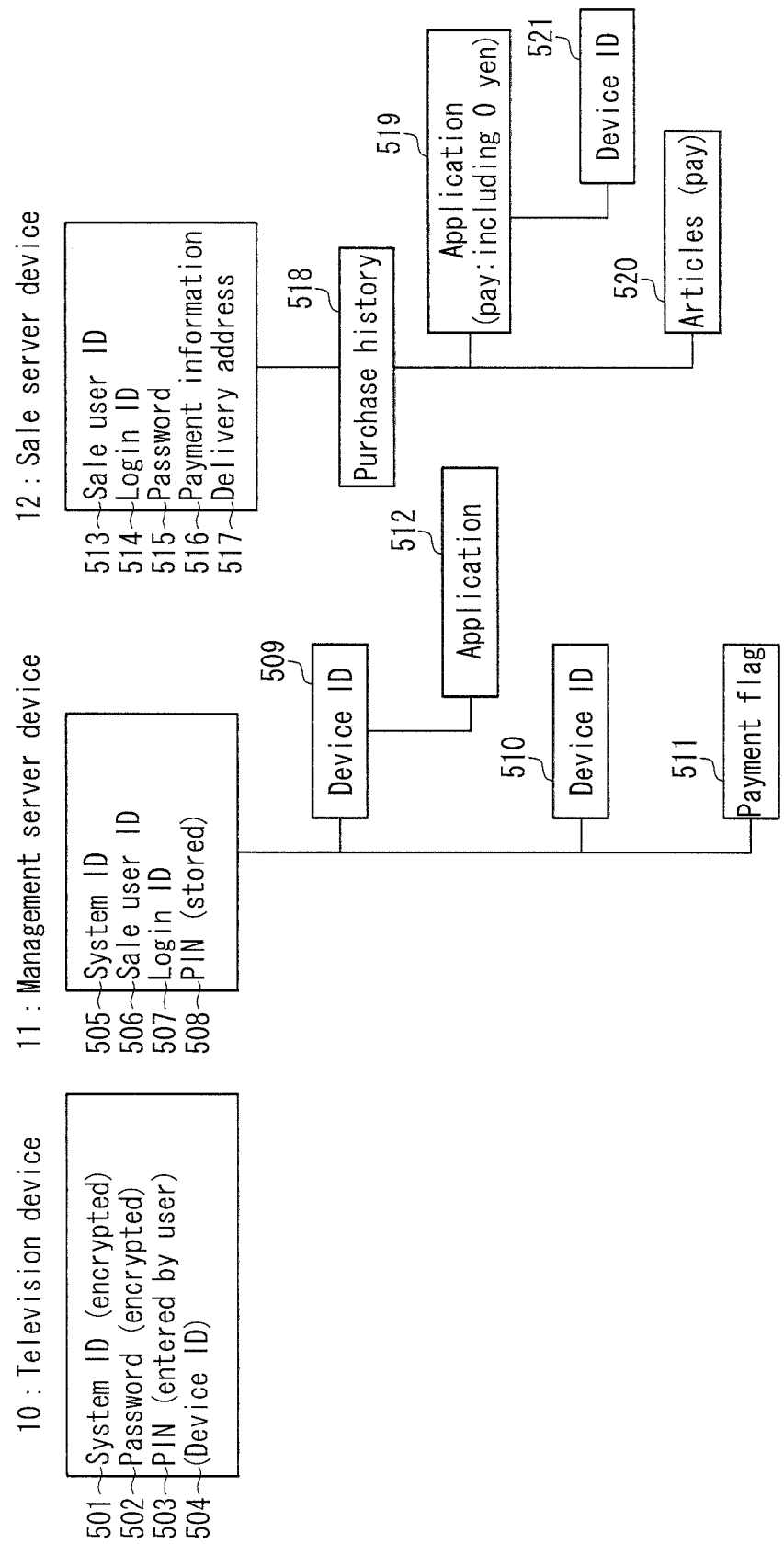
FIG. 40 is a diagram showing an example of data storage in a television system 1 according to a second embodiment.

FIG. 40 is a diagram showing an example of data storage in the television system 1 of the present embodiment. The television device 10 holds an encrypted system ID 501, an encrypted password 502, and a device ID 504. A PIN 503 is entered by the user.

The system ID 501 is an address that is determined uniquely in the television system 1. The reason that the system ID 501 is a uniquely determined address is because, if the user is identified only by the login ID that is an e-mail address, data consistency is possibly lost among devices in the case where the user changes the e-mail address. Note that the system ID is encrypted by a predetermined encryption algorithm held in the management server device 11.

The password 502 includes characters or numbers that are arbitrarily entered by the user. The password 502 is encrypted using the PIN 503 by a predetermined encryption algorithm held in the management server device 11. In other words, the PIN 503 functions as an encryption key for encrypting the password 502. One example of the device ID 504 is an MAC address that was set at the time of shipping from the factory of the television device 10. Note that as the device ID 504, a hush value may be used that is obtained by converting the aforementioned MAC address with a predetermined hush function.

The PIN 503 is a combination of numbers that are set arbitrarily by the user. Because PIN 503 are configured to be set as a combination of numbers, the user is able to enter the PIN 503 by operating only number keys among the number/character entry keys 23 on the remote controller 36.

PINs 503 (hereinafter referred to as PIN codes in some cases) correspond to passwords one by one. The television system 1 (e.g., FIG. 1) according to the present embodiment is configured so that the user logs in to the management server device 11 by entering the PIN code. In other words, the television system is not configured so that the user enters only the password to log in to the management server device 11. When the PIN code is entered, the password is stored in the television device 10 and encrypted by the PIN using a predetermined algorithm.

When the user logs in, the encrypted password and the entered PIN are transmitted from the television device to the management server device 11. The management server device 11 has a decryption unit that decrypts the password encrypted by the PIN, using a predetermined algorithm. The management server device 11 decrypts the encrypted password using the decryption unit. In other words, the PIN 503 functions as an decryption key for decrypting the password 502.

The user can change the password and/or the PIN code using each television device 10. For example, the television device 10 can be provided with a registration accepting unit that accepts entry of a PIN code (personal identification number) and a password from the user and transmits the PIN code and the password to the management server device 11. The management server device 11 can be provided with an encryption unit that encrypts the password transmitted from the television device 10, using the PIN code (personal identification number). In other words, in this case, the television system functions as an information registration system for registering the PIN code and the password, for example.

Also, if a plurality of television devices 10 used by the same user exist, the PIN code (personal identification number) can be used in common by these television devices 10 that are used by the same user. Here, the "same user" is a concept including not only an individual user, but also the same user group such as a family, for example.

Also, if the password and/or the PIN code is changed using an arbitrary television device 10, the other television device 10 used by the same user cannot log in using the PIN code before being changed. In this case, the management server device 11 requests that the user re-enter the PIN that matches the PIN stored in the management server device 11, on the other television device. Consistency of the PIN thereby can be maintained.

For example, if the encrypted password cannot be decrypted using the PIN code, the management server device 11 can request that the user re-enter the PIN code. In this case, the management server device 11 causes the television device 10 to display a re-entry screen for prompting the user to enter the new PIN code (personal identification number). Note that the management server device 11 may request that the user reset the password and/or the PIN code if the user of the television device 10 entered an incorrect PIN code three times.

The management server device 11 holds a system ID 505, a sale user ID 506, a login ID 507, and a PIN 508. The system ID 505 is an address or an identification ID that is uniquely determined in the television system 1. The sale user ID 506 is an identification ID that is uniquely determined between the management server device 11 and the sale server device 12 (e.g., FIG. 1). The login ID 507 is an identification ID that is uniquely determined for identifying the user. The login ID 507 can be an e-mail address that is unique to the user, for example. The PIN 508 is can be combination of numbers that are arbitrarily set by the user.

The management server device 11 holds a device ID 509, a device ID 510, and a payment flag 511 in association with the system ID 505, the sale user ID 506, the login ID 507, and the PIN 508. Note that three or more device IDs may exist. Each device ID can be associated with an application 512 that indicates application software. Note that each device ID is not associated with the application 512 in some cases. Also, each device ID is associated with a plurality of applications 512 in some cases.

The payment flag 511 is flag data for determining whether or not the user who uses the television device 10 has registered payment information, in communication between the management server device 11 and the sale server device 12. The management server device 11 can determine the account status of the user associated with the television device 10, with the payment flag 511. For example, the payment flag 511 is set to "T" if the user has registered the payment information, and is set to "F" if the user has not registered the payment information.

The sale server device 11 holds a sale user ID 513, a login ID 514, a password 515, payment information 516, and a delivery address 517. The sale user ID 513 is an identification ID that is uniquely determined between the management server device 11 and the sale server device 12. The login ID 514 is an identification ID that is uniquely determined for identifying the user. The login ID 514 is an e-mail address that is unique to the user, for example. The password 515 includes characters or numbers that are arbitrarily entered by the user.

The payment information 516 is data used in payment when the user who uses the television device 10 uses pay service. For example, the payment information 516 includes a credit card number issued by a credit company with which the user made a contract in advance. The delivery address 517 is address data used when the user used service. For example, the delivery address 517 is an address to which the user who used mail order service wants articles to be delivered.

The sale server device 11 holds purchase history 518 in association with the sale user ID 513, the login ID 514, the password 515, the payment information 516, and the delivery address 517. The purchase history 518 includes data regarding applications 519 and articles 520 bought by the user. The application 519 is associated with the device ID 521.

2-4. Example of Login Process

Figure 41:
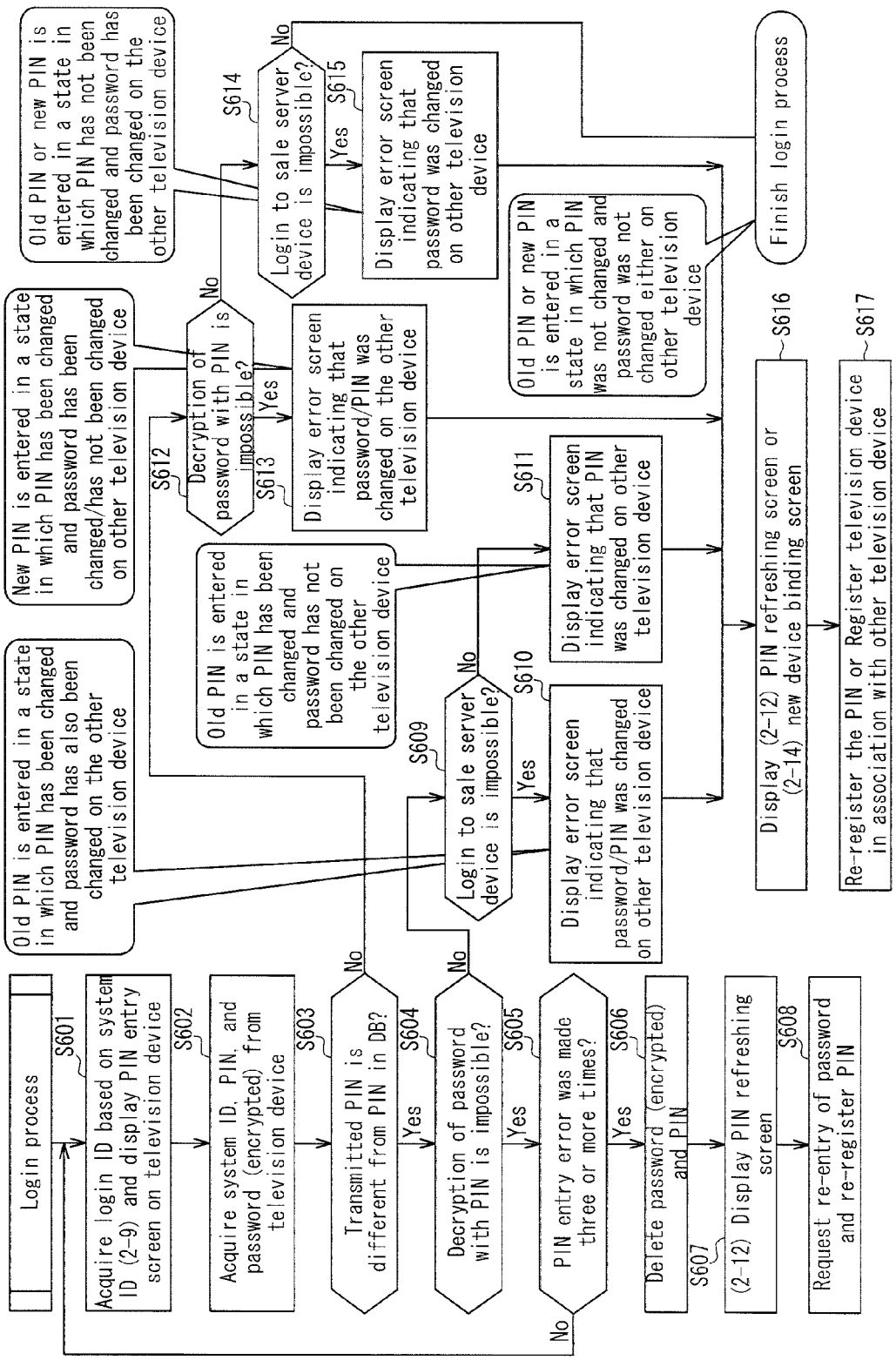
FIG. 41 is a diagram showing an exemplary flowchart of a login process in the television system 1 in the second embodiment.

FIG. 41 is a diagram showing an exemplary flowchart of the login process in the television system 1 of the present embodiment. The CPU 52 in the management server device 11 (e.g., FIG. 5) acquires the login ID by referring to the television device data 552 based on the system ID acquired from the television device 10, and displays the "(2-9) PIN entry screen (login screen)" on the television device (step S601). The CPU 52 in the management server device 11, upon accepting an entry operation of the user, acquires the system ID, the PIN, and the password (encrypted) from the television device 10 (step S602).

If the CPU 52 in the management server device 11 determines that the PIN transmitted from the television device 10 is different from the PIN held in the DB (television device data 552) ("YES" determination in step S603), it attempts to decrypt the password with the PIN (step S604).

If the password cannot be decrypted with the PIN ("YES" determination in step S604), the CPU 52 in the management server device 11 further determines whether or not a PIN entry error has been made three or more times (step S605). If the PIN entry error has not been made three or more times ("NO" determination in step S605), the CPU 52 in the management server device 11 performs the process in aforementioned step S601.

If the PIN entry error has been made three or more times ("YES" determination in step S605), the CPU 52 in the management server device 11 deletes the password (encrypted) and the PIN that are held in the DB (television device data 552 and user data 852) (step S606).

The CPU 52 in the management server device 11 displays a "(2-12) PIN refreshing screen" (step S607) and request that the user re-enter the password. Upon the user re-entering the PIN and the password, the CPU 52 in the management server device 11 re-registers the PIN (step S608).

In step S603, if the CPU 52 in the management server device 11 determines that the PIN transmitted from the television device 10 is not different from the PIN held in the DB (television device data 552) ("NO" determination in step S603), it attempts to decrypt the password with the PIN (step S612).

If the password cannot be decrypted with the PIN ("YES" determination in step S612), the CPU 52 in the management server device 11 displays an error screen indicating that the password and the PIN were changed on other television device 10 (step S613), and executes step S616. In this case, a new PIN is entered on the television device 10 in a state in which the PIN has been changed and the password has also been changed or has not been changed on the other television device On the other hand, if the password can be decrypted with the PIN ("NO" determination in step S612), the CPU 52 in the management server device 11 further makes an attempts to check whether or not it is impossible to log in to the sale server device 12 (step S614).

If it is impossible to log in to the sale server device ("YES" determination in step S614), the CPU 52 in the management server device 11 performs control for displaying an error screen indicating that the password was changed on other television device 10 (step S615), and executes step S616. In this case, an old PIN (i.e., a PIN that was used by the user previously) or a new PIN is entered to the television device 10 in a state in which the PIN has not been changed while the password has been changed on other television device.

On the other hand, if it is possible to log in to the sale server device ("NO" determination in step S614), the CPU 52 in the management server device 11 determines that login is possible, and terminates the login process. In this case, the old or new PIN is entered on the television device 10 in a state in which the PIN has not been changed and the password has not been changed either on other television device 10.

In step S604, if it is not impossible to decrypt the password with the PIN ("NO" determination in step S604), the CPU 52 in the management server device 11 makes an attempt to check whether or not it is impossible to log in to the sale server device (step S609).

If it is impossible to log in to the sale server device 12 ("YES" determination in step S609), the CPU 52 in the management server device 11 displays an error screen indicating that the password was changed on other television device 10 (step S610), and executes step S616. In this case, the old PIN is entered on the television device 10 in a state in which the PIN has been changed and the password has also been changed on other television device.

On the other hand, if it is possible to log in to the sale server device ("NO" determination in step S609), the CPU 52 in the management server device 11 displays an error screen indicating that the password was changed on the other television device 10 (step S611), and executes step S616. In this case, an old PIN is entered on the television device 10 in a state in which the PIN has been changed and the password has not been changed on the other television device 10.

In step S616, the CPU 52 in the management server device 11 displays the "(2-12) PIN refreshing screen" or the "(2-14) new device binding screen" (step S616).

In step S616, if the "(2-12) PIN refreshing screen" is displayed, the CPU 52 requests that the user re-enter the password as in step S608. Upon the user appropriately re-entering the PIN and the password, the CPU 52 in the management server device 11 re-registers the PIN (step S617).

On the other hand, if the "(2-14) new device binding screen" is displayed, the CPU 52 requests that the user enter the e-mail address (login ID) and the password, as described with reference to FIG. 22. Upon the user appropriately entering the e-mail address (login ID) and the password, the CPU 52 in the management server device 11 registers the television device 10 in association with other television device 10 of the user (step S617).

In the case where the "(2-12) PIN refreshing screen" is displayed, the CPU 52 requests that the user re-enter the password as in aforementioned step S607, and upon the user re-entering the PIN and the password, the CPU 52 re-registers the PIN (step S608). Note that the process in the case of displaying the "(2-12) PIN refreshing screen" can be as described in the first embodiment with reference to FIGS. 17, 18, 19, 20A, 21, and so on.

Also, in the case of displaying the "(2-14) new device binding screen", the CPU 52 in the management server device 11 prompts the user to enter the e-mail address and the password. Note that the process in the case of displaying the "(2-14) new device binding screen" can be as described in the first embodiment with reference to FIGS. 17, 18, 19, 22, and so on.

Note that, as described in the first embodiment, the CPU 52 in the management server device 11 may provide a display for registration type selection and check with the user about whether or not to register a new account, after step S610, step S611, or step S615. Specifically, the CPU 52 may cause the television device 10 to display the "(2-0) check screen (user registration screen)" 191 shown in FIG. 19.

2-5. Example of State Transition of User Management Data

FIG. 42 is a diagram showing an example of state transition of user management data according to the present embodiment. As shown in FIG. 42, the television device 10 in an unconnected state 621 holds only a device ID. In an unregistered user state 622, the management server device 11 and the sale server device 12 do not hold the user management data.

In an updating step in which the state transitions from the unconnected state 621 to the unregistered user state 622, the television device 10 transmits the device ID to the management server device 11. The management server device 11 transmits a temporary system ID to the television device 10.

In the unregistered user state 622, the television device 10 holds the temporary system ID and the device ID. In the unregistered user state 622, the management server device 11 holds the temporary system ID, the device ID, and application (software) information. Note that the application information is held only in the case where the user installed an application. The application information exists also in the case of free application software. The application information includes positioning information indicating at which position on the screen the icon of the application software is positioned.

In an updating step in which the state transitions from the unregistered user state 622 to a non-paying user state 623, the television device 10 transmits a login ID, a PIN, a password, and the device ID to the management server device 11. The management server device 11 transmits an encrypted password and an encrypted system ID to the television device 10. The management server device 11 transmits the login ID and a sale password to the sale server device 12. The sale server device 12 transmits the sale user ID to the sale server device 12. Note that the sale password is authentication information with which the management server device 11 accesses the sale server device 12.

In the non-paying user state 623, the television device 10 holds the encrypted system ID, the device ID, and the encrypted password. In the non-paying user state 623, the management server device 11 holds the system ID, the device ID, the application information, the sale user ID, the login ID, and the PIN. In the non-paying user state 623, the sale server device 12 holds the sale user ID, the login ID, and the password.

In an updating step in which the state transitions from the non-paying user state 623 to a paying user state 624, the television device 10 transmits the encrypted system ID to the management server device 11. The management server device 11 transmits the login ID to the television device 10. The television device 10 transmits the login ID, the password, payment information, and a delivery address to the sale server device 12. The management server device 11 transmits a payment flag to the television device 10. The management server device 11 transmits the login ID to the sale server device 12. The sale server device 12 transmits the payment flag to the management server device 11.

In the paying user state 624, the television device 10 holds the encrypted system ID, the device ID, and the encrypted password. In the paying user state 624, the management server device 11 holds the system ID, the device ID, the application information, the sale user ID, the login ID, the PIN, and the payment flag. In the paying user state 624, the sale server device 12 holds the sale user ID, the login ID, the password, the payment information, the delivery address, and purchase history. Note that the purchase history is held only in the case where the user purchased an product or installed application software. The purchase history includes the device ID of the television device 10 on which the application software was bought.

2-6. Example of Payment Flag

When a process of purchasing a pay product is performed, it is preferable to perform a purchase process by performing the login process after the account status of the user associated with the television device 10 transitions from (2) the unregistered user state to (3) the non-paying user state, and then to (4) the registered paying user state.

In the present embodiment, the television device 10 transmits the payment information to the sale server device 12. Therefore, it is difficult for the management server device 11 to perceive whether or not the payment information is correctly registered in the sale server device 12. It is therefore preferable that the management server device 11 make an inquiry to the sale server device 12 about the payment information at an appropriate timing and holds the inquiry result.

In the present embodiment, the management server device 11 makes an inquiry to the sale server device about the payment information, triggered by a result screen after the payment information is transmitted from the television device 10 to the sale server device 12. Specifically, for example, the television device 10 can detect termination of the browser by using JavaScript (trademark), although it cannot acquire an update result of the payment information entered on the browser. Therefore, the television device 10 makes an inquiry to the sale server device 12 about the payment information when the browser is terminated.

The payment flag indicating the payment information is updated when the non-paying user state is shifted to the paying user state, and also when the paying user state is shifted to the non-paying user state.

When the non-paying user state is shifted to the paying user state, the management server device 11 makes an inquiry to the sale server device 12 about the payment information when the "(2-2-1) paying user registration screen" (FIG. 18, FIG. 36), the "(2-2-2) paying user registration screen" (FIG. 27), or the "(3-5) other information update screen" is terminated. Specifically, the management server device 11 makes an inquiry to the sale server device 12 about the payment information upon receiving an update trigger from JavaScript (trademark) that detected termination of the browser executed on the television device 10. If, for example, the management server device 11 acquires information indicating that the payment information exists from the sale server device 12 (e.g., data indicating that the payment flag is valid), it updates the payment flag 65 in the television device data 552 to a valid state (e.g., "T").

When the paying user state is shifted to the non-paying user state, the management server device 11 makes an inquiry to the sale server device 12 about the payment information when screen processing for deleting the payment information is finished on the "(3-5) other information update screen". If, for example, the management server device 11 acquires, from the sale server device 12, information indicating that the payment information does not exist (e.g., data indicating that the payment flag is invalid), it updates the payment flag 65 in the television device data 552 to an invalid state (e.g., "F").

Meanwhile, the user can update the payment information by accessing the sale server device 12 using a device other than the television device 10. If the payment information is updated using the other device, the management server device 11 cannot acquire information on termination of the browser from JavaScript (trademark) executed on the television device 10.

Therefore, a URL for updating the payment information using the other device is created so that the browser that read this URL can access a server device that can be managed by the management server device 11. JavaScript (trademark) acquired from the management server device 11 is executed on the browser that read the URL for updating the payment information using the other device, and the user is prompted to perform a process of updating the payment information. Upon completion of the payment information updating process, the other terminal notifies the management server device 11 of completion of payment information update, using JavaScript (trademark) executed on this browser. Thus, the management server device 11 can acquire the payment information when the payment information is updated using the other device (a PC (Personal computer), a tablet PC, etc.).

Note that the management server device 11 may check update of the payment information by performing regular polling on the sale server device 12. Also, the management server device 11 may check update of the payment information by performing polling at an appropriate timing (e.g., at a timing of displaying the "(1-1) market menu screen").

It is conceivable that the management server device 11 receives a notification that payment is impossible from the sale server device 12 even though the payment information is valid. For example, if the credit card is expired, or if the use of the credit card is suspended by the credit card company, the management server device 11 receives a notification that payment cannot be carried out from the sale server device 12. In this case, the management server device 11 can display a pop-up with the message "Check payment information in Settings" on the television device 10, for example.

2-7. Example of Addition of New Device

A user who has a plurality of television devices 10 can use a newly introduced television device 10 in association with the other television devices 10. For example, the user enters an e-mail address (login ID) and a password on the "(2-14) new device binding screen" 200 shown in FIG. 19. Upon the user pressing the "send" button 200c on the "(2-14) new device binding screen" 200, the management server device 11 performs a process of associating the television device 10, which is a new device, with an existing system ID. In the present embodiment, the management server device 11 does not require entry of a PIN in the case of performing the process of associating the television device 10, which is a new device, with the existing system ID.

The management server device 11 executes the process of associating the television device 10 with the existing system ID through the following steps 1 to 4.

Step 1: The CPU 52 in the management server device 11 acquires the e-mail address (login ID) and the password entered by the user to the "(2-14) new device binding screen" 200, from the television device 10.

Step 2: The CPU 52 in the management server device 11 determines whether or not the e-mail address (login ID) acquired from the television device 10 exists among the login IDs 63 in the television device data 522 (FIG. 6), and provides a display indicating an error on the television device 10 if the e-mail address (login ID) does not exist. On the other hand, if the login ID exits, the CPU 52 in the management server device 11 transmits the login ID acquired from the television device 10 to the sale server device 12 and requests a password.

Step 3: The CPU 52 in the management server device 11 compares the password transmitted from the sale server device 12 with the password acquired from the television device 10.

Step 4: If the password transmitted from the sale server device 12 matches the password acquired from the television device 10, the CPU 52 in the management server device 11 encrypts the password acquired from the television device 10 using data of the PIN 64 corresponding to the login ID 63 in the television device data 522 (FIG. 6) and a predetermined algorithm, and transmits the encrypted password to the television device 10.

Similarly, the CPU 52 in the management server device 11 encrypts data of the system ID 61 corresponding to the login ID 63 using the data of the PIN 64 corresponding to the login ID 63 in the television device data 522 (FIG. 6) and a predetermined algorithm, and transmits the encrypted system ID to the television device 10. Note that if the password transmitted from the sale server device 12 does not match the password acquired from the television device 10, the CPU 52 in the management server device 11 provides a display indicating an error on the television device 10.

2-8. Example of State Transition of the Television Device

Figure 43:
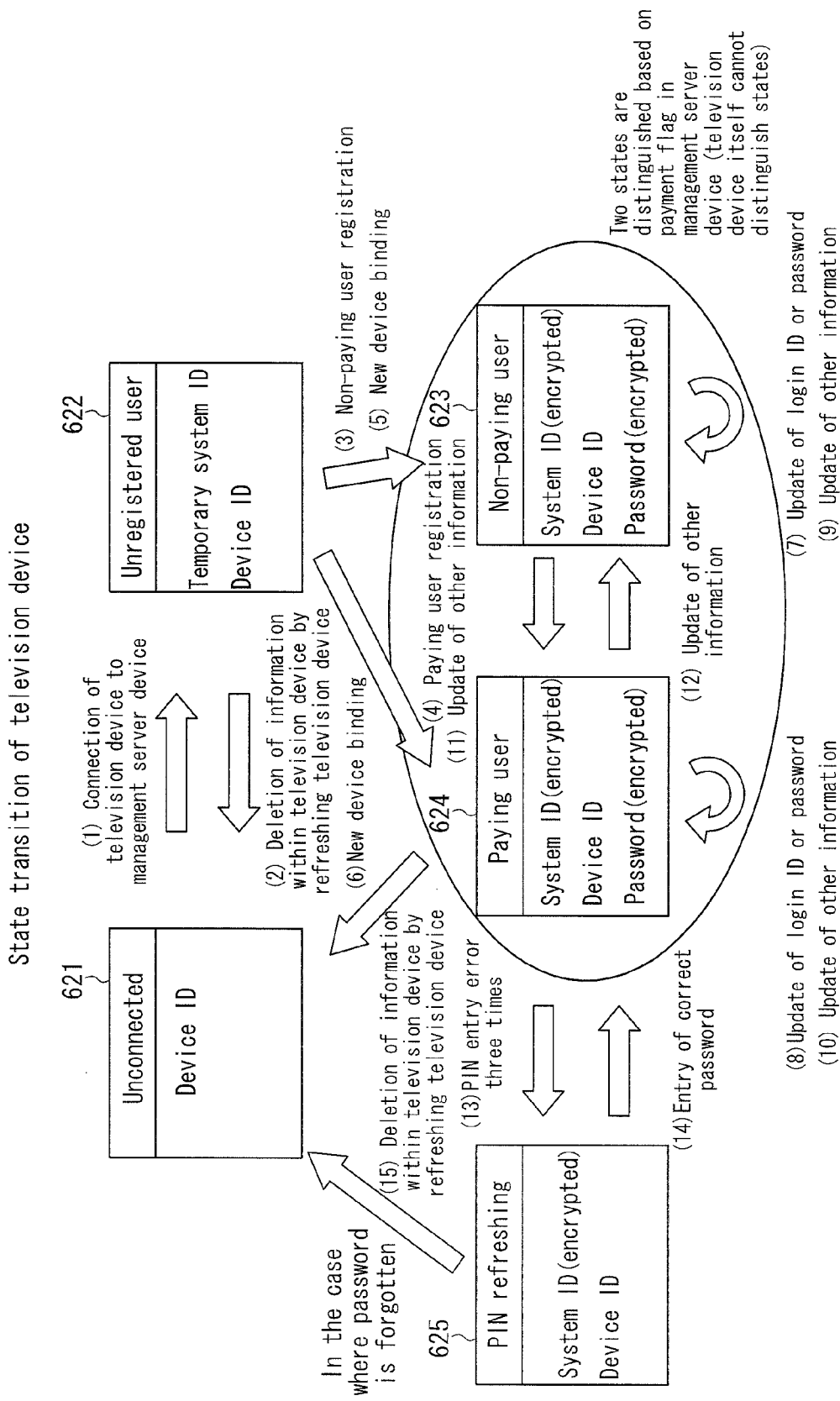
FIG. 43 is an exemplary schematic diagram of state transition of the television device 10.

FIG. 43 is a diagram showing an exemplary schematic diagram of state transition of the television device 10. FIG. 44 is a diagram showing an exemplary table of state transition of the television device 10 shown in FIG. 43. FIG. 45 is a diagram showing an exemplary table of state transition of the television device 10 shown in FIG. 43.

In (1) "connection of television device to management server device", the television device 10 transitions from the unconnected state 621 to the unregistered user state 622 (FIG. 43). As shown in line (1) in FIG. 44, in this transition, the television device 10 transmits a device ID to the management server device 11. The television device 10 receives a temporary system ID from the management server device 11. The television device 10 registers the temporary system ID in the connection data 37a2, for example.

In (2) "deletion of information within television device by refreshing television device", the television device 10 transitions from the unregistered user state 622 to the unconnected state 621 (FIG. 43). As shown in line (2) in FIG. 44, in this transition, the television device 10 deletes the temporary system ID from the connection data 37a2, for example. Note that the television device 10 transmits the device ID to the management server device 11 at the time of next connection.

In (3) "non-paying user registration", the television device 10 transitions from the unregistered user state 622 to the non-paying user state 623 (FIG. 43). As shown in line (3) in FIG. 44, in this transition, the television device 10 transmits a login ID, a PIN, a name (name of the user), a password, and the device ID to the management server device 11. The television device 10 receives an encrypted system ID and an encrypted password from the management server device 11. The television device 10 registers the encrypted system ID and the encrypted password in the connection data 37*a*2, for example.

In (4) "paying user registration", the television device 10 transitions from the non-paying user state 623 to the paying user state 624 (FIG. 43). As shown in line (4) in FIG. 44, in this transition, the television device 10 transmits the encrypted system ID to the management server device 11. The television device 10 transmits the login ID, the password, payment information, and a delivery address to the sale server device 12. The television device 10 receives the login ID and a payment flag from the management server device 12.

In (5) "new device binding", the television device 10 transitions from the unregistered user state 622 to the non-paying user state 623 (FIG. 43). As shown in line (5) in FIG. 44, in this transition, the television device 10 transmits the login ID, the password, and the device ID to the management server device 11. The television device 10 receives the encrypted system ID and the encrypted password from the sale server device 12. The television device 10 registers the encrypted system ID and the encrypted password in the connection data 37*a*2, for example.

In (6) "new device binding", the television device 10 transitions from the unregistered user state 622 to the paying user state 624 (FIG. 43). As shown in line (6) in FIG. 44, in this transition, the television device 10 transmits the login ID, the password, and the device ID to the management server device 11. The television device 10 receives the encrypted system ID and the encrypted password from the sale server device 12. The television device 10 registers the encrypted system ID and the encrypted password in the connection data 37*a*2, for example.

In (13) "PIN entry error three times", the television device 10 transitions from the non-paying user state 623 or the paying user state 624 to a PIN refreshing state 625 (FIG. 43). As shown in line (13) in FIG. 44, in this transition, the television device 10 erases the encrypted password from the connection data 37*a*2, for example.

In (14) "correct password entry", the television device 10 transitions from the PIN refreshing state 625 to the non-paying user state 623 or the paying user state 624 (FIG. 43). As shown in line (14) in FIG. 44, in this transition, the television device 10 transmits the encrypted system ID, the password, and the PIN to the management server device 11. The television device 10 receives the encrypted password from the management server device 11. The television device 10 registers the encrypted password in the connection data 37*a*2, for example.

In (15) "deletion of information within television device by refreshing television device", the television device 10 transitions from the non-paying user state 623 or the paying user state 624 to the unconnected state 621 (FIG. 43). As shown in line (15) in FIG. 44, in this transition, the television device 10 deletes the encrypted system ID and the encrypted password from the connection data 37*a*2, for example.

In (7-12) "processing when configuring settings at (7)-(12)" ((7-12) in FIG. 45), the television device 10 transmits the encrypted system ID to the management server device 11. The television device 10 receives the login ID and the payment flag from the management server device 11.

In (7) "update of login ID or password", the television device 10 does not transition from the non-paying user state 623 (FIG. 43). As shown in line (7) in FIG. 45, the television device 10 transmits the encrypted system ID, an old password (i.e., a password that was used by the user previously), a new login ID, and a new password to the management server device 11. The television device 10 receives an encrypted new password from the management server device 11. The television device 10 registers the encrypted new password in the connection data 37*a*2, for example.

In (8) "update of login ID or password", the television device 10 does not transition from the paying user state 623 (FIG. 43). As shown in line (8) in FIG. 45, the television device 10 transmits the encrypted system ID, the old password, the new login ID, and the new password to the management server device 11. The television device 10 receives the encrypted new password from the management server device 11. The television device 10 registers the encrypted new password in the connection data 37*a*2, for example.

In (9) "update of other information", the television device 10 does not transition from the non-paying user state 623 (FIG. 43). As shown in line (9) in FIG. 45, the television device 10 transmits the encrypted system ID to the management server device 11. The television device 10 transmits the login ID, the password, and a name (name of the user) to the sale server device 12. The television device 10 receives the login ID and a payment flag from the management server device 11.

In (10) "update of other information", the television device 10 does not transition from the paying user state 624 (FIG. 43). As shown in line (10) in FIG. 45, the television device 10 transmits the encrypted system ID to the management server device 11. The television device 10 transmits the login ID, the password, the name (name of the user), the payment information, and the delivery address to the sale server device 12. The television device 10 receives the login ID and the payment flag from the management server device 11.

In (11) "update of other information", the television device 10 transitions from the non-paying user state 624 to the paying user state 623 (FIG. 43). As shown in line (11) in FIG. 45, in this transition, the television device 10 transmits the encrypted system ID to the management server device 11. The television device 10 transmits the login ID, the password, the name (name of the user), the payment information, and the delivery address to the sale server device 12. The television device 10 receives the login ID and the payment flag from the management server device 11.

In (12) "update of other information", the television device 10 transitions from the paying user state 623 to the non-paying user state 624 (FIG. 43). As shown in line (12) in FIG. 45, in this transition, the television device 10 transmits the encrypted system ID to the management server device 11. The television device 10 transmits the login ID, the password, the name (name of the user), the payment information, and the delivery address to the sale server device 12. The television device 10 receives the login ID and the payment flag from the management server device 11.

2-9. Example of State Transition of the Management Server Device

Figure 46:
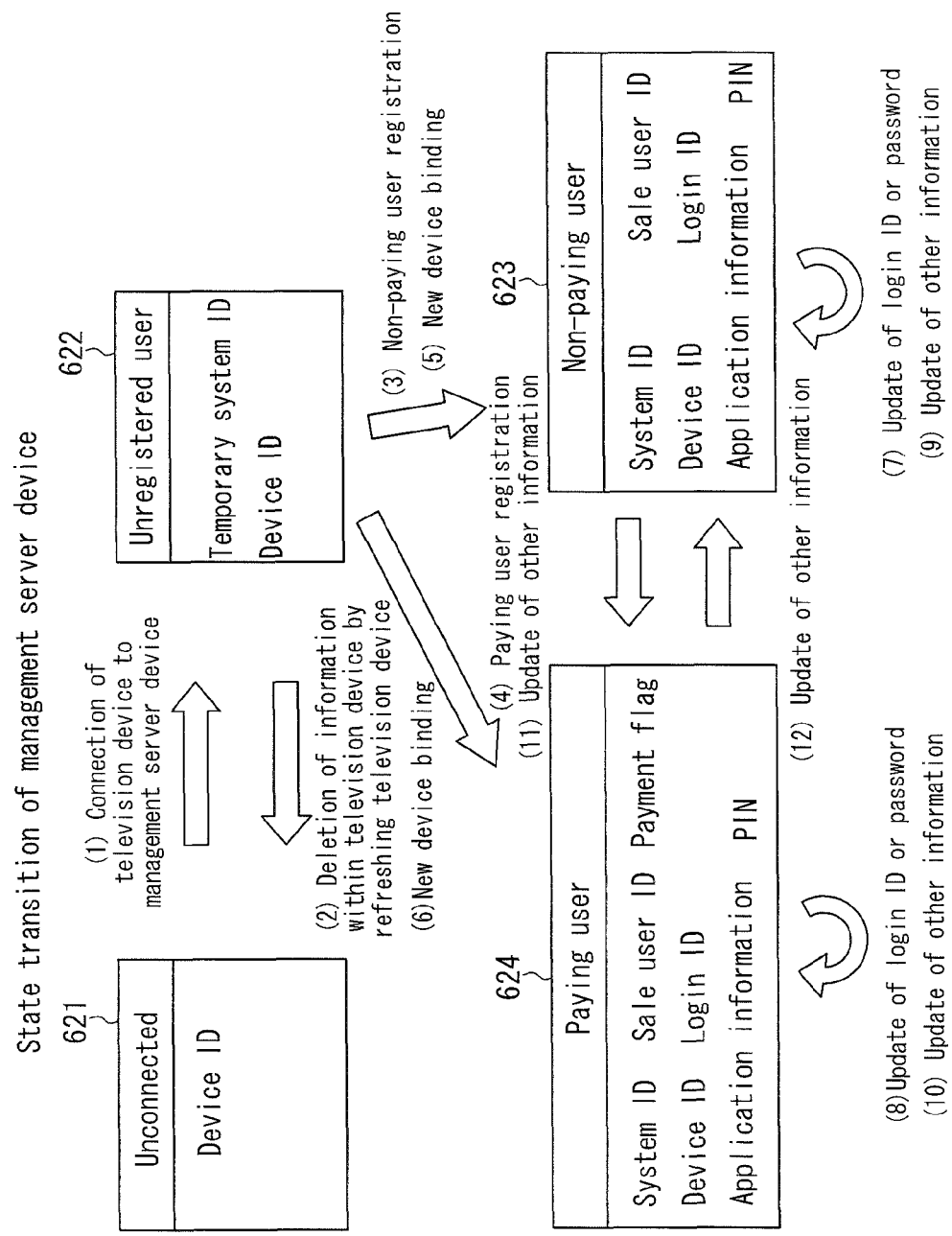
FIG. 46 is an exemplary schematic diagram of state transition of a management server device 11.

FIG. 46 is a diagram showing an exemplary schematic diagram of state transition of the management server device 11. FIG. 47 is a diagram showing an exemplary table of state transition of the management server device 11 shown in FIG. 46. FIG. 47 is a diagram showing an exemplary table of state transition of the management server device 11 shown in FIG. 46.

In (1) "connection of television device to management server device", the television device 10 transitions from the unconnected state 621 to the unregistered user state 622 (FIG. 46). As shown in line (1) in FIG. 47, in this transition, the management server device 11 receives a device ID from the television device 10. The management server device 11 transmits a temporary system ID to the television device 10. The management server device 11 adds the device ID to the temporary system ID (i.e., associates the device ID with the temporary system ID) in the television device data 552, for example.

In (2) "deletion of information within television device by refreshing television device", the television device 10 transitions from the unregistered user state 622 to the unconnected state 621 (FIG. 46). As shown in line (2) in FIG. 47, in this transition, the management server device 11 deletes the device ID from the temporary system ID (i.e., cancels association between the device ID and the temporary system ID) in the television device data 552, for example. Note that the management server device 11 receives the device ID from the television device 10 at the time of next connection.

In (3) "non-paying user registration", the television device 10 transitions from the unregistered user state 622 to the non-paying user state 623 (FIG. 46). As shown in line (3) in FIG. 47, in this transition, the management server device 11 receives a login ID, a PIN, a name (name of the user), a password, and the device ID from the television device 10. The management server device 11 transmits the login ID, the name (name of the user), and the password to the sale server device 12. The management server device 11 receives the sale user ID from the sale server device 12. The management server device 11 transmits an encrypted system ID and an encrypted password to the television device 10.

The management server device 11 issues the system ID and registers the system ID, the device ID, and the PIN in the television device data 552, for example. The management server device 11 deletes the device ID from the temporary system ID (i.e., cancels association between the temporary system ID and the device). The management server device 11 encrypts the system ID and the password using the PIN and a predetermined algorithm.

In (4) "paying user registration", the television device 10 transitions from the non-paying user state 623 to the paying user state 624 (FIG. 46). As shown in line (4) in FIG. 47, in this transition, the management server device 11 receives the encrypted system ID from the television device 10. The management server device 11 transmits the login ID to the sale server device 12. The management server device 11 receives a payment status (e.g., information regarding registration of the payment information of the user) from the sale server device 12. The management server device 11 changes (updates) the payment flag in the television device data 552, for example, based on the payment status received from the management server device 11.

In (5) "new device binding", the television device 10 transitions from the unregistered user state 622 to the non-paying user state 623 (FIG. 46). As shown in line (5) in FIG. 47, in this transition, the management server device 11 receives the login ID, the password, and the device ID from the television device 10. The management server device 11 transmits the login ID and the password to the sale server device 12. The management server device 11 receives the payment status (e.g., information regarding registration of the payment information of the user) from the sale server device 12. The management server device 11 transmits the encrypted system ID and the encrypted password to the television device 10.

The management server device 11 adds the device ID to the temporary system ID (i.e., associates the device ID with the temporary system ID) in the television device data 552, for example. The management server device 11 deletes the device ID from the temporary system ID (i.e., cancels association between the device ID and the temporary system ID) in the television device data 552, for example. The management server device 11 encrypts the system ID and the password using the PIN and a predetermined algorithm.

In (6) "new device binding", the television device 10 transitions from the unregistered user state 622 to the paying user state 624 (FIG. 46). As shown in line (6) in FIG. 47, in this transition, the management server device 11 receives the login ID, the password, and the device ID from the television device 10. The management server device 11 transmits the login ID and the password to the sale server device 12. The management server device 11 receives the payment status (e.g., information regarding registration of the payment information of the user) from the sale server device 12. The management server device 11 transmits the encrypted system ID and the encrypted password to the television device 10.

The management server device 11 adds the device ID to the temporary system ID (i.e., associates the device ID with the temporary system ID) in the television device data 552, for example. The management server device 11 deletes the device ID from the temporary system ID (i.e., cancels association between the device ID and the temporary system ID) in the television device data 552, for example. The management server device 11 encrypts the system ID and the password using the PIN and a predetermined algorithm. The management server device 11 changes (updates) the payment flag in the television device data 552, for example, based on the payment status received from the management server device 11.

In (7-12) "processing when configuring settings at (7)-(12)" ((7-12) in FIG. 48), the management server device 11 receives the encrypted system ID from the television device 10. The management server device 11 transmits the login ID and the payment flag to the television device 10.

In (7) "update of login ID or password", the television device 10 does not transition from the non-paying user state 623 (FIG. 46). As shown in line (7) in FIG. 48, the management server device 11 receives the encrypted system ID, an old password, a new login ID, and a new password from the television device 10. The management server device 11 transmits the old login ID, the old password, the new login ID, and the new password to the sale server device 12. The management server device 11 receives a processing result (OK (successful) or NG (failed)) of the process of updating the login ID and the password in the user data 852, for example, from the sale server device 12. The management server device 11 transmits the old password and the new password to the television device 10. The management server device 11 registers the new login ID in the television device data 552, for example.

In (8) "update of login ID or password", the television device 10 does not transition from the paying user state 624 (FIG. 46). As shown in line (8) in FIG. 48, the management server device 11 receives the encrypted system ID, the old password, the new login ID, and the new password from the television device 10. The management server device 11 transmits the old login ID (i.e., the login ID that was used by the user previously), the old password, the new login ID, and the new password to the sale server device 12. The management server device 11 receives a processing result (OK (successful) or NG (failed)) of the process of updating the login ID and the password in the user data 852, for example, from the sale server device 12. The management server device 11 transmits the old password and the new password to the television device 10. The management server device 11 registers the new login ID in the television device data 552, for example.

In (9) "update of other information", the television device 10 does not transition from the non-paying user state 623

(FIG. 46). As shown in line (9) in FIG. 48, the management server device 11 receives the encrypted system ID from the television device 10. The management server device 11 transmits the login ID to the sale server device 12. The management server device 11 receives the payment status (e.g., information regarding registration of the payment information of the user) from the sale server device 12. The management server device 11 transmits the login ID and the payment flag to the television device 10.

In (10) "update of other information", the television device 10 does not transition from the paying user state 624 (FIG. 43). As shown in line (10) in FIG. 48, the management server device 11 receives the encrypted system ID from the television device 10. The management server device 11 transmits the login ID to the sale server device 12. The management server device 11 receives the payment status (e.g., information regarding registration of the payment information of the user) from the sale server device 12. The management server device 11 transmits the login ID and the payment flag to the television device 10.

In (11) "update of other information", the television device 10 transitions from the non-paying user state 624 to the paying user 623 (FIG. 46). As shown in line (11) in FIG. 48, in this transition, the management server device 11 receives the encrypted system ID from the television device 10. The management server device 11 transmits the login ID to the sale server device 12. The management server device 11 receives the payment status (e.g., information regarding registration of the payment information of the user) from the sale server device 12. The management server device 11 transmits the login ID and the payment flag to the television device 10. The management server device 11 changes (updates) the payment flag in the television device data 552, for example, based on the payment status received from the management server device 11.

In (12) "update of other information", the television device 10 transitions from the paying user state 623 to the non-paying user state 624 (FIG. 46). As shown in line (12) in FIG. 48, in this transition, the management server device 11 receives the encrypted system ID from the television device 10. The management server device 11 transmits the login ID to the sale server device 12. The management server device 11 receives the payment status (e.g., information regarding registration of the payment information of the user) from the sale server device 12. The management server device 11 transmits the login ID and the payment flag to the television device 10. The management server device 11 changes (updates) the payment flag in the television device data 552, for example, based on the payment status received from the management server device 11.

2-10. Example of State Transition of the Sale Server Device

Figure 49:
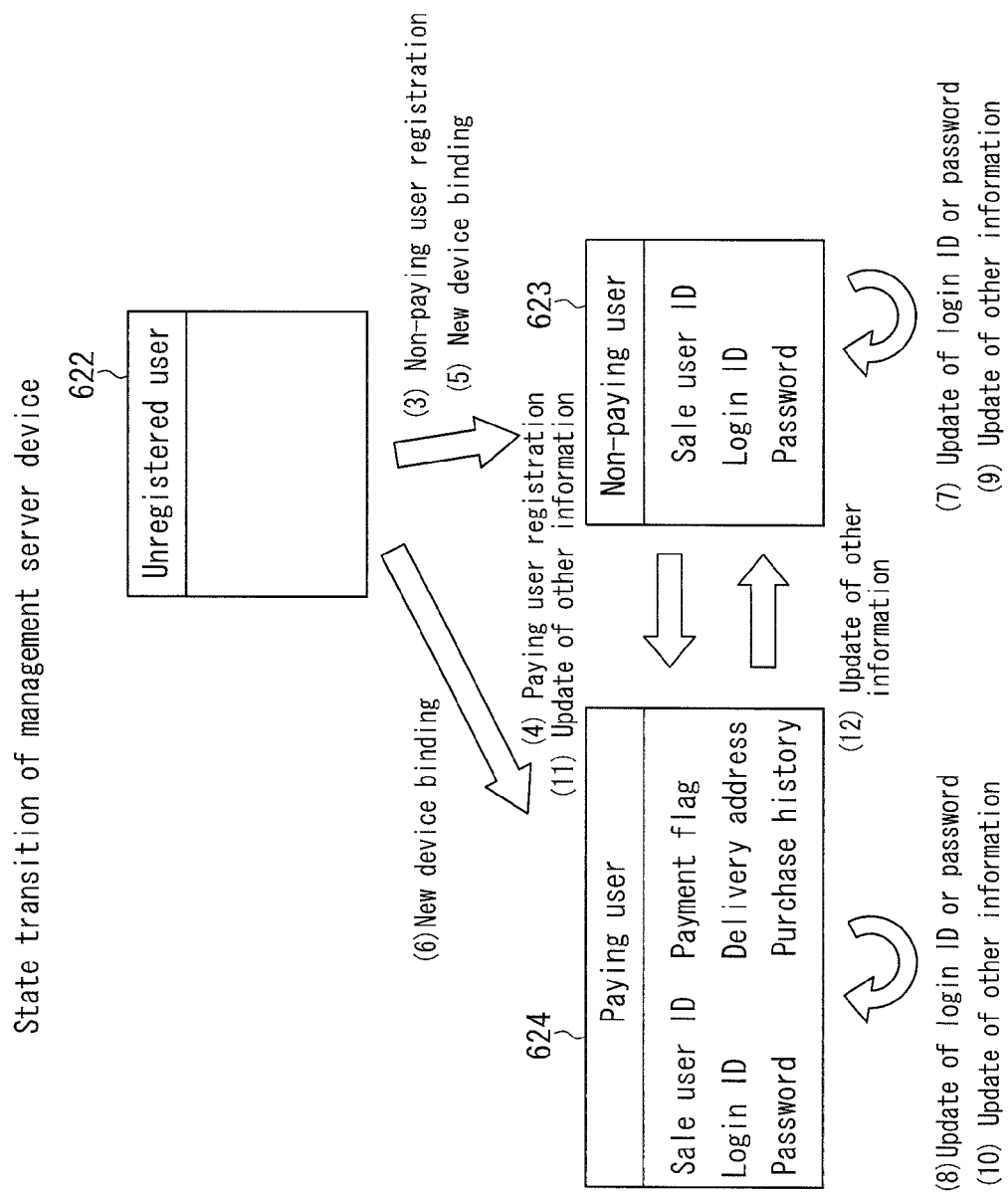
FIG. 49 is an exemplary schematic diagram of state transition of a sale server device 12.

FIG. 49 is a diagram showing an exemplary schematic diagram of state transition of the sale server device 12. FIG. 50 is a diagram showing an exemplary table of state transition of the sale server device 12 shown in FIG. 49. FIG. 51 is a diagram showing an exemplary table of state transition of the sale server device 12 shown in FIG. 49.

In (3) "non-paying user registration", the television device 10 transitions from the unregistered user state 622 to the non-paying user state 623 (FIG. 49). As shown in line (3) in FIG. 50, in this transition, the sale server device 12 receives a login ID, a name (name of the user), and a password from the management server device 11. The sale server device 12 transmits the sale user ID to the management server device 11. The sale server device 12 issues the sale user ID and registers the login ID, the name (name of the user), and the password in the user data 852, for example.

In (4) "paying user registration", the television device 10 transitions from the non-paying user state 623 to the paying user state 624 (FIG. 50). As shown in line (4) in FIG. 50, in this transition, the sale server device 12 receives the login ID from the management server device 11. The sale server device 12 transmits a payment status (e.g., information regarding registration of payment information of the user) to the management server device 11. The sale server device 12 receives the login ID, the password, payment information, and a delivery address from the television device 10. The sale server device 12 registers the payment information and the delivery address in the user data 852, for example.

In (5) "new device binding", the television device 10 transitions from the unregistered user state 622 to the non-paying user state 623 (FIG. 49). As shown in line (5) in FIG. 50, in this transition, the sale server device 12 receives the login ID and the password from the management server device 11. The sale server device 12 transmits the payment status (e.g., information regarding registration of the payment information of the user) to the management server device 11.

In (6) "new device binding", the television device 10 transitions from the unregistered user state 622 to the paying user state 624 (FIG. 49). As shown in line (5) in FIG. 50, in this transition, the sale server device 12 receives the login ID and the password from the management server device 11. The sale server device 12 transmits the payment status (e.g., information regarding registration of the payment information of the user) to the management server device 11.

In (7) "update of login ID or password", the television device 10 does not transition from the non-paying user state 623 (FIG. 49). As shown in line (7) in FIG. 51, the sale server device 12 receives an old login ID, an old password, a new login ID, and a new password from the management server device 11. The sale server device 12 transmits a processing result (OK (successful) or NG (failed)) of the process of updating the login ID and the password in the user data 852, for example, to the management server device 11. The sale server device 12 changes the old login ID and the old password held in the user data 852, for example, to the new login ID and the new password.

In (8) "update of login ID or password", the television device 10 does not transition from the paying user state 624 (FIG. 49). As shown in line (8) in FIG. 51, the sale server device 12 receives the old login ID, the old password, the new login ID, and the new password from the management server device 11. The sale server device 12 transmits a processing result (OK (successful) or NG (failed)) of the process of updating the login ID and the password in the user data 852, for example, to the management server device 11. The sale server device 12 changes the old login ID and the old password held in the user data 852, for example, to the new login ID and the new password.

In (9) "update of other information", the television device 10 does not transition from the non-paying user state 623 (FIG. 49). As shown in line (9) in FIG. 51, the sale server device 12 receives the login ID and the password from the management server device 11. The sale server device 12 transmits the payment status (e.g., information regarding registration of the payment information of the user) to the management server device 11. The sale server device 12 transmits the login ID, the password, and the name (name of the user) to the television device 10. The sale server device 12 transmits a processing result (OK (successful) or NG (failed)) of the process of updating the name (name of the user) in the user data 852, for example, to the television device 10. The sale server device 12 changes data of the name (name of the user) held in the user data 852, for example.

In (10) "update of other information", the television device 10 does not transition from the paying user state 624 (FIG. 49). As shown in line (10) in FIG. 51, the sale server device 12 receives the login ID from the management server device 11. The sale server device 12 transmits the payment status (e.g., information regarding registration of the payment information of the user) to the management server device 11. The sale server device 12 transmits the login ID, the password, the name (name of the user), the payment information, and the delivery address to the television device 10. The sale server device 12 transmits a processing result (OK (successful) or NG (failed)) of the process of updating the name (name of the user), the payment information, and the delivery address in the user data 852, for example, to the television device 10. The sale server device 12 changes data of the name (name of the user), the payment information, and the delivery address held in the user data 852, for example.

In (11) "update of other information", the television device 10 transitions from the non-paying user state 624 to the paying user 623 (FIG. 49). As shown in line (11) in FIG. 51, in this transition, the sale server device 12 receives the login ID from the management server device 11. The sale server device 12 transmits the payment status (e.g., information regarding registration of the payment information of the user) to the management server device 11. The sale server device 12 transmits the login ID, the password, and the name (name of the user), the payment information, and the delivery address to the television device 10. The sale server device 12 transmits a processing result (OK (successful) or NG (failed)) of the process of updating the name (name of the user), the payment information, and the delivery address in the user data 852, for example, to the television device 10. The sale server device 12 changes the data of the name (name of the user), the payment information, and the delivery address held in the user data 852, for example.

In (12) "update of other information", the television device 10 transitions from the paying user state 623 to the non-paying user state 624 (FIG. 49). As shown in line (12) in FIG. 51, in this transition, the sale server device 12 receives the login ID from the management server device 11. The sale server device 12 transmits the payment status (e.g., information regarding registration of the payment information of the user) to the management server device 11. The sale server device 12 transmits the login ID, the password, and the name (name of the user), the payment information, and the delivery address to the television device 10. The sale server device 12 transmits a processing result (OK (successful) or NG (failed)) of the process of updating the name (name of the user), the payment information, and the delivery address in the user data 852, for example, to the television device 10. The sale server device 12 changes the data of the name (name of the user), the payment information, and the delivery address held in the user data 852, for example.

Figure 52:
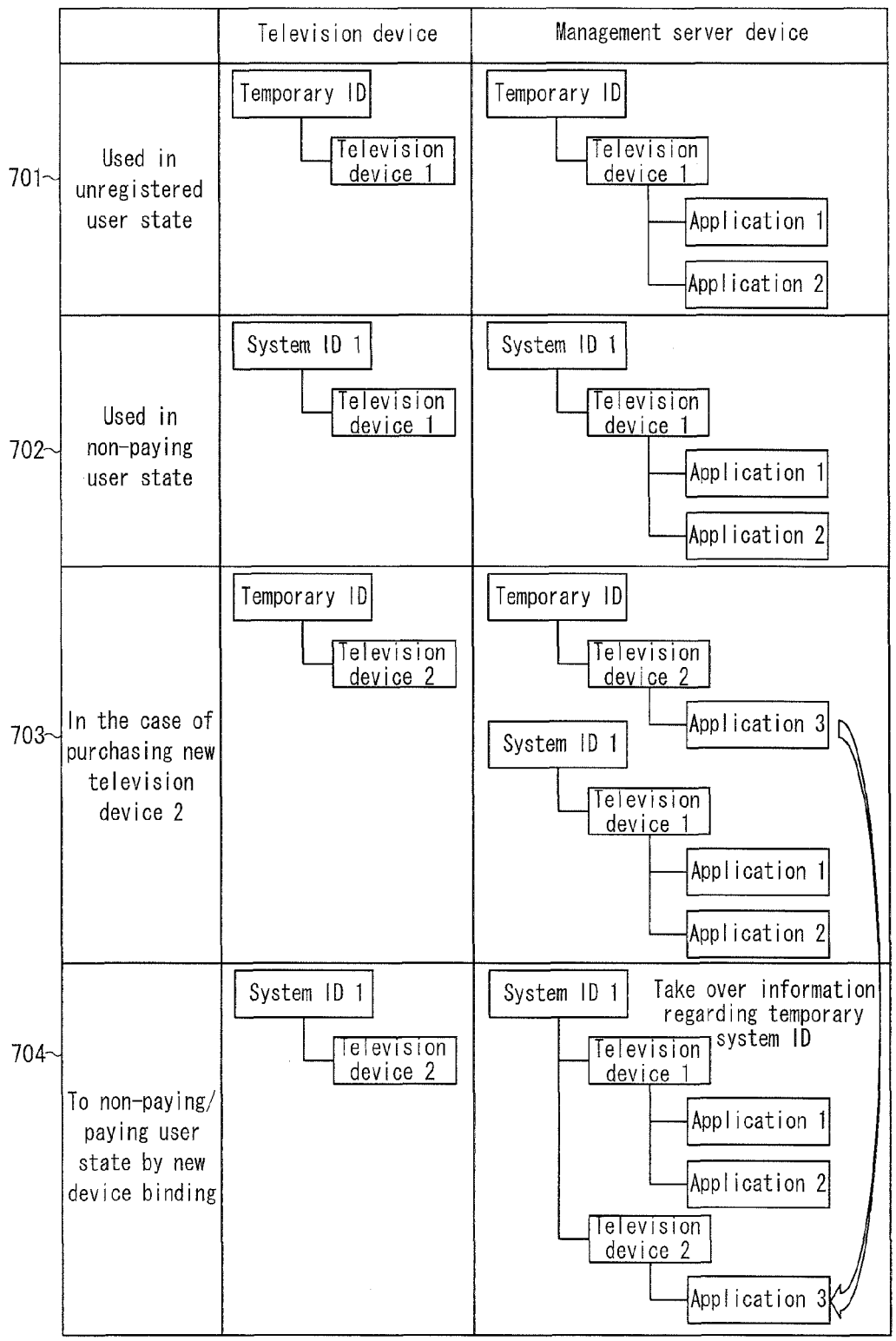
FIG. 52 is an exemplary schematic diagram of state transition in the case of purchasing a new television device.

2-11. Example of State Transition in the Case of Purchasing a New Television Device FIG. 52 is a diagram showing an exemplary schematic diagram of state transition in the case of purchasing a new television device. As shown in a table 701, when the television device 10 is used in an unregistered user state, a "television device 1" is provided with a temporary system ID, for example. The management server device 11 manages the temporary system ID in association with the [television device 1]. The management server device 11 manages, for example, an application (software) 1 and an application (software) 2 in association with the [television device 1].

As shown in a table 702, when the television device 10 is used in a non-paying user state, the "television device 1" is provided with a system ID 1, for example. The management server device 11 manages the system ID 1 in association with the [television device 1]. The management server device 11 manages, for example, the application 1 and the application 2 in association with the [television device 1].

As shown in a table 703, if, for example, the user purchased a new [television device 2], the [television device 2] is provided with a temporary system ID, for example. The management server device 11 manages the temporary system ID in association with the [television device 2]. The management server device 11 manages, for example, an application 3 in association with the [television device 2]. Meanwhile, the management server device 11 manages the system ID 1 in association with the [television device 1]. The management server device 11 manages, for example, the application 1 and the application 2 in association with the [television device 1].

As shown in a table 704, the user can associate the [television device 2] with the existing system ID 1, using the new device binding screen. When the [television device 2] is associated with the existing system ID 1, the management server device 11 manages the system ID 1 in association with the [television device 1] and the [television device 2]. The management server device 11 manages, for example, the application 1 and the application 2 in association with the [television device 1]. Also, the management server device 11 manages, for example, the application 3 in association with the [television device 2].

Thus, the [television device 2] can execute the application 3 that has been associated therewith in a state in which the temporary system ID is set, even after the system ID 1 is set. In other words, the [television device 2] can carry over various kinds of information that has been associated with the temporary system ID.

Figure 53:
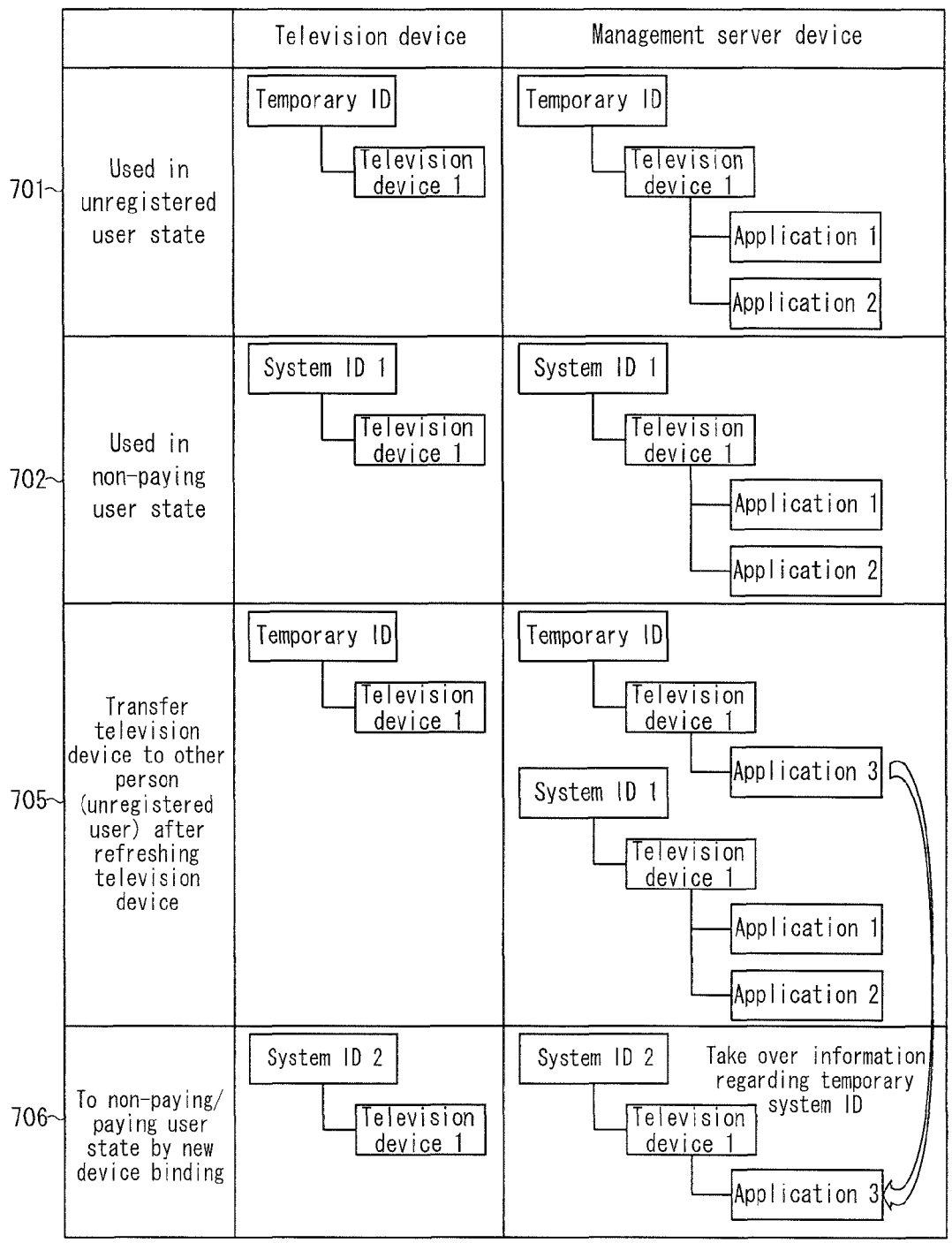
FIG. 53 is an exemplary schematic diagram of state transition in the case of transferring a television device to an other person after refreshing the television device.

2-12. Example of State Transition in the Case of Transferring Television Device to Other Person after Refreshing Television Device FIG. 53 is a diagram showing an exemplary schematic diagram of state transition in the case of transferring a television device to the other person (the other user) after refreshing the television device. Note that the table 701 and the table 702 are as described with reference to FIG. 52.

As shown in a table 705, if, for example, the user transferred the [television device 1] to another person (other unregistered user) after refreshing the [television device 1] (e.g., restoring the television device to a state at the time of shipping from the factory), the [television device 1] is provided with a temporary system ID, for example. The management server device 11 manages the temporary system ID in association with the [television device 1]. The management server device 11 manages, for example, the application 3 in association with the [television device 1]. Meanwhile, the management server device 11 manages the system ID 1 in association with the [television device 1]. The management server device 11 manages, for example, the application 1 and the application 2 in association with the [television device 1]. In this case, because the system ID 1 is not set for the [television device 1], the [television device 1] cannot execute the application 1 or the application 2 even if it connects to the management server device 11.

As shown in a table 706, the user to which the [television device 1] was transferred can associate the [television device 1] with the system ID 2, using the new device binding screen. When the [television device 1] is associated with the system ID 1, the management server device 11 manages the system ID 2 in association with the [television device 1]. The management server device 11 manages, for example, the application 3 in association with the [television device 1].

Thus, the [television device 1] that was transferred to the other person (the other user) can execute the application 3 that has been associated with the [television device 1] in a state in which the temporary system ID is set therefor, even after the system ID 2 is set. In other words, the [television device 1] can carry over various kinds of information that have been associated with the temporary system ID.

2-13. Example of State Transition in the Case of Refreshing a Television Device

FIG. 54 is a diagram showing an exemplary schematic diagram of state transition in the case of refreshing a television device. Note that the table 701 and the table 702 are as described with reference to FIG. 52.

As shown in a table 707, if, for example, the user refreshed the [television device 1] (e.g., restored the television device to a state at the time of shipping from the factory), the [television device 1] is provided with a temporary system ID, for example. The management server device 11 manages the temporary system ID in association with the [television device 1]. The management server device 11 manages, for example, the application 3 in association with the [television device 1].

Meanwhile, the management server device 11 manages the existing system ID 1 in association with the [television device 1]. The management server device 11 manages, for example, the application 1 and the application 2 in association with the [television device 1]. In this case, because the system ID 1 is not set for the [television device 1], the [television device 1] cannot execute the application 1 or the application 2 even if it connects to the management server device 11.

As shown in a table 708, the user of the [television device 1] can associate the [television device 1] with the system ID 1, using the new device binding screen. When the [television device 1] is associated with the system ID 1, the management server device 11 manages the system ID 1 in association with the [television device 1]. The management server device 11 manages, for example, the application 1 and the application 2 in association with the [television device 1]. In this case, the management server device 11 does not manage, for example, the application 3 in association with the [television device 1].

Note that the management server device 11 may manage the application 3, which was associated with the [television device 1] in the past, in association with the [television device 1] based on the system ID 1 associated with the [television device 1] that was refreshed once and on the temporary system ID that was associated with the [television device 1] in the past. In this case, the application 3 that has been associated in a state in which the temporary system ID is set can be executed even after the system ID 1 is set. In other words, the [television device 1] can carry over various kinds of information that have been associated with the temporary system ID.

3. Others

In the above-described embodiment, each functional block shown in the drawings is achieve by processing of a CPU that executes software. However, part or all of each functional block may be achieved by hardware such as a logic circuit. Note that processing of part of a program may further be executed by an operating system (OS).

Although the embodiments of the present invention have been described so far, the present invention is not limited to the above embodiments. Also, the effects described in the embodiments of the present invention are only the most preferable effects resulting from the present invention, and the effects of the present invention are not limited to those described in the embodiments of the present invention.

INDUSTRIAL APPLICABILITY

The television system according to the present invention is available in any kinds of systems that include a plurality of devices, and is applicable to various use such as recorders, mobile phones, and mobile terminals, as well as televisions.

The present invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

The invention claimed is:

1. An authentication system, comprising:
a user terminal comprising a processor and memory; and a server for communicating with the user terminal,
wherein the user terminal transmits, to the server, an identification ID of the user terminal, a first code that was entered, and a second code that was encrypted using the first code, the server decrypts the encrypted second code using the first code,
performs authentication of the user terminal using the identification ID of the user terminal and the decrypted second code,
a data volume of the first code is smaller than that of the second code,
the first code includes characters of the same type as the characters that constitute the second code, and
the first code is configured to be used in common in a plurality of user terminals that are used by the same user,
wherein if the plurality of user terminals used by the same user include:
a first user terminal that is registered in association with the identification ID and the second code; and
a second user terminal that is not yet registered in association with the identification ID and the second code,
the server, upon accepting the second code transmitted from the second user terminal, registers the identification ID and the second code of the first user terminal, in association with the second user terminal, and
transmits the encrypted second code of the first user terminal to the second user terminal.

2. The authentication system according to claim 1,
wherein the server holds the identification ID, the first code, and the second code in association with one another,
in the case where a first code received from one of the plurality of user terminals does not match the first code held by the server,
if the server can decrypt the encrypted second code received from the one of the plurality of user terminals, using the received first code, and
an identification ID received from the one of the plurality of user terminals does not match the identification ID held by the server, or the decrypted second code received from the one of the plurality of user terminals does not match the second code held by the server,
the server transmits information indicating that the first code or the second code has been changed, to the one of the plurality of user terminals.

3. The authentication system according to claim 1,
wherein the server holds the identification ID, the first code, and the second code in association with one another, in the case where the first code received from one of the plurality of user terminals matches the first code held by the server,
if the server cannot decrypt the encrypted second code received from the one of the plurality of user terminals, using the received first code,
the server transmits information indicating that the first code or the second code has been changed, to the one of the plurality of user terminals.

4. The authentication system according to claim 2, wherein when the server transmits, to the one of the plurality of user terminals, the information indicating that the first code or the second code has been changed, the server causes the user terminal to display a screen for prompting entry of a new first code or a new second code.

5. A user terminal for communicating with a server in an authentication system, the user terminal comprising:
a processor;
a memory storing instructions;
wherein, the user terminal is configured to transmit, to the server, an identification ID of the user terminal, a first code that is smaller in data volume than a second code, the first code includes characters of the same type as the characters that constitute the second code, and the second code that was encrypted using the first code if the identification ID of the user terminal and the second code are registered in the server in association with each other, so that authentication of the user terminal is performed in the server based on the identification ID of the user terminal and the second code that was decrypted using the first code, and
if the identification ID and the second code of the user terminal are not yet registered in association with each other in the server, and the identification ID and the second code of another user terminal that is used by the same user of the user terminal are registered in association with each other, the user terminal transmits the second code that is not encrypted to the server, and receives the identification ID of the user terminal and the encrypted second code of the user terminal from the server.

6. A server for communicating with a plurality of user terminals that are used by the same user, comprising:
a processor;
a memory storing instructions;
wherein, upon receiving, from a user terminal, an identification ID of the user terminal, a first code that is used in common in the plurality of user terminals, and a second code that is larger in data volume than the first code and was encrypted using the first code, the first code includes characters of the same type as the characters that constitute the second code, the server is configured to decrypt the encrypted second code using the first code, and perform authentication of the user terminal using the identification ID and the decrypted second code, and
wherein if the plurality of user terminals used by the same user include:
a first user terminal that is registered in association with the identification ID and the second code; and
a second user terminal that is not yet registered in association with the identification ID and the second code,
the server, upon accepting the second code transmitted from the second user terminal, registers the identification ID and the second code of the first user terminal, in association with the second user terminal, and
transmits the encrypted second code of the first user terminal to the second user terminal.

7. A non-transitory recording medium storing a program that configures, using a computer, a server for communicating with a plurality of user terminals that are used by the same user, the program causing the computer to execute processes of:
a process of, upon receiving, from a user terminal, an identification ID of the user terminal, a first code that is used in common in the plurality of user terminals, and a second code that is larger in data volume than the first code and was encrypted using the first code, the first code includes characters of the same type as the characters that constitute the second code, decrypting the encrypted second code using the first code, and performing authentication of the user terminal using the identification ID and the decrypted second code;
a process of, upon accepting the second code transmitted from a second user terminal, registering the identification ID and the second code of a first user terminal, in association with the second user terminal, if the plurality of user terminals used by the same user include the first user terminal that is registered in association with the identification ID and the second code, and the second user terminal that is not yet registered in association with the identification ID and the second code; and
a process of transmitting the encrypted second code of the first user terminal to the second user terminal.

8. An authentication method using a plurality of user terminals that are used by the same user and a server configured to communicate with the plurality of user terminals, the method comprising:
upon a user terminal transmitting, to the server, an identification ID of the user terminal, a first code that is used in common in the plurality of user terminals, and a second code that is larger in data volume than the first code and was encrypted using the first code, the first code includes characters of the same type as the characters that constitute the second code, decrypting, by the server, the encrypted second code using the first code, and performing authentication of the user terminal using the identification ID and the decrypted second code, wherein if the plurality of user terminals used by the same user include:
a first user terminal that is registered in association with the identification ID and the second code; and
a second user terminal that is not yet registered in association with the identification ID and the second code,
the server, upon accepting the second code transmitted from the second user terminal, registering the identification ID and the second code of the first user terminal, in association with the second user terminal, and
transmitting the encrypted second code of the first user terminal to the second user terminal.

* * * * *